US012585167B2

(12) United States Patent
Park

(10) Patent No.: US 12,585,167 B2
(45) Date of Patent: Mar. 24, 2026

(54) CAMERA DEVICE AND OPTICAL DEVICE HAVING IMAGE SENSOR AND LENS MOVEABLE IN OPPOSITE DIRECTIONS

(71) Applicant: LG INNOTEK CO., LTD., Seoul (KR)

(72) Inventor: Sang Ok Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 94 days.

(21) Appl. No.: 18/575,720

(22) PCT Filed: Jul. 18, 2022

(86) PCT No.: PCT/KR2022/010475
§ 371 (c)(1),
(2) Date: Dec. 29, 2023

(87) PCT Pub. No.: WO2023/008804
PCT Pub. Date: Feb. 2, 2023

(65) Prior Publication Data
US 2024/0361667 A1     Oct. 31, 2024

(30) Foreign Application Priority Data

Jul. 26, 2021 (KR) ........................ 10-2021-0097998
Aug. 11, 2021 (KR) ........................ 10-2021-0106269

(51) Int. Cl.
*G03B 5/00* (2021.01)
*G02B 27/64* (2006.01)
*H04N 23/68* (2023.01)

(52) U.S. Cl.
CPC ............. *G03B 5/00* (2013.01); *G02B 27/646* (2013.01); *H04N 23/689* (2023.01); *G03B 2205/0015* (2013.01); *G03B 2205/0069* (2013.01)

(58) Field of Classification Search
CPC .. G03B 5/04; G03B 30/00; G03B 2205/0038; G03B 2205/0069; G03B 2205/0015;
(Continued)

(56) References Cited

U.S. PATENT DOCUMENTS

2005/0140793 A1* 6/2005 Kojima ................ H04N 23/687
                                                        348/208.99
2017/0085799 A1* 3/2017 Yoshida ................. H04N 23/60
(Continued)

FOREIGN PATENT DOCUMENTS

JP      2020-170170 A      10/2020
JP      2021-21754 A        2/2021
(Continued)

OTHER PUBLICATIONS

Supplementary European Search Report dated Sep. 26, 2024 in European Application No. 22849780.6.
(Continued)

*Primary Examiner* — Kelly L Jerabek
(74) *Attorney, Agent, or Firm* — Saliwanchik, Lloyd & Eisenschenk

(57) ABSTRACT

The present embodiment relates to a camera device comprising: a base; a lens disposed on the base; a substrate unit being coupled to an image sensor, a coil coupled to the substrate; and a magnet disposed to correspond to the coil, wherein the lens and the image sensor move in a direction opposite to each other by the magnet.

20 Claims, 43 Drawing Sheets

(58) Field of Classification Search
  CPC ...... G03B 5/00; G02B 27/646; H04N 23/689;
     H04N 23/54; H04N 23/57; H04N 23/55;
      H04N 23/6812; H04N 23/687; H02K
         41/0356; H02K 11/215
  See application file for complete search history.

(56)       References Cited

U.S. PATENT DOCUMENTS

| | | | |
|---|---|---|---|
| 2020/0329199 | A1 | 10/2020 | Nomura |
| 2021/0195073 | A1 | 6/2021 | Saito et al. |

FOREIGN PATENT DOCUMENTS

| | | |
|---|---|---|
| JP | 2021-99417 A | 7/2021 |
| KR | 10-2019-0097113 A | 8/2019 |
| KR | 10-2020-0122013 A | 10/2020 |
| KR | 10-2021-0081556 A | 7/2021 |

OTHER PUBLICATIONS

International Search Report dated Oct. 20, 2022 in International Application No. PCT/KR2022/010475.

\* cited by examiner (a)        (b)        (c)

CAMERA DEVICE AND OPTICAL DEVICE HAVING IMAGE SENSOR AND LENS MOVEABLE IN OPPOSITE DIRECTIONS

CROSS-REFERENCE TO RELATED APPLICATIONS

This application is the U.S. national stage application of International Patent Application No. PCT/KR2022/010475, filed Jul. 18, 2022, which claims the benefit under 35 U.S.C. § 119 of Korean Application Nos. 10-2021-0097998, filed Jul. 26, 2021; and 10-2021-0106269, filed Aug. 11, 2021; the disclosures of each of which are incorporated herein by reference in their entirety.

TECHNICAL FIELD

The present embodiment relates to a camera device and an optical apparatus.

BACKGROUND ART

A camera device is a device that photographs a picture or video of a subject, and is installed in optical apparatuses such as smartphones, drones, and vehicles.

In camera devices, there is a demand for handshake correction, optical image stabilization (OIS), function that corrects image shake caused by user movement to improve image quality.

In the camera device, the handshake correction function is performed by moving the lens in a direction perpendicular to the optical axis. However, in accordance with the recent trend of high pixelation, the diameter of the lens increases, and the weight of the lens increases, and accordingly, there is a problem in that it is difficult to secure electromagnetic force for moving the lens in a limited space.

DETAILED DESCRIPTION OF THE INVENTION

Technical Subject

The present embodiment is intended to provide a camera device that performs a handshake correction function by moving an image sensor and a lens in a direction opposite to each other.

Technical Solution

A camera device according to a first embodiment of the present invention comprises: a base; a lens disposed on the base; a substrate unit coupled to the image sensor; a coil coupled to the substrate; a magnet disposed to correspond to the coil; and a wire movably supporting the lens relative to the base, wherein the lens and the image sensor may move in a direction opposite to each other by the magnet.

A camera device according to a first embodiment of the present invention comprises: a fixed part; a first moving part comprising a lens; a second moving part comprising an image sensor; a driving unit for driving the first moving part and the second moving part; and a wire connecting the fixed part and the first moving part, wherein the first moving part and the second moving part may move in a direction opposite to each other.

The fixed part comprises a base and a terminal being coupled to the base, and a lower end portion of the wire may be coupled to the terminal.

The first moving part comprises: a housing; a bobbin being disposed inside the housing and coupled to the lens; and an upper elastic member connecting the housing and the bobbin, wherein an upper end portion of the wire may be coupled to the upper elastic member.

The terminal comprises: a first portion being coupled to the base; a second portion being coupled to the wire; and a third portion connecting the first portion and the second portion, wherein the third portion may comprise a shape bent at least twice.

The second portion of the terminal comprises a hole through which the wire passes, and the wire may be coupled to a lower surface of the second portion of the terminal through a conductive member.

The fixed part comprises a first substrate, the base is disposed on the first substrate, and the terminal may comprise a fourth portion being extended from the first portion and connected to the first substrate.

The base comprises a groove being recessed from a lower surface of the base, and the terminal may be disposed in the groove of the base.

The second moving part comprises a holder and a second substrate being coupled to the holder and in which the image sensor is disposed, the holder comprises a hole through which the wire passes, and the hole of the holder may be formed to have a larger diameter than the wire so that the holder and the wire do not interfere when the holder is moved.

The driving unit may comprise: a first coil being disposed on the bobbin; a first magnet being disposed in the housing and disposed at a position corresponding to the first coil; a second coil being disposed in the holder; and a second magnet being disposed in the housing and disposed at a position corresponding to the second coil.

The camera device comprises: a sensing magnet being disposed in the bobbin; a sensing substrate being disposed in the housing; and a sensor being coupled to the sensing substrate and detecting the sensing magnet, wherein the upper elastic member comprises first to fourth upper elastic units, wherein the first and second upper elastic units are coupled to the first surface of the sensing substrate, and wherein the third and fourth upper elastic units may be coupled to a second surface opposite to the first surface of the sensing substrate.

The fixed part comprises a first substrate, the second moving part comprises a second substrate being electrically connected to the image sensor, and the connection substrate which is flexible at least in part may connect the first substrate and the second substrate.

The driving unit comprises a magnet disposed on the first moving part and a coil disposed on the second moving part, and the magnet and the coil may move in a direction opposite to each other.

The driving unit moves the lens in an optical axis direction with respect to the image sensor for autofocus driving; and the driving unit can move the first moving part and the second moving part in a direction perpendicular to the optical axis direction with respect to the fixed part and opposite to each other for handshake correction driving.

An optical device according to a first embodiment of the present invention may comprise: a main body; a camera device being disposed in the main body; and a display being disposed in the main body and outputting a video or an image photographed by the camera device.

A camera device according to a second embodiment of the present invention comprises: a base; a lens disposed on the base; a substrate unit being coupled to the image sensor; a coil coupled to the substrate; and a magnet disposed to correspond to the coil, wherein the lens and the image sensor may move in a direction opposite to each other by the magnet.

A camera device according to a second embodiment of the present invention comprises: a fixed part; a first moving part comprising a lens; a second moving part comprising an image sensor; and a driving unit for driving the first moving part and the second moving part, wherein the first moving part and the second moving part may move in a direction opposite to each other.

The driving unit may move the first moving part and the second moving part in a direction opposite to each other with respect to an optical axis.

The driving unit moves the first moving part in a first direction and moves the second moving part in a second direction opposite to the first direction, and the first direction and the second direction may be both perpendicular to the optical axis direction.

The first moving part comprises a housing and a bobbin being disposed inside the housing and being coupled to the lens, wherein the driving unit may comprise a first coil being disposed in the bobbin, a first coil being disposed in the housing, and a first magnet being disposed at a position corresponding to the first coil.

The second moving part comprises a holder and a first substrate being coupled to the holder and in which the image sensor is disposed, wherein the driving unit may comprise a second coil being disposed in the holder, and a second magnet being disposed in the housing and being disposed at a position corresponding to the second coil.

The housing may be spaced apart from the fixed part so as to be movable against the fixed part.

The fixed part may comprise a second substrate, and a connection substrate which is flexible at least in part may connect the first substrate and the second substrate.

The camera device may comprise a wire connecting the first moving part and the second moving part.

The camera device comprises a wire, the first moving part comprises an elastic member connecting the housing and the bobbin, the second moving part comprises a terminal being coupled to the holder, and the wire may connect the elastic member and the terminal.

The wire is disposed in the optical axis direction, the upper end of the wire is connected to the first moving part and the lower end of the wire is connected to the second moving part, and the driving unit may move the upper end of the wire and the lower end of the wire in a direction opposite to each other with respect to an optical axis.

When a current is applied to the first coil, the bobbin may move in an optical axis direction against the housing.

The driving unit may comprise: a magnet; a first coil being disposed in the first moving part and disposed at a position corresponding to the magnet; a second coil being disposed in the second moving part and disposed at a position corresponding to the magnet.

The camera device comprises: a sensing magnet being disposed in the bobbin; a sensing substrate being disposed on the housing; and a sensor disposed on the sensing substrate and detecting the sensing magnet, wherein the elastic member may electrically connect the sensing substrate and the wire.

The terminal may electrically connect the wire and the first substrate.

A camera device according to a second embodiment of the present invention comprises: a fixed part; a first moving part moving against the fixed part and comprising a lens; a second moving part being disposed between the fixed part and the first moving part and comprising an image sensor; and a driving unit for driving the first moving part and the second moving part, wherein when the second moving part moves in a first direction perpendicular to the optical axis direction, the first moving part may move in a second direction opposite to the first direction.

The first moving part comprises a housing and a bobbin being disposed inside the housing and coupled to the lens, wherein the driving unit may comprise a first coil being disposed on the bobbin and a first magnet being disposed on the housing and disposed at a position corresponding to the first coil.

The second moving part comprises a holder and a first substrate being coupled to the holder and being disposed with the image sensor, and the driving unit may comprise a second coil being disposed in the holder and a second magnet being disposed in the housing and disposed at a position corresponding to the second coil.

A camera device according to a second embodiment of the present invention comprises: a base; a housing being disposed in the base; a lens being disposed inside the housing; a substrate being coupled to an image sensor; a magnet being disposed in the housing; and a coil being disposed in the substrate, wherein when a current is applied to the coil, the coil and the magnet may move in a direction opposite to each other.

An optical device according to a second embodiment of the present invention may comprise: a main body; a camera device being disposed in the main body; and a display being disposed in the main body and outputting a video or an image photographed by the camera device.

Advantageous Effects

Through the present embodiment, the image sensor and the lens may be moved in a direction opposite to each other to perform the handshake correction function.

Through this, the correction angle may be doubled compared to the structure in which only one of the lens and the image sensor is moved to perform the handshake correction function. In addition, the correction speed can be doubled. In addition, the current consumption can also be reduced to ½.

BRIEF DESCRIPTION OF DRAWINGS

Figure 5:
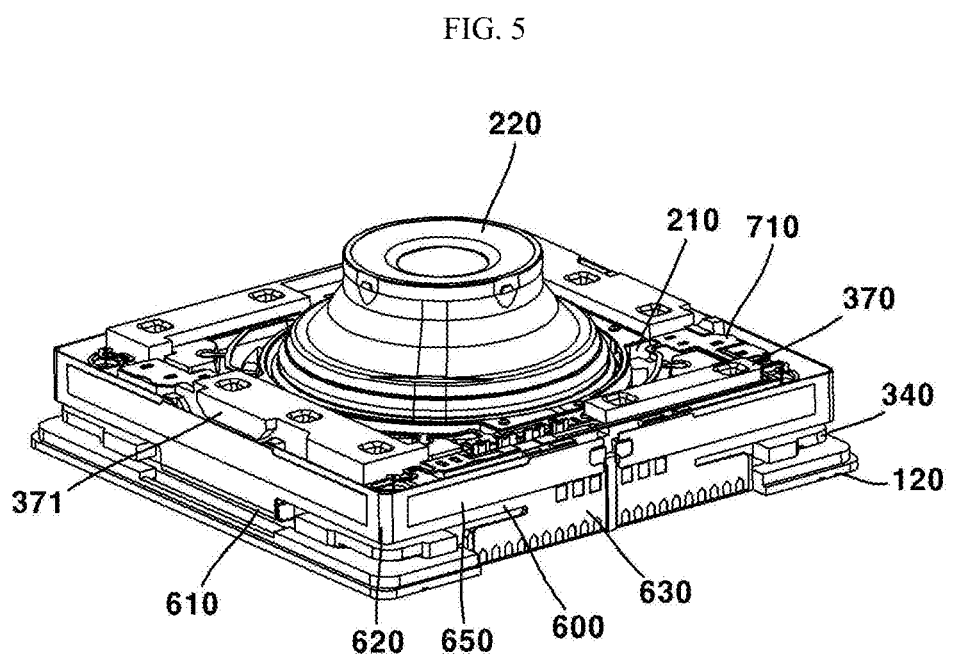

FIG. 5 is a perspective view illustrating a state in which a cover member is omitted in a camera device according to a first embodiment of the present invention.

FIG. 26 is a diagram for explaining the x-axis shift handshake correction of a camera device according to a first embodiment of the present invention. FIG. 27 is a diagram for explaining the y-axis shift handshake correction of a camera device according to a first embodiment of the present invention. FIG. 28 is a diagram for explaining the z-axis rolling handshake correction of a camera device according to a first embodiment of the present invention.

FIGS. 52 to 54 are diagrams for explaining an operation of the handshake correction function of a camera device according to a second embodiment of the present invention.

In more detail, FIG. 52 is a diagram for explaining the x-axis shift handshake correction of a camera device according to a second embodiment of the present invention. FIG. 53 is a view for explaining y-axis shift handshake correction of a camera device according to a second embodiment of the present invention. FIG. 54 is a view for explaining the z-axis rolling handshake correction of a camera device according to a second embodiment of the present invention.

BEST MODE

Figures 1A, 1B, 1C, 2:
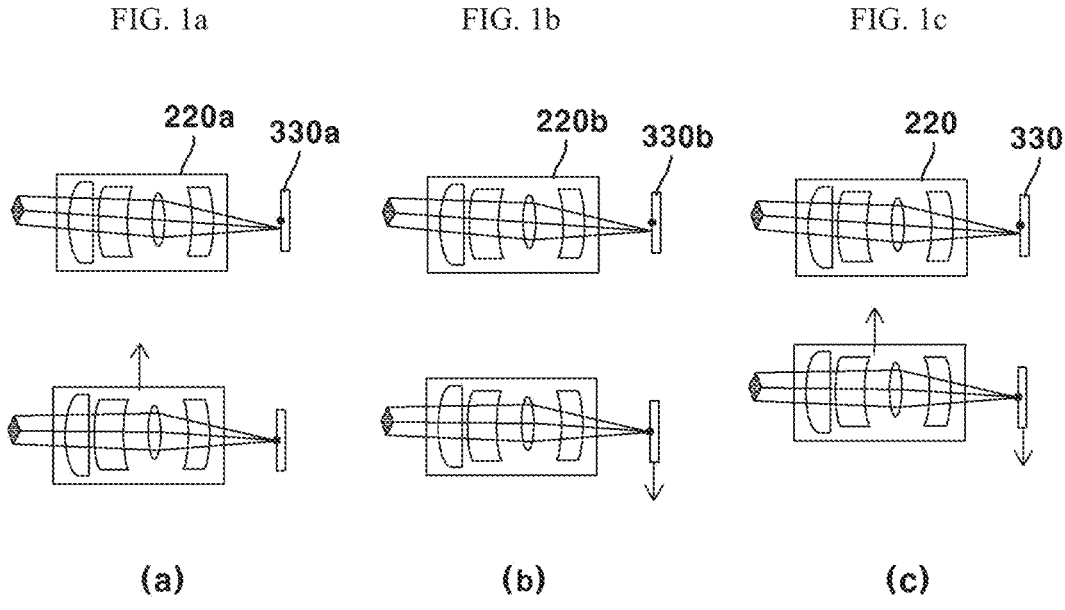
FIGS. 1a and 1b are conceptual diagrams illustrating structures for performing OIS function according to a comparative example.
FIG. 1c is a conceptual diagram illustrating a structure for performing OIS function according to a first embodiment of the present invention.
FIG. 2 is a conceptual diagram illustrating the operation of a camera device according to a first embodiment of the present invention.

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or arranged in "on (above)" or "below (under)" of each component, "on (above)" or "below (under)" means that it comprises not only the case where the two components are directly in contact with, but also the case where one or more other components are formed or arranged between the two components. In addition, when expressed as "on (above)" or "below (under)", the meaning of not only an upward direction but also a downward direction based on one component may be comprised.

Hereinafter, any one of "first substrate 110", "second substrate 310", "sensor substrate 320", "sensing substrate 470", and "connection substrate 600" is referred to as a "first substrate", the other one is referred to as a "second substrate", the other one is referred to as a "third substrate", the other one is referred to as a "fourth substrate", and the other one may be referred to as a "fifth substrate".

Hereinafter, any one of a "first moving part 200" and a "second moving part 300" may be referred to as a "first moving part" and the other one may be referred to as a "second moving part". In addition, any one of a "first moving part 200" and a "second moving part 300" may be referred to as a "moving part". Or, a "first moving part 200" and a "second moving part 300" may be referred to as a "moving part" together.

Hereinafter, a camera device according to a first embodiment of the present invention will be described with reference to the drawings.

Figure 3:
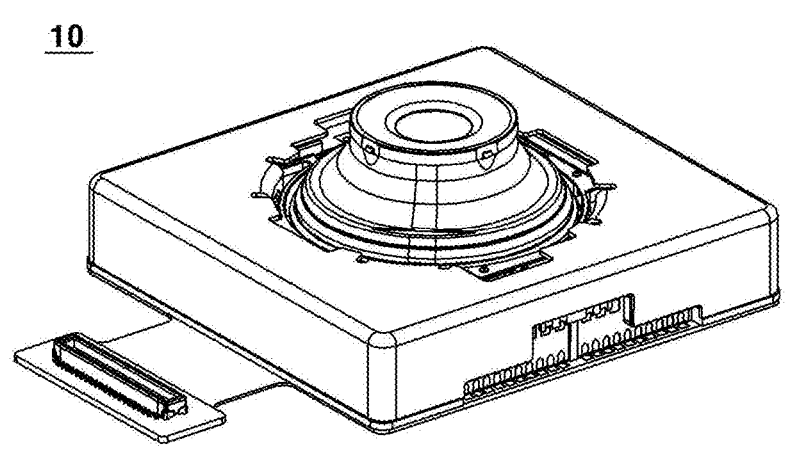
FIG. 3 is a perspective view of a camera device according to a first embodiment of the present invention.
Figure 4:
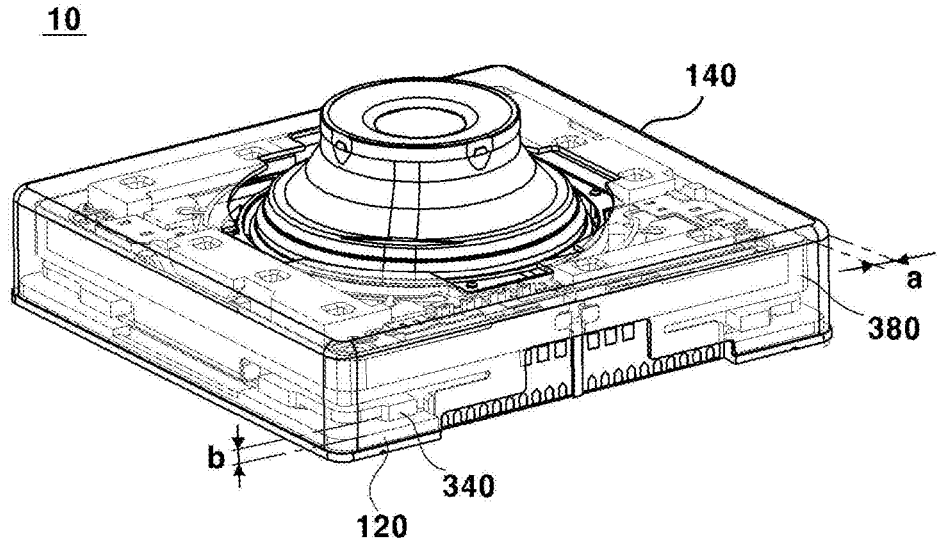
FIG. 4 is a see-through view of a camera device according to a first embodiment of the present invention.
Figure 6:
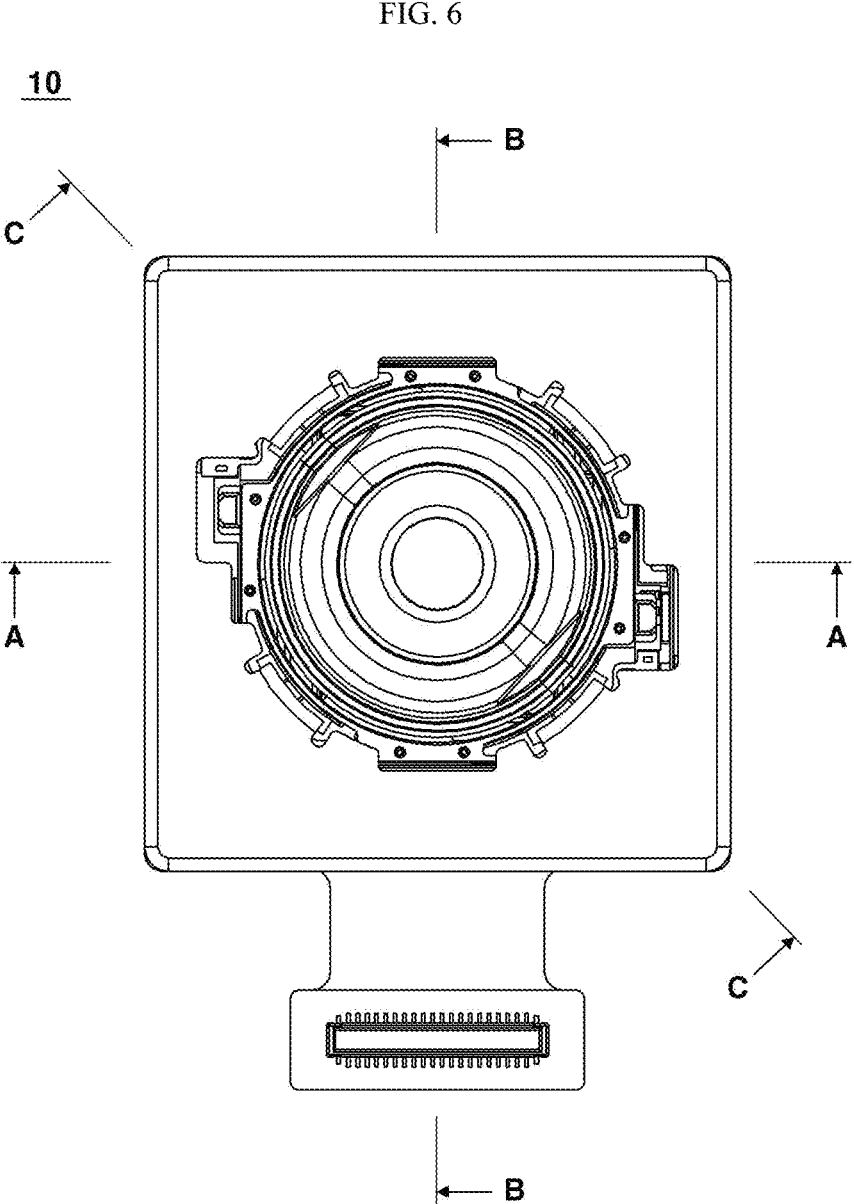
FIG. 6 is a plan view of a camera device according to a first embodiment of the present invention.
Figure 7:
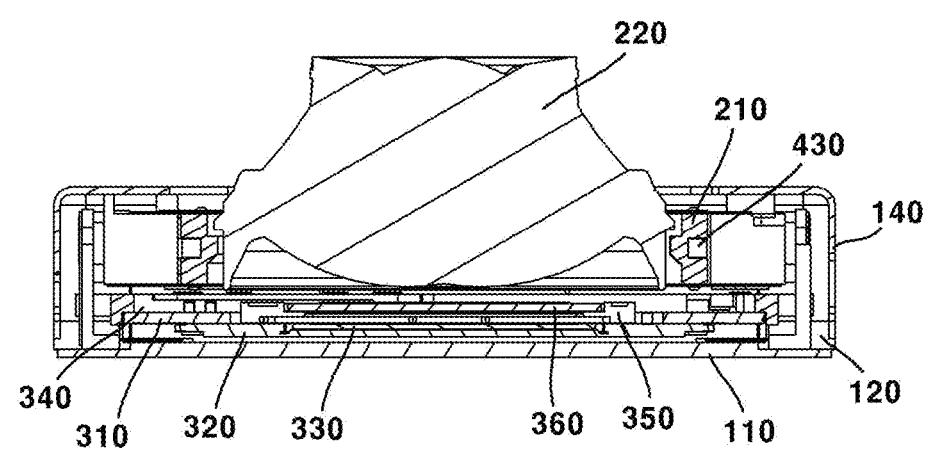
FIG. 7 is a cross-sectional view taken along line A-A in FIG. 6.
Figure 8:
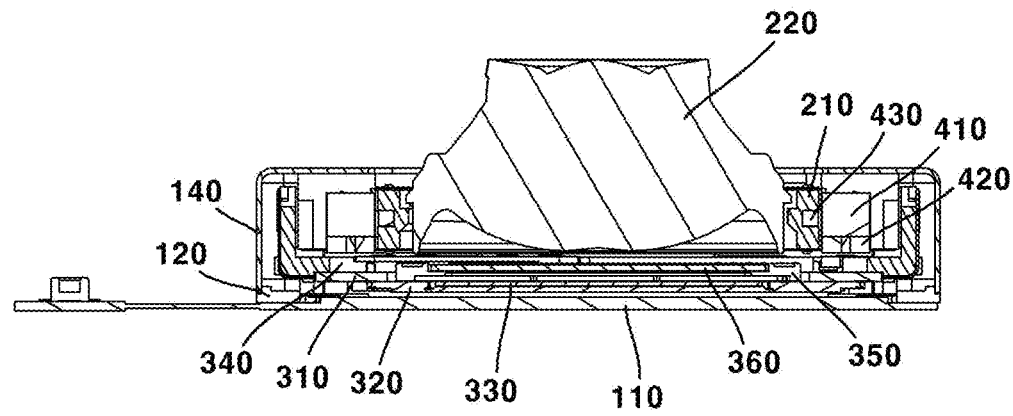
FIG. 8 is a cross-sectional view taken along line B-B in FIG. 6.
Figure 9:
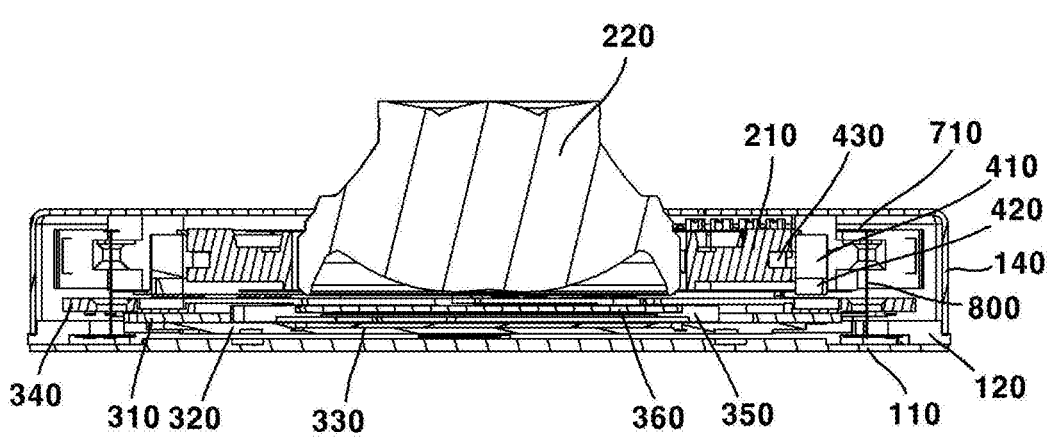
FIG. 9 is a cross-sectional view taken along line C-C in FIG. 6.
Figure 10:
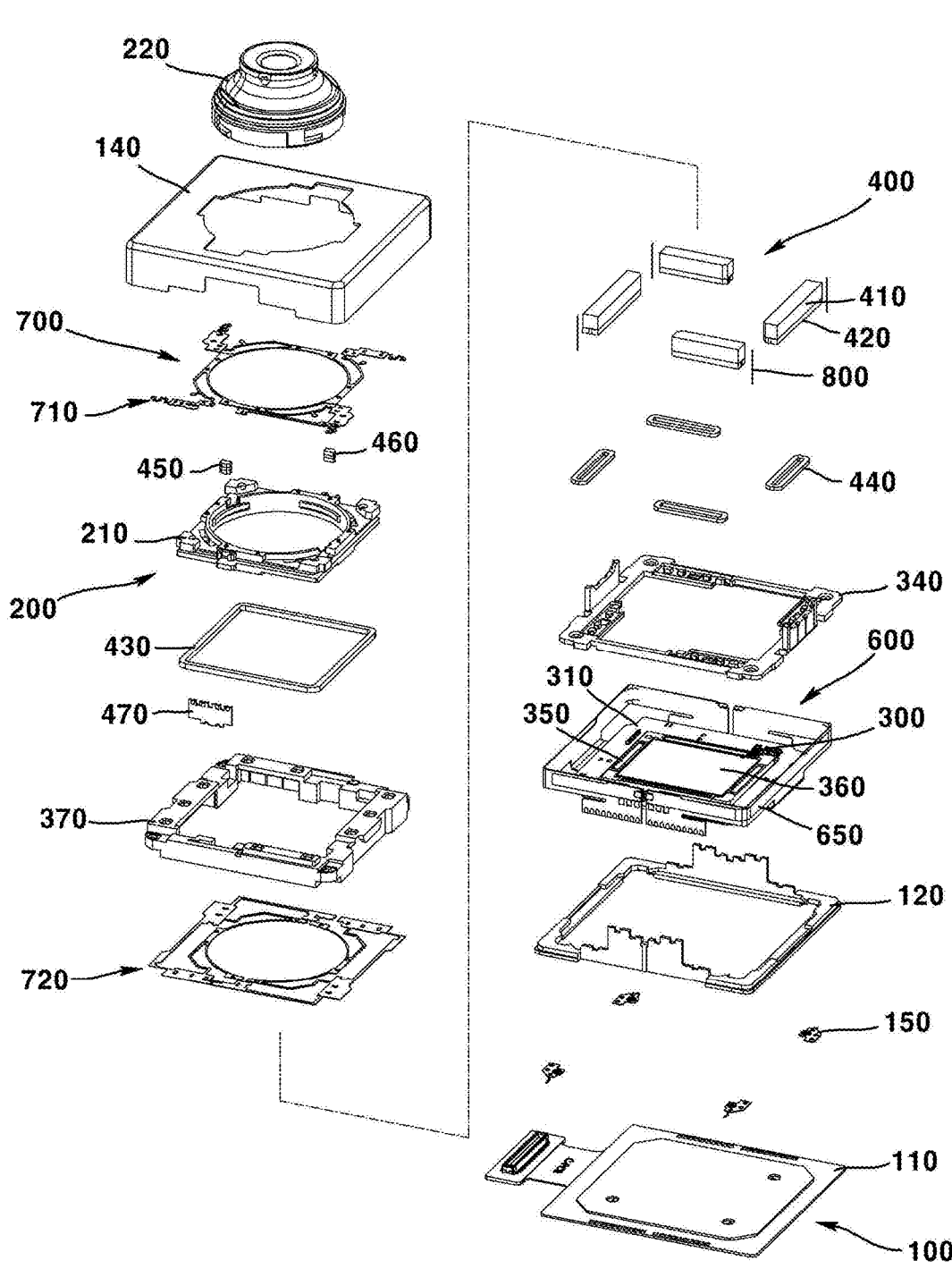
FIG. 10 is an exploded perspective view of a camera device according to a first embodiment of the present invention.
Figure 11:
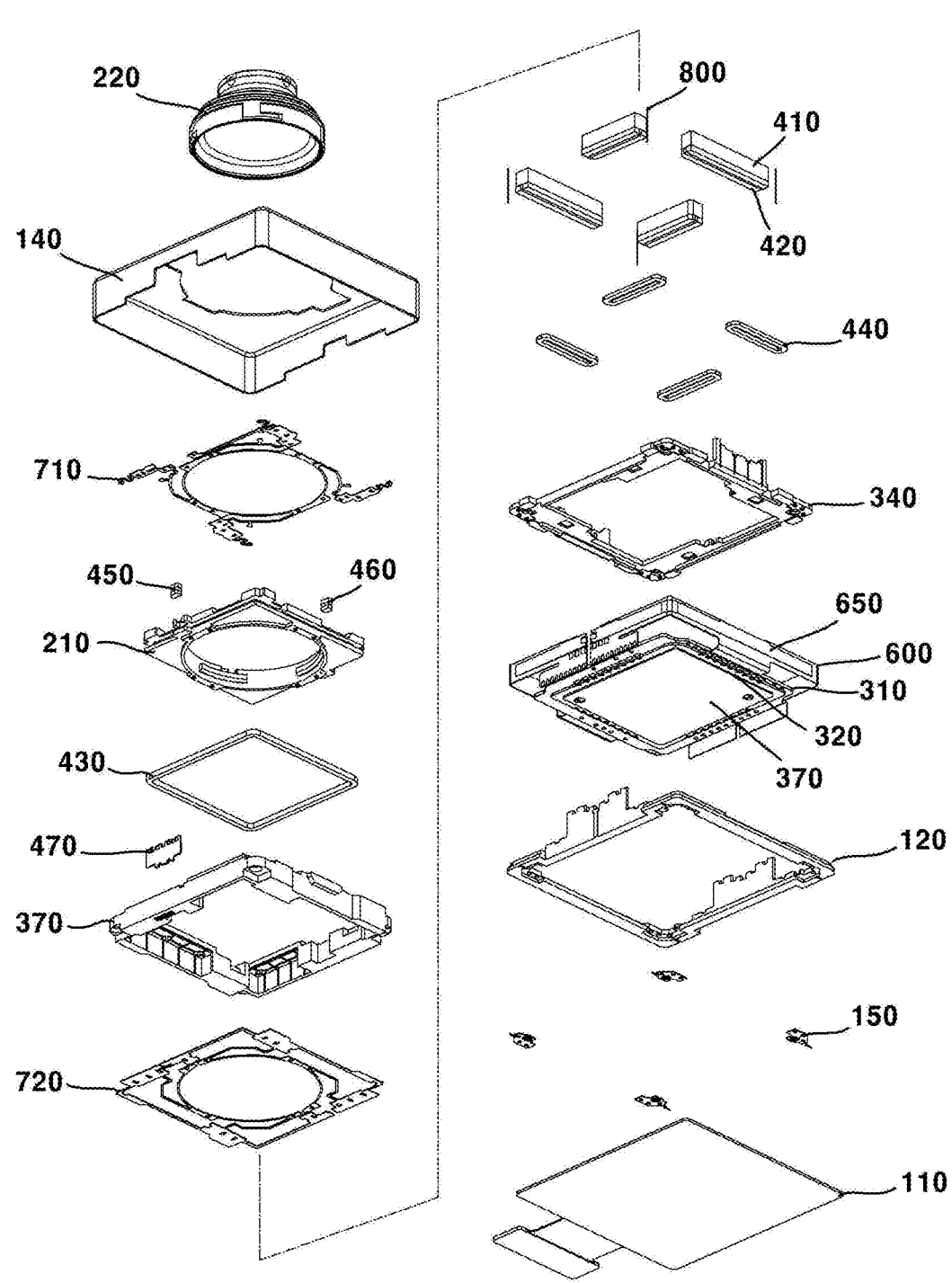
FIG. 11 is an exploded perspective view of the camera device according to a first embodiment of the present invention as viewed from a different direction from that of FIG. 10.
Figure 12:
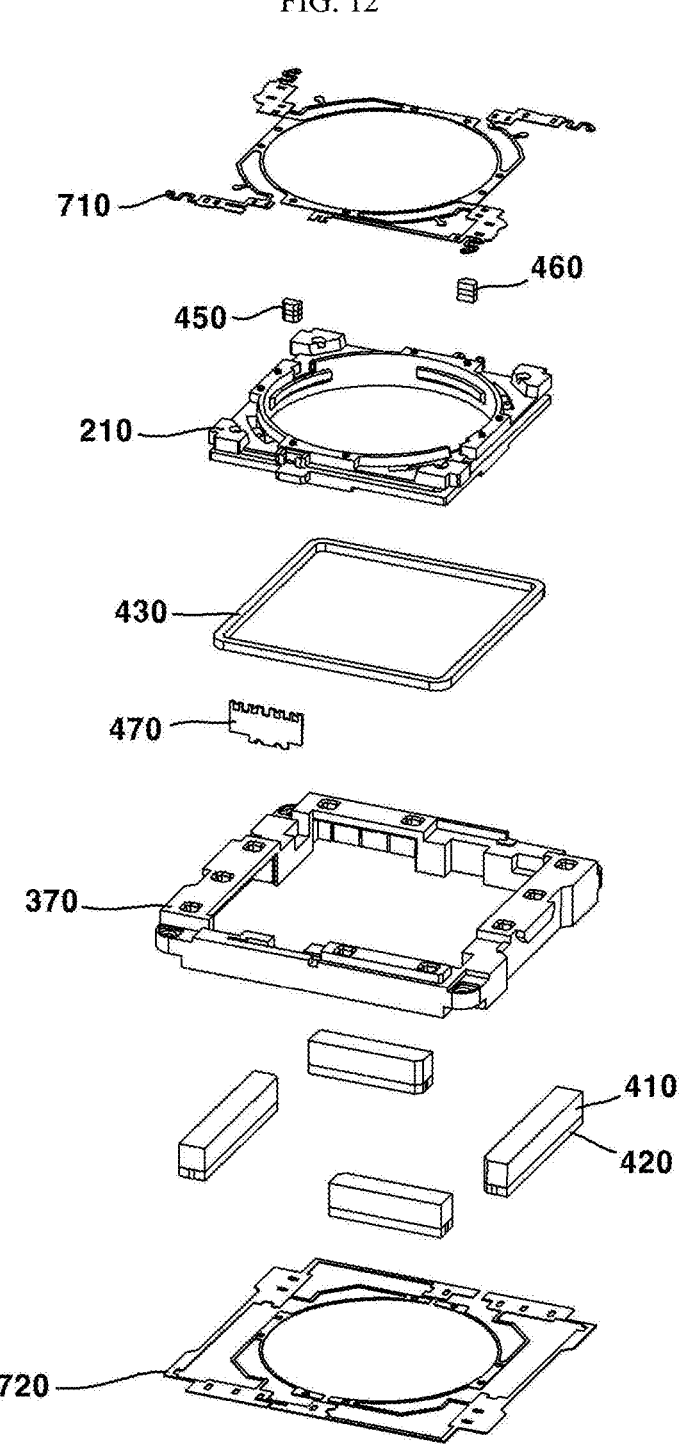
FIG. 12 is an exploded perspective view of a first moving part and related configurations of the camera device according to a first embodiment of the present invention.
Figure 13:
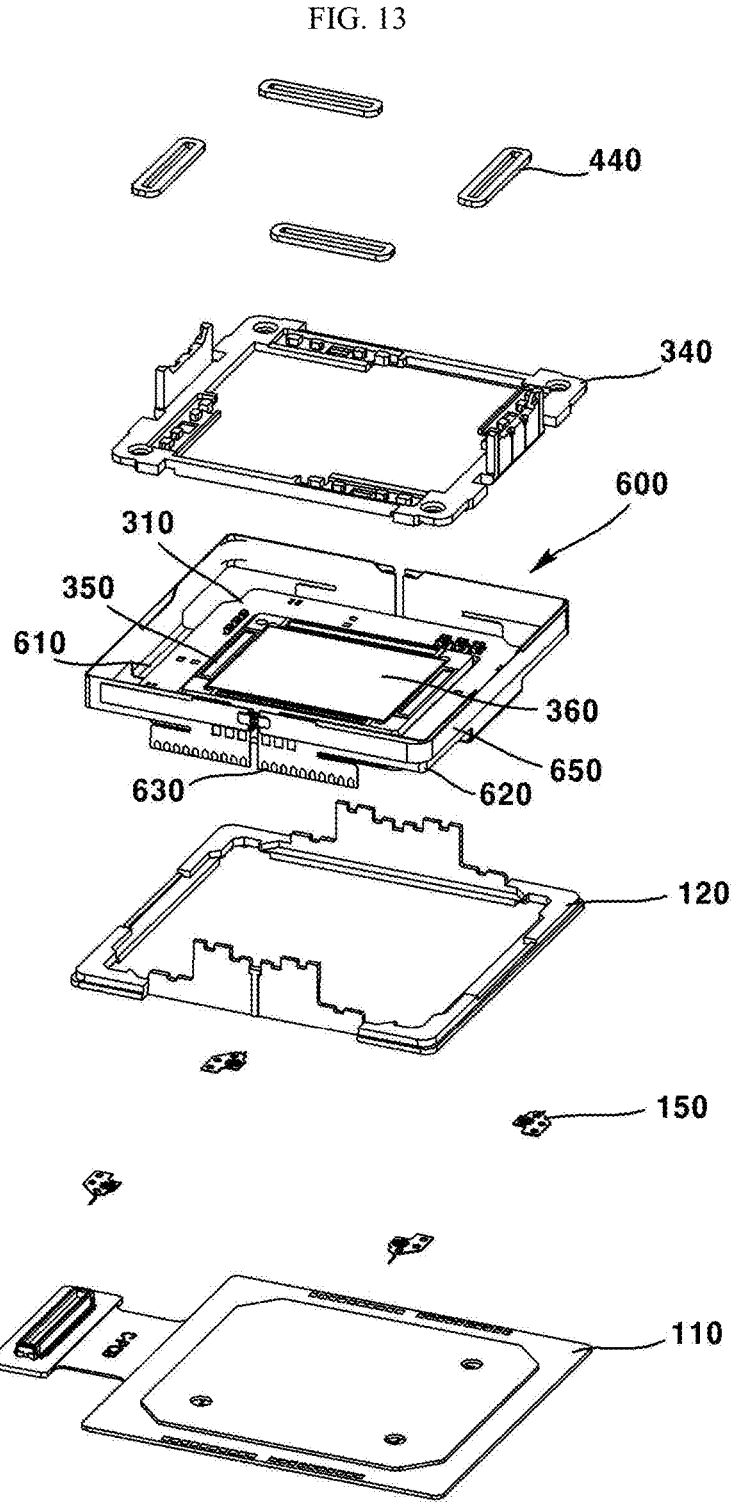
FIG. 13 is an exploded perspective view of a second moving part and related configurations of a camera device according to a first embodiment of the present invention.
Figure 14:
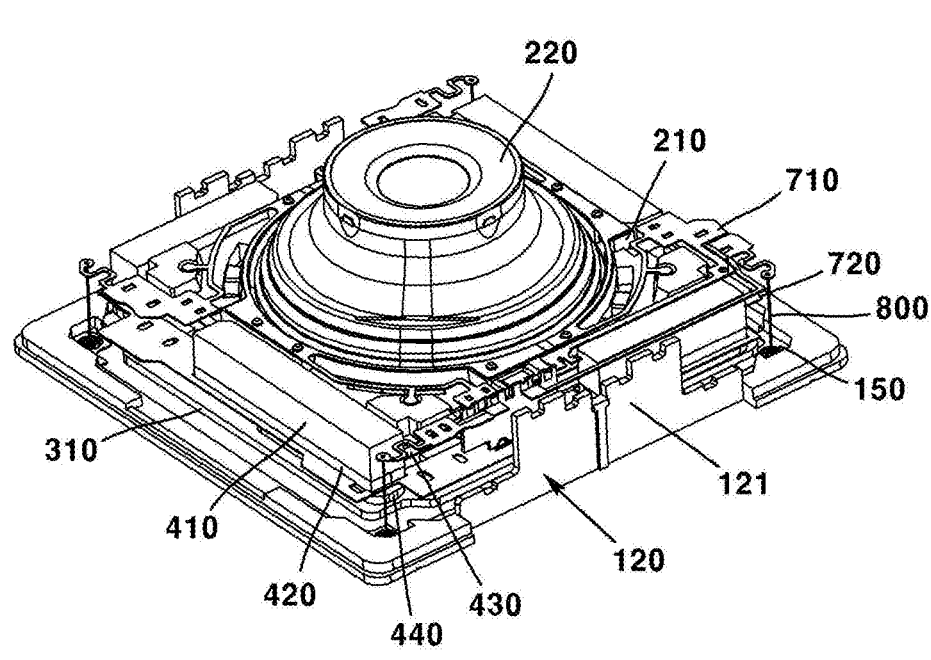
FIG. 14 is a perspective view illustrating a state in which a cover member, a housing, and a connecting substrate are omitted in a camera device according to a first embodiment of the present invention.
Figure 15:
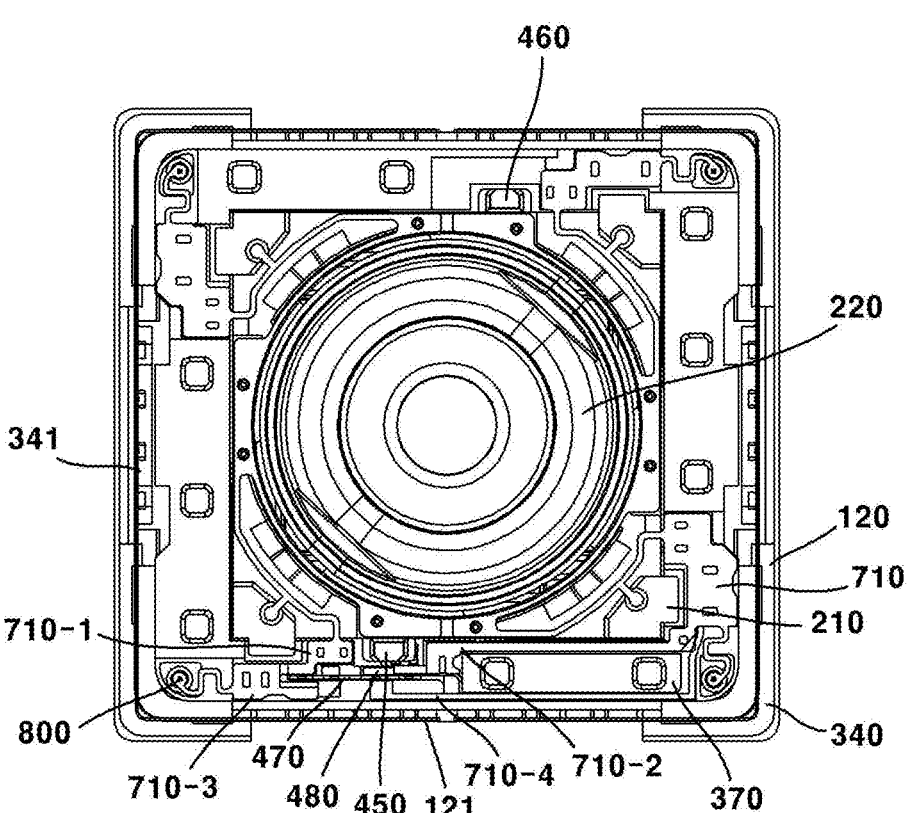
FIG. 15 is a plan view illustrating a state in which a cover member and a connecting substrate are omitted in a camera device according to a first embodiment of the present invention.
Figure 16:
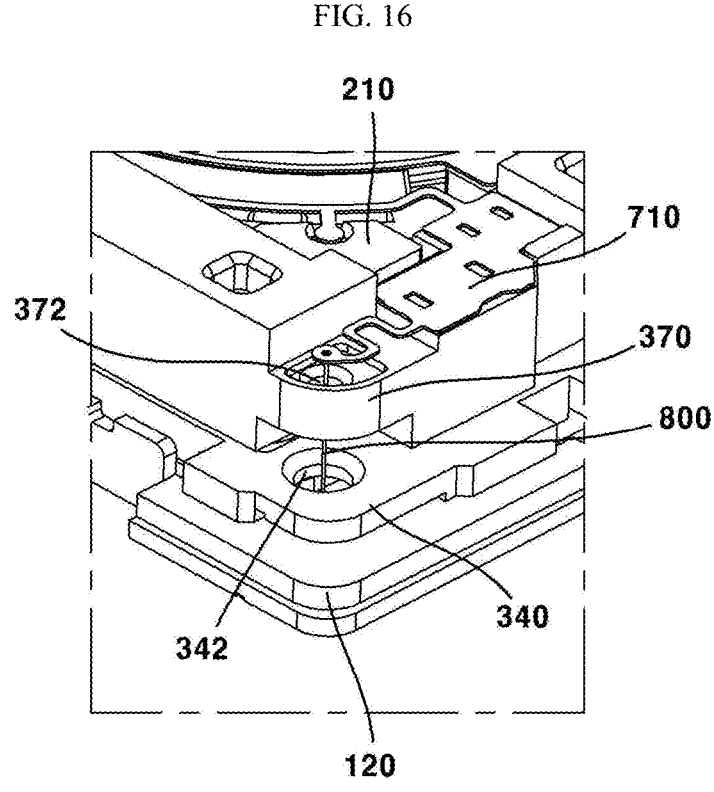
FIG. 16 is an enlarged partially enlarged perspective view of a portion of FIG. 15.
Figure 17A:
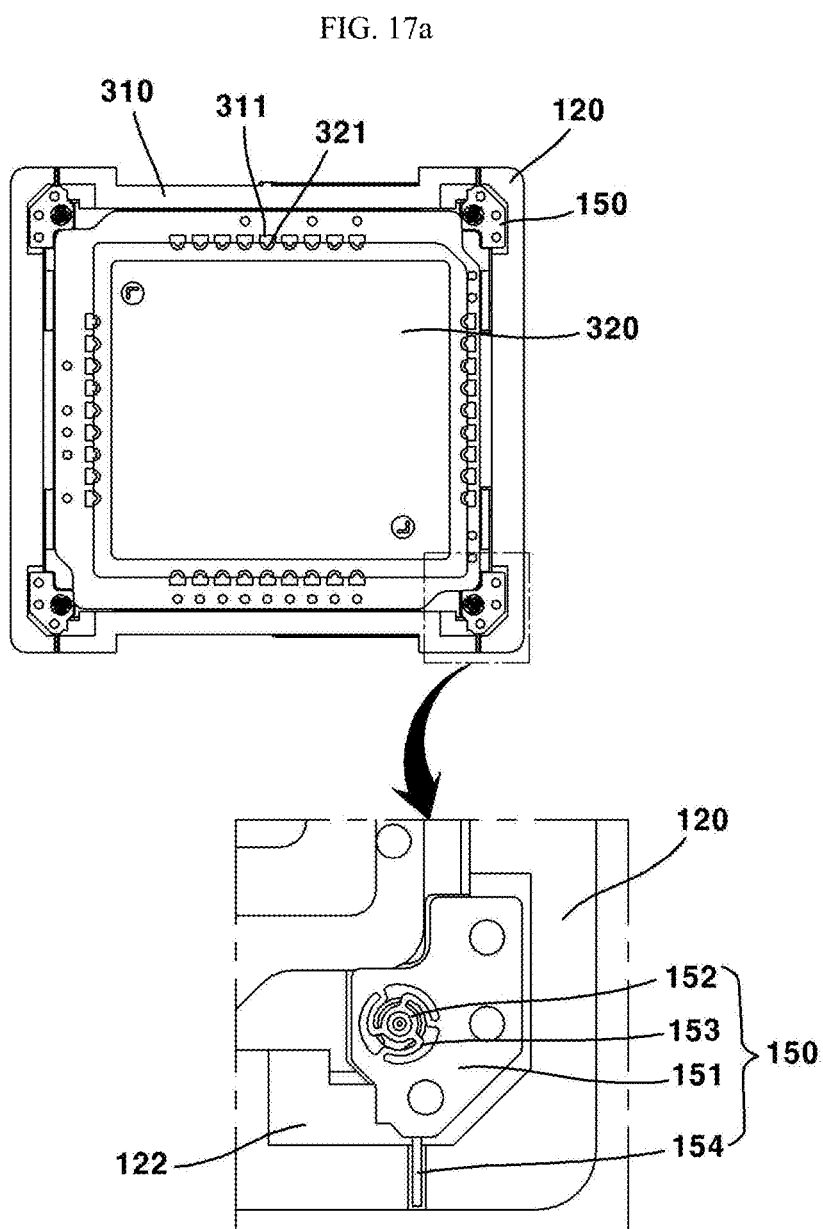
FIG. 17a is a bottom view and a partially enlarged view of a camera device according to a first embodiment of the present invention.
Figure 17B:
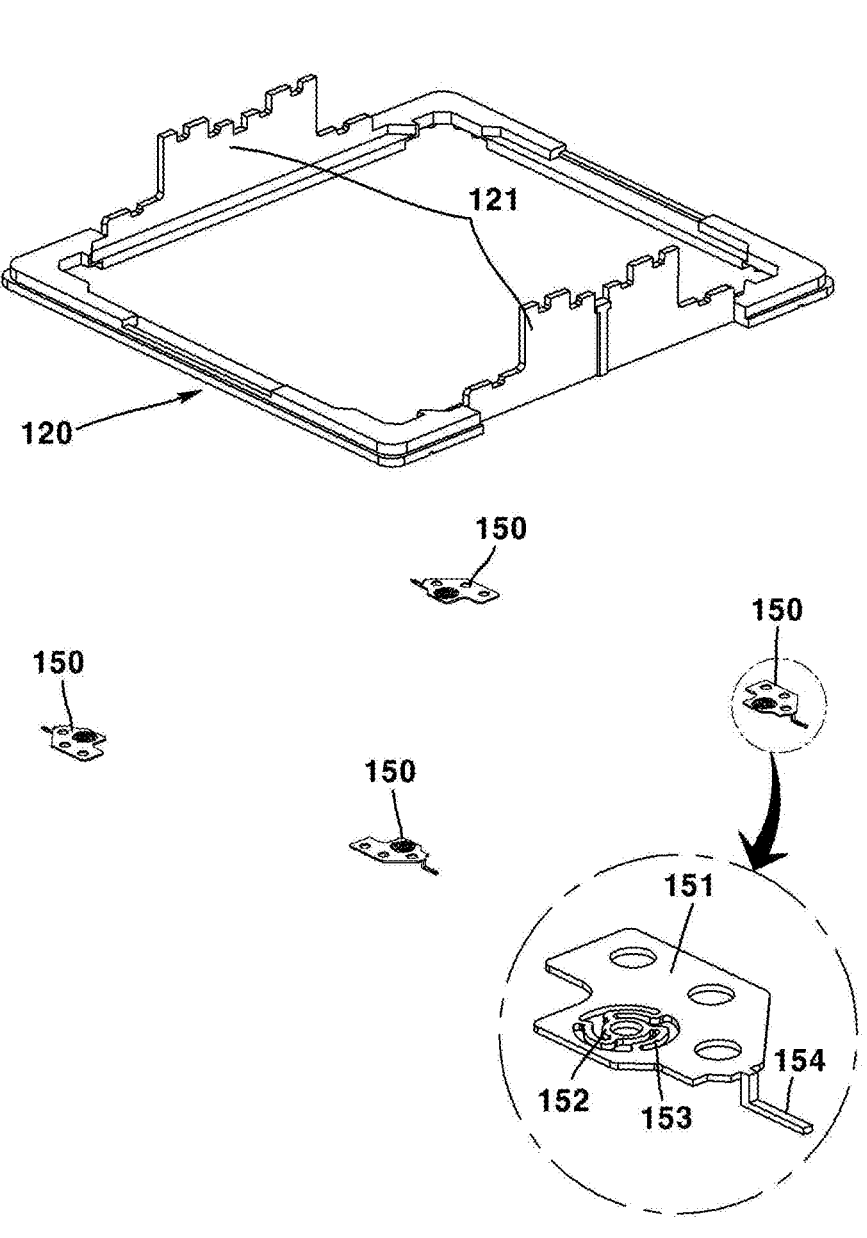
FIG. 17c is an exploded perspective view and a partially enlarged view of FIG. 17b when viewed from another direction.
Figure 17C:
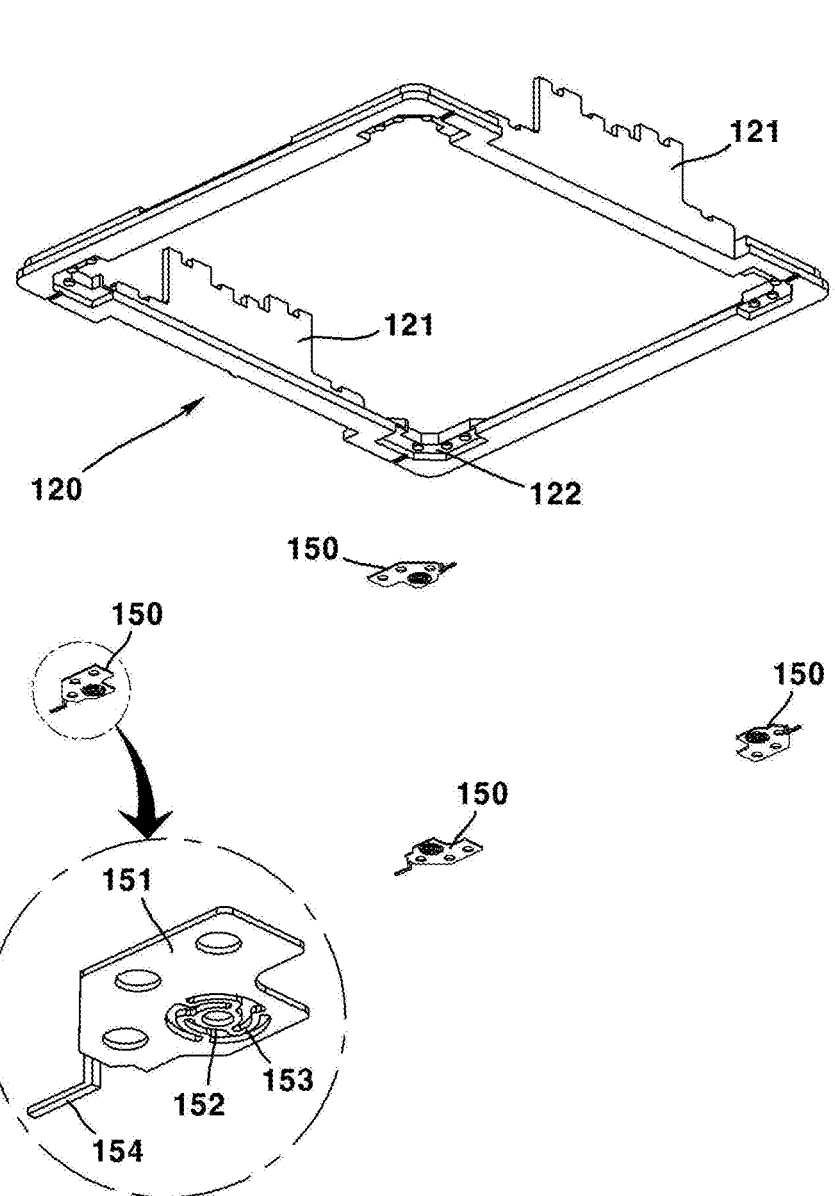
Figure 18:
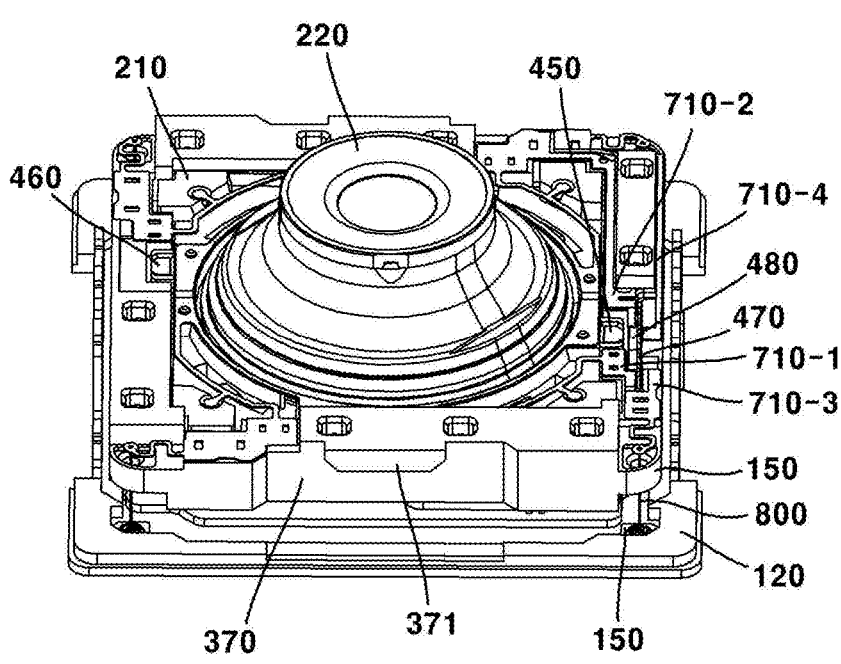
FIG. 18 is a perspective view illustrating a state in which a cover member, a holder, and a connecting substrate are omitted in a camera device according to a first embodiment of the present invention.
Figure 19:
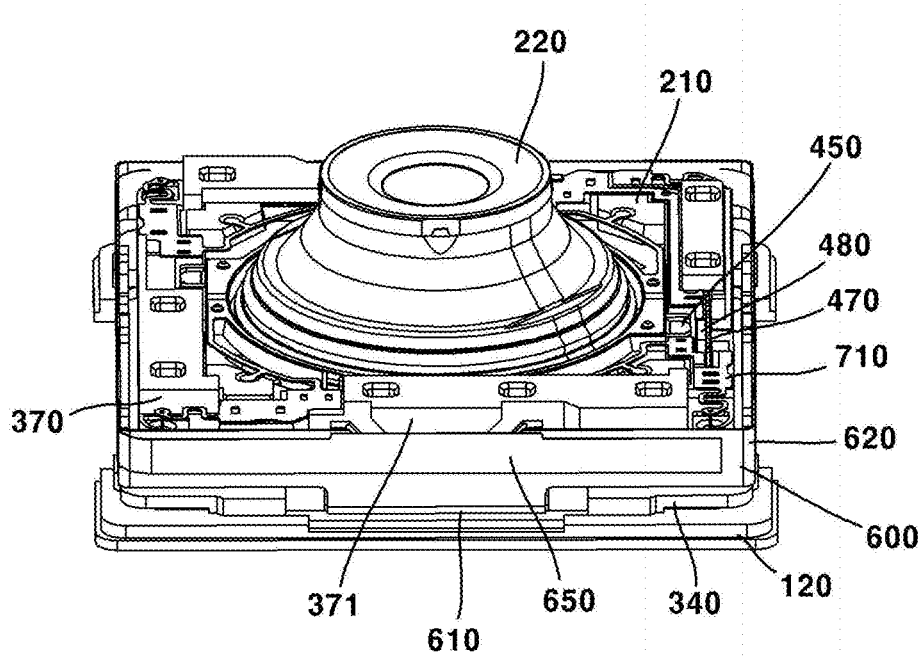
FIG. 19 is a perspective view illustrating a state in which a cover member is omitted from the camera device according to a first embodiment of the present invention.
Figure 20:
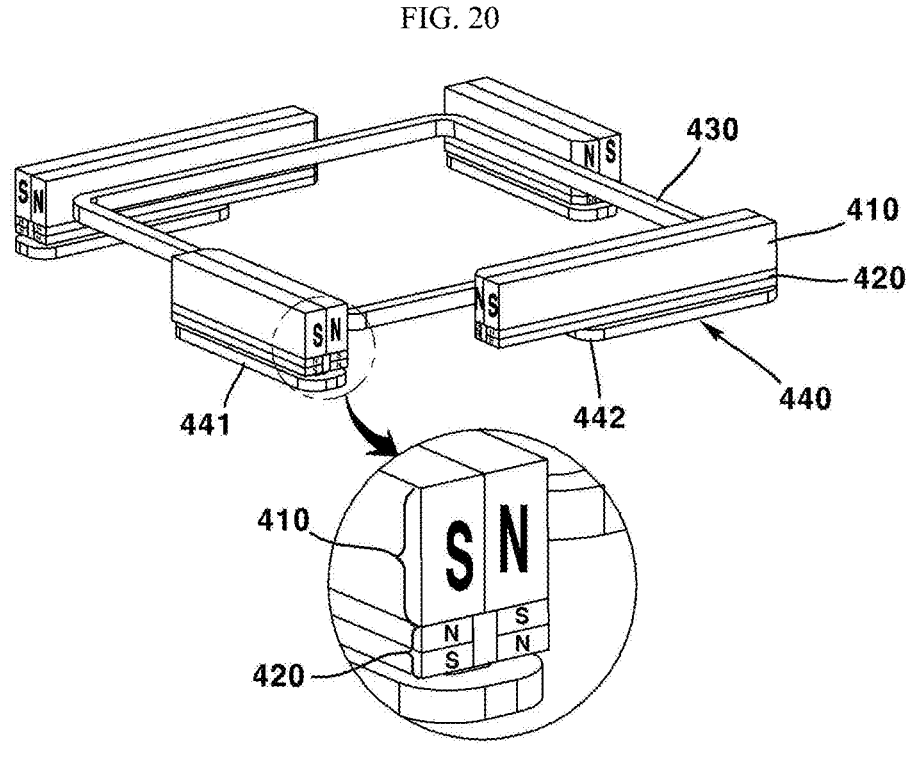
FIG. 20 is a perspective view illustrating a magnet and a coil of a camera device according to a first embodiment of the present invention.
Figure 21:
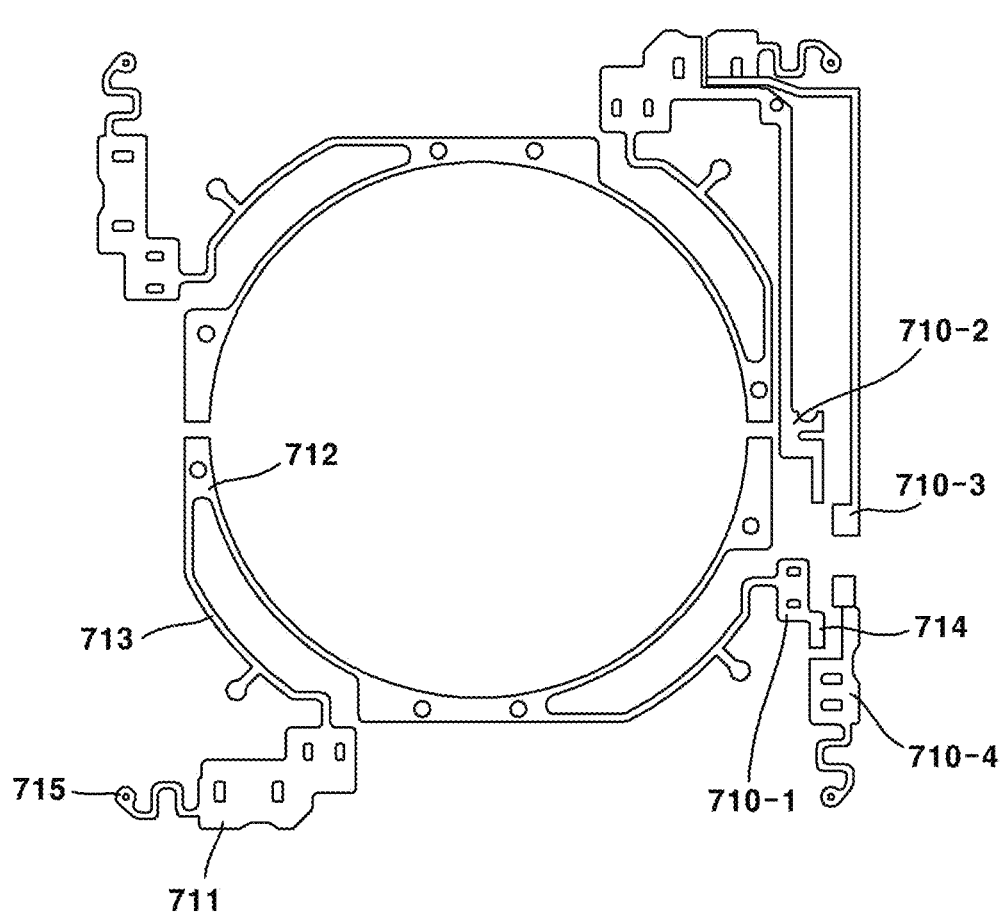
FIG. 21 is a plan view illustrating an upper elastic member of a camera device according to a first embodiment of the present invention.
Figure 22:
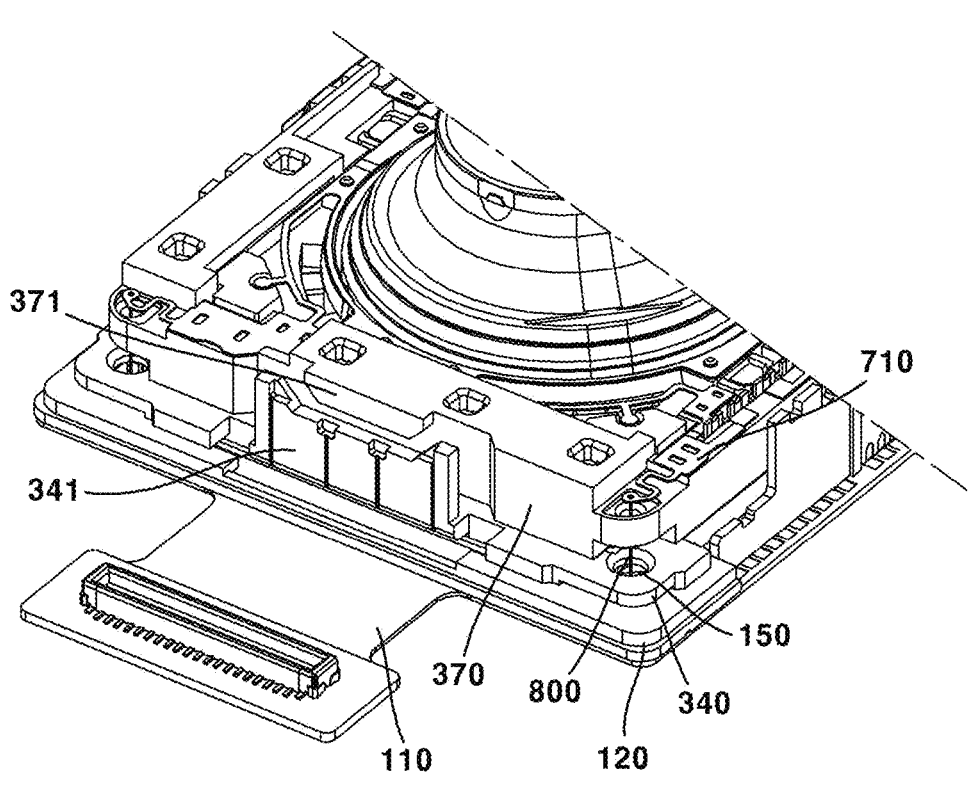
FIG. 22 is a perspective view illustrating a gap between a housing and a holder of a camera device according to a first embodiment of the present invention.
Figure 23:
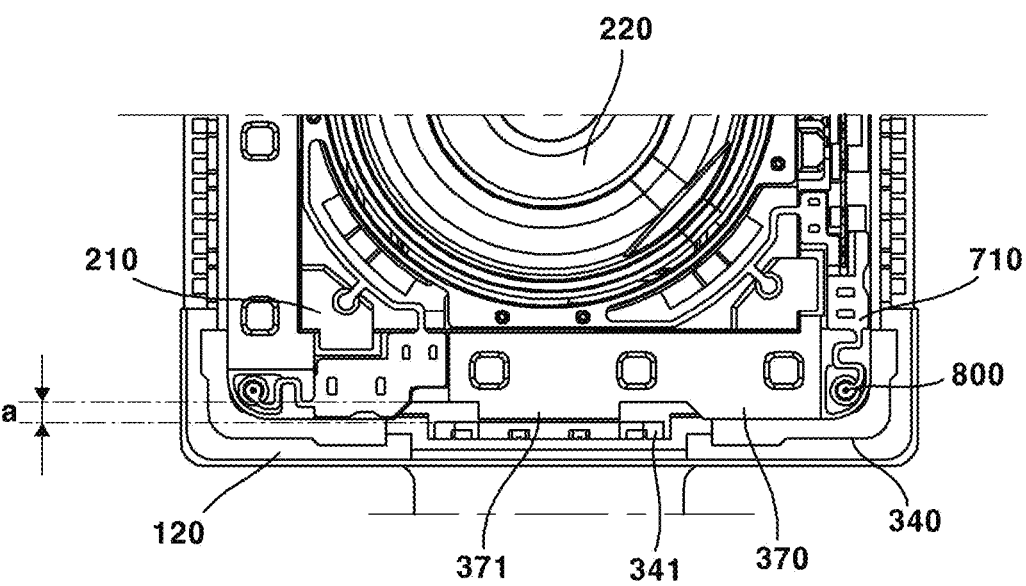
FIG. 23 is a plan view illustrating a gap between a housing and a holder of a camera device according to a first embodiment of the present invention.
Figure 24:
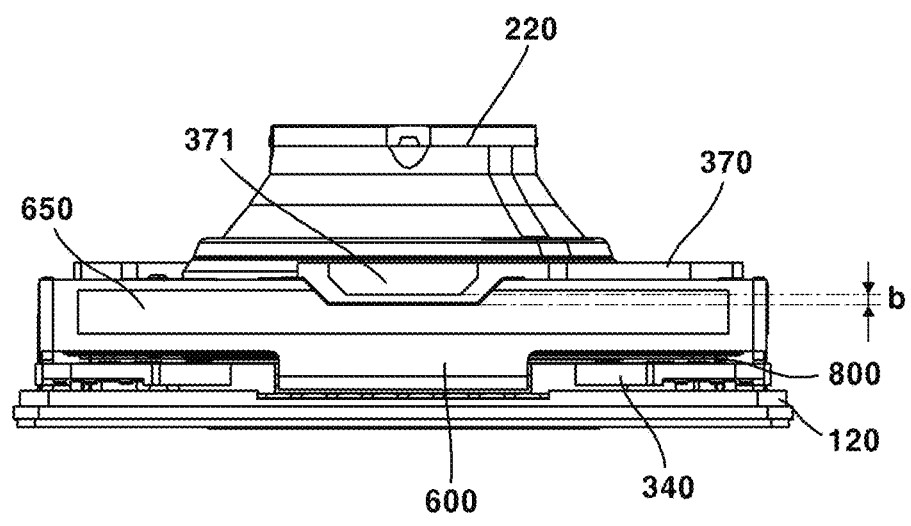
FIG. 24 is a side view illustrating a gap between a housing and a holder of a camera device according to a first embodiment of the present invention.

FIGS. 1*a* and 1*b* are conceptual diagrams illustrating structures for performing OIS function according to a comparative example, and FIG. 1*c* is a conceptual diagram illustrating a structure for performing OIS function according to a first embodiment of the present invention; FIG. 2 is a conceptual diagram illustrating the operation of a camera device according to a first embodiment of the present invention; FIG. 3 is a perspective view of a camera device according to a first embodiment of the present invention; FIG. 4 is a see-through view of a camera device according to a first embodiment of the present invention; FIG. 5 is a perspective view illustrating a state in which a cover member is omitted in a camera device according to a first embodiment of the present invention; FIG. 6 is a plan view of a camera device according to a first embodiment of the present invention; FIG. 7 is a cross-sectional view taken along line A-A in FIG. 6; FIG. 8 is a cross-sectional view taken along line B-B in FIG. 6; FIG. 9 is a cross-sectional view taken along line C-C in FIG. 6; FIG. 10 is an exploded perspective view of a camera device according to a first embodiment of the present invention; FIG. 11 is an exploded perspective view of the camera device according to a first embodiment of the present invention as viewed from a different direction from that of FIG. 10; FIG. 12 is an exploded perspective view of a first moving part and related configurations of the camera device according to a first embodiment of the present invention; FIG. 13 is an exploded perspective view of a second moving part and related configurations of a camera device according to a first embodiment of the present invention; FIG. 14 is a perspective view illustrating a state in which a cover member, a housing, and a connecting substrate are omitted in a camera device according to a first embodiment of the present invention; FIG. 15 is a plan view illustrating a state in which a cover member and a connecting substrate are omitted in a camera device according to a first embodiment of the present invention; FIG. 16 is an enlarged partially enlarged perspective view of a portion of FIG. 15; FIG. 17*a* is a bottom view and a partially enlarged view of a camera device according to a first embodiment of the present invention; FIG. 17*c* is an exploded perspective view and a partially enlarged view of FIG. 17*b* when viewed from another direction; FIG. 18 is a perspective view illustrating a state in which a cover member, a holder, and a connecting substrate are omitted in a camera device according to a first embodiment of the present invention; FIG. 19 is a perspective view illustrating a state in which a cover member is omitted from the camera device according to a first embodiment of the present invention; FIG. 20 is a perspective view illustrating a magnet and a coil of a camera device according to a first embodiment of the present invention; FIG. 21 is a plan view illustrating an upper elastic member of a camera device according to a first embodiment of the present invention;

FIG. 22 is a perspective view illustrating a gap between a housing and a holder of a camera device according to a first embodiment of the present invention; FIG. 23 is a plan view illustrating a gap between a housing and a holder of a camera device according to a first embodiment of the present invention; and FIG. 24 is a side view illustrating a gap between a housing and a holder of a camera device according to a first embodiment of the present invention.

Referring to FIG. 1a, it can be confirmed that in the first comparative example, the image sensor 330a is fixed and the lens 220a is moved in a direction perpendicular to the optical axis direction in order to perform optical image stabilization (OIS), that is, handshake correction. Referring to FIG. 1b, it can be confirmed that in the second comparative example, the lens 220b is fixed and the image sensor 330b is moved in a direction perpendicular to the optical axis direction in order to perform OIS. Referring to FIG. 1c, it can be confirmed that in a first embodiment of the present invention, the lens 220 is moved in a first direction perpendicular to the optical axis direction, and the image sensor 330 may be moved in a second direction perpendicular to the optical axis direction and opposite to the first direction in order to perform OIS.

In a first embodiment of the present invention, in order to perform OIS, the lens 220 is moved in a first direction perpendicular to the optical axis direction, and the image sensor 330 may be moved in a second direction perpendicular to the optical axis direction and opposite to the first direction. However, as a modified embodiment, as in comparative examples 1 and 2, only one of the lens 220 and the image sensor 330 may be moved in order to perform OIS.

As illustrated in FIG. 2, in a camera device 10 according to a first embodiment of the present invention, the lens 220 may move in an optical axis direction and in a direction perpendicular to the optical axis direction (refer to a in FIG. 2). In more detail, the lens 220 may move in an optical axis direction for auto focus (AF), that is, auto focus driving. In addition, the lens 220 may move in a direction perpendicular to the optical axis direction for OIS driving. In a camera device 10 according to a first embodiment of the present invention, the image sensor 330 may move in a direction perpendicular to the optical axis direction (refer to b in FIG. 2). Furthermore, the image sensor 330 and the lens 220 may move in a direction opposite to each other with respect to the optical axis.

The camera device 10 may photograph any one or more of a video and an image. The camera device 10 may be a camera. The camera device 10 may be a camera module. The camera device 10 may be a camera assembly. The camera device 10 may be a camera unit. The camera device 10 may comprise a lens driving device. The camera device 10 may comprise a sensor driving device. The camera device 10 may comprise a voice coil motor (VCM). The camera device 10 may comprise an auto focus assembly. The camera device 10 may comprise a handshake correction assembly. The camera device 10 may comprise an autofocus device. The camera device 10 may comprise a handshake correction device. The camera device 10 may comprise an actuator. The camera device 10 may comprise a lens driving actuator. The camera device 10 may comprise a sensor driving actuator. The camera device 10 may comprise an auto focus actuator. The camera device 10 may comprise a handshake correction actuator.

The camera device 10 may comprise a fixed part 100. The fixed part 100 may be a part relatively fixed when the moving parts 200 and 300 are being moved. The fixed part 100 may be a part relatively fixed when at least one of the first moving part 200 and the second moving part 300 is being moved. The fixed part 100 may accommodate the first moving part 200 and the second moving part 300. The fixed part 100 may be disposed at an outer side of the first moving part 200 and the second moving part 300.

Although the first substrate 110 has been described as one configuration of the fixed part 100 throughout the specification, the first substrate 110 may be understood as a separate configuration from the fixed part 100. The fixed part 100 may be disposed in the first substrate 110. The fixed part 100 may be disposed on the first substrate 110. The fixed part 100 may be disposed above the first substrate 110.

The camera device 10 may comprise a first substrate 110. The fixed part 100 may comprise a first substrate 110. The first substrate 110 may be a main substrate. The first substrate 110 may be a substrate. The first substrate 110 may be a printed circuit board (PCB). The first substrate 110 may be connected to a power source of the optical apparatus 1. The first substrate 110 may comprise a connector connected to the power source of the optical apparatus 1.

The camera device 10 may comprise a base 120. The fixed part 100 may comprise a base 120. The base 120 may be disposed in the first substrate 110. The base 120 may be disposed on the first substrate 110. The base 120 may be disposed above the first substrate 110. The base 120 may be fixed to the first substrate 110. The base 120 may be coupled to the first substrate 110. The base 120 may be attached to the first substrate 110 by an adhesive. The base 120 may be disposed between the first substrate 110 and the housing 370.

The connection substrate 600 may be disposed in the base 120. The connection substrate 600 may be connected to the base 120. The connection substrate 600 may be fixed to the base 120. The connection substrate 600 may be coupled to the base 120. The connection substrate 600 may be attached to the base 120. The connection substrate 600 may be fixed to the base 120 by an adhesive. The connection substrate 600 may be in contact with the base 120.

The base 120 may comprise a protruded part 121. The protruded part 121 may be protruded from an upper surface of the base 120. The protruded part 121 may be protruded upward from an outer side surface of the base 120. The connection substrate 600 may be disposed in the protruded part 121 of the base 120. The connection substrate 600 may be connected to the protruded part 121 of the base 120. The connection substrate 600 may be fixed to the protruded part 121 of the base 120. The connection substrate 600 may be coupled to the protruded part 121 of the base 120. The connection substrate 600 may be attached to the protruded part 121 of the base 120. The connection substrate 600 may be fixed to the protruded part 121 of the base 120 by an adhesive. The connection substrate 600 may be in contact with the protruded part 121 of the base 120.

The terminal unit 630 of the connection substrate 1600 may be disposed in the protruded part 121 of the base 120. The terminal unit 630 of the connection substrate 600 may be connected to the protruded part 121 of the base 120. The terminal unit 630 of the connection substrate 600 may be fixed to the protruded part 121 of the base 120. The terminal unit 630 of the connection substrate 600 may be coupled to the protruded part 121 of the base 120. The terminal unit 630 of the connection substrate 600 may be attached to the protruded part 121 of the base 120. The terminal unit 630 of the connection substrate 600 may be fixed to the protruded part 121 of the base 120 by an adhesive. The terminal unit 630 of the connection substrate 600 may be in contact with the protruded part 121 of the base 120.

The base 120 may comprise a groove 122. The groove 122 may be recessed from the lower surface of the base 120. The groove 122 may be formed to be concave upwardly on the lower surface of the base 120. A terminal 150 may be disposed in the groove 122. The terminal 150 may be disposed in the groove 122 of the base 120. The terminal 150 may be disposed on the ceiling surface of the groove 122. The terminal 150 may be fixed to the groove 122 of the base 120. The terminal 150 may be attached to the groove 122 of the base 120 by an adhesive. The terminal 150 may comprise a hole in which an adhesive is disposed.

The camera device 10 may comprise a cover member 140. The fixed part 100 may comprise a cover member 140. The cover member 140 may be coupled to the base 120. The cover member 140 may be coupled to the housing 130. The cover member 140 may be coupled to the first substrate 110. The cover member 140 may be fixed to the base 120. The cover member 140 may be fixed to the housing 130. The cover member 140 may be fixed to the first substrate 110. The cover member 140 may cover at least a portion of the base 120. The cover member 140 may cover at least a portion of the housing 370.

The cover member 140 may be a 'cover can' or a 'shield can'. The cover member 140 may be formed of a metal material. The cover member 140 may block electromagnetic interference (EMI). The cover member 140 may be electrically connected to the first substrate 110. The cover member 140 may be grounded to the first substrate 110.

The cover member 140 may comprise an upper plate. The cover member 140 may comprise a hole formed in the upper plate. The hole may be formed at a position corresponding to the lens 220. The cover member 140 may comprise a side plate. The side plate may comprise a plurality of side plates. The side plate may comprise 4 side plates. The side plate may comprise first to fourth side plates. The side plate may comprise first and second side plates being disposed opposite to each other, and third and fourth side plates being disposed opposite to each other. The cover member 140 may comprise a plurality of corners between the plurality of side plates.

Although the cover member 140 has been described as one configuration of the fixed part 100 throughout the specification, the cover member 140 may be understood as a configuration separate from the fixed part 100. The cover member 140 may be coupled to the fixed part 100. The cover member 140 may cover the first moving part 200.

The camera device 10 may comprise a terminal 150. The fixed part 100 may comprise a terminal 150. The terminal 150 may comprise a plate member. The terminal 150 may comprise a metal plate member. The terminal 150 may be coupled to the base 120. The terminal 150 may be coupled to a lower end portion of a wire 800. The terminal 150 may be coupled to the lower surface of the base 120. The terminal 150 may be disposed in the base 120. The terminal 150 may be fixed to the base 120. The terminal 150 may be attached to the base 120 by an adhesive.

The terminal 150 may be coupled to a wire 800. The terminal 150 may be connected to the wire 800 through solder. The terminal 800 may be electrically connected to the wire 800. The terminal 150 may be electrically connected to the first substrate 110. The terminal 150 may be formed of metal. The terminal 150 may comprise a hole through which the wire 800 passes. The terminal 150 may comprise a buffer part for shock mitigation. The terminal 150 may have a shape being bent multiple times. The terminal 150 may comprise a plurality of terminals. The terminal 150 may comprise four terminals being disposed in four corner regions of the base 120.

The terminal 150 may comprise a first portion 151. The first portion 151 may be coupled to the base 120. Terminal 150 may comprise a second portion 152. The second portion 152 may be coupled to the wire 800. The second portion 152 may be disposed inside the first portion 151. The terminal 150 may comprise a third portion 153. The third portion 153 may connect the first portion 151 and the second portion 152. The third portion 153 of the terminal 150 may have a shape bent at least twice. The second portion 152 of the terminal 150 may comprise a hole through which the wire 800 passes. The wire 800 may be coupled to a lower surface of the second portion 152 of the terminal 150 through a conductive member. The conductive member may contain solder. The conductive member may be a member which is electrically conductive. The terminal 150 may comprise a fourth portion 154. The fourth portion 154 may be extended from the first portion 151. The fourth portion 154 may be extended outwardly from the first portion 151. The fourth portion 154 may be connected to the first substrate 110. The fourth portion 154 may be electrically connected to the first substrate 110. At least a portion of the fourth portion 154 may be disposed between the base 120 and the first substrate 110.

The first portion 151 of the terminal 150 may be an outer side portion, the second portion 152 may be an inner side portion, the third portion 153 may be a connection portion, and the fourth portion 154 may be an extension portion.

The camera device 10 may comprise a first moving part 200. The first moving part 200 may move against the fixed part 100. The first moving part 200 may move in an optical axis direction against the fixed part 100. The first moving part 200 may be disposed inside the fixed part 100. The first moving part 200 may be movably disposed inside the fixed part 100. The first moving part 200 may be movably disposed inside the fixed part 100 in an optical axis direction. An auto focus (AF) function may be performed by moving the first moving part 200 in an optical axis direction against the fixed part 100. The first moving part 200 may be disposed on the second moving part 300.

The camera device 10 may comprise a bobbin 210. The first moving part 200 may comprise a bobbin 210. The bobbin 210 may be disposed on the first substrate 110. The bobbin 210 may be disposed above the first substrate 110. The bobbin 210 may be disposed to be spaced apart from the first substrate 110. The bobbin 210 may be disposed inside the housing 370. The bobbin 210 may be disposed at an inner side of the housing 370. At least a portion of the bobbin 210 may be accommodated in the housing 370. The bobbin 210 may be movably disposed in the housing 370. The bobbin 210 may be movably disposed in the housing 370 in an optical axis direction. The bobbin 210 may be coupled to the lens 220. The bobbin 210 may comprise a hollow or a hole. The lens 220 may be disposed in a hollow or hole of the bobbin 210. An outer circumferential surface of the lens 220 may be coupled to an inner circumferential surface of the bobbin 210.

The camera device 10 may comprise a lens 220. The first moving part 200 may comprise a lens 220. The lens 220 may be coupled to the bobbin 210. The lens 220 may be fixed to the bobbin 210. The lens 220 may move integrally with the bobbin 210. The lens 220 may be screw-coupled to the bobbin 210. The lens 220 may be attached to the bobbin 210 by an adhesive. The lens 220 may be disposed at a position corresponding to the image sensor 330. The optical axis of the lens 220 may coincide with the optical axis of the image sensor 330. The optical axis may be the z-axis. The lens 220 may comprise a plurality of lenses. The lens 220 may comprise a 5-element or 6-element lens.

The camera device 10 may comprise a lens module. The lens module may be coupled to the bobbin 210. The lens module may comprise a barrel and one or more lenses 220 disposed inside the barrel.

The camera device 10 may comprise a second moving part 300. The second moving part 300 may move against the fixed part 100. The second moving part 300 may move in a direction perpendicular to the optical axis direction against the fixed part 100. The second moving part 300 may be disposed inside the fixed part 100. The second moving part 300 may be movably disposed inside the fixed part 100. The second moving part 300 may be movably disposed in the fixed part 100 in a direction perpendicular to the optical axis direction. A handshake correction (OIS) function may be performed by moving the second moving part 300 in a direction perpendicular to the optical axis direction against the fixed part 100. The second moving part 300 may be disposed between the first moving part 200 and the first substrate 110.

The camera device 10 may comprise a second substrate 310. The second moving part 300 may comprise a second substrate 310. The second substrate 310 may be a substrate. The second substrate 310 may be a printed circuit board (PCB). The second substrate 310 may be disposed between the first moving part 200 and the first substrate 110. The second substrate 310 may be disposed between the bobbin 210 and the first substrate 110. The second substrate 310 may be disposed between the lens 220 and the first substrate 110. The second substrate 310 may be spaced apart from the fixed part 100. The second substrate 310 may be spaced apart from the fixed part 100 in an optical axis direction and a direction perpendicular to the optical axis direction. The second substrate 310 may move in a direction perpendicular to the optical axis direction. The second substrate 310 may be electrically connected to the image sensor 330. The second substrate 310 may move integrally with the image sensor 330. The second substrate 310 may comprise a hole. An image sensor 330 may be disposed in a hole of the second substrate 310. The second substrate 310 may be coupled to an upper surface of the sensor substrate 320. The second substrate 310 may be disposed on an upper surface of the sensor substrate 320. The second substrate 310 may be fixed to an upper surface of the sensor substrate 320.

The camera device 10 may comprise a substrate unit. The substrate unit may be coupled to the image sensor 330. The substrate unit may comprise a second substrate 310. The substrate unit may comprise a holder 340. The substrate unit may comprise a sensor base 350. The substrate unit may comprise a plate member coupled to the lower surface of the second substrate 310. The image sensor 330 may be disposed on an upper surface of the plate member. The plate member may be replaced with a substrate separate from the second substrate 310.

The second substrate 310 may comprise a terminal 311. The terminal 311 may be disposed on a lower surface of the second substrate 310. The terminal 311 may be coupled to the terminal 321 of the sensor substrate 320. The second substrate 310 may be formed separately from the sensor substrate 320. The second substrate 310 may be formed separately from the sensor substrate 320 to be coupled thereto. The terminal 321 of the sensor substrate 320 may be soldered to the terminal 311 of the second substrate 310.

The camera device 10 may comprise a sensor substrate 320. The second moving part 300 may comprise a sensor substrate 320. The sensor substrate 320 may be a substrate. The sensor substrate 320 may be a printed circuit board (PCB). The sensor substrate 320 may be coupled to the image sensor 330. The sensor substrate 320 may be coupled to the second substrate 310. The sensor substrate 320 may be replaced with a SUS. Or, a hole for accommodating the image sensor 330 may be formed in the sensor substrate 320, and a SUS may be additionally disposed on a lower surface of the sensor substrate 320.

The sensor substrate 320 may comprise a terminal 321. The terminal 321 of the sensor substrate 320 may be coupled to the terminal 311 of the second substrate 310. The sensor substrate 320 may be coupled to a lower surface of the second substrate 310. The sensor substrate 320 may be disposed below the second substrate 310. The sensor substrate 320 may be coupled below the second substrate 310 in a state being coupled with the image sensor 330.

The camera device 10 may comprise an image sensor 330. The second moving part 300 may comprise an image sensor 330. The image sensor 330 may be disposed in the sensor substrate 320. The image sensor 330 may be disposed between the sensor substrate 320 and the sensor holder 350. The image sensor 330 may be electrically connected to the second substrate 310. The image sensor 330 may move integrally with the second substrate 310. The image sensor 330 may be disposed below the lens 220.

An image may be formed when light passing through the lens 220 and the filter 360 is incident on the image sensor 330. The image sensor 330 may be electrically connected to the sensor substrate 320, the second substrate 310, and the first substrate 110. The image sensor 330 may comprise an effective image area. The image sensor 330 may convert light irradiated to the effective image area into an electrical signal. The image sensor 330 may comprise any one or more among a charge coupled device (CCD), a metal oxide semiconductor (MOS), a CPD, and a CID.

The camera device 10 may comprise a holder 340. The second moving part 300 may comprise a holder 340. The holder 340 may be formed of an insulating material. The holder 340 may be disposed in the second substrate 310. The holder 340 may be disposed on the second substrate 310. The holder 340 may be disposed above the second substrate 310. The holder 340 may be fixed to the second substrate 310. The holder 340 may be coupled to the second substrate 310. The holder 340 may comprise a hollow or a hole in which the image sensor 330 is disposed. A second coil 440 may be disposed in the holder 340. The holder 340 may comprise a protrusion on which the second coil 440 is wound. The holder 340 may comprise a hole in which the Hall sensor 445 is disposed.

A connection substrate 600 may be disposed in the holder 340. The connection substrate 600 may be connected to the holder 340. The connection substrate 600 may be fixed to the holder 340. The connection substrate 600 may be coupled to the holder 340. The connection substrate 600 may be attached to the holder 340. The connection substrate 600 may be fixed to the holder 340 by an adhesive. The connection substrate 600 may be in contact with the holder 340.

The holder 340 may comprise a protruded part 341. The protruded part 341 may be protruded from an upper surface of the holder 340. The protruded part 341 may be protruded upward from the outer side surface of the holder 340. The connection substrate 600 may be disposed in the protruded part 341 of the holder 340. The connection substrate 600 may be connected to the protruded part 341 of the holder 340. The connection substrate 600 may be fixed to the protruded part 341 of the holder 340. The connection substrate 600 may be coupled to the protruded part 341 of the holder 340. The connection substrate 600 may be attached to the protruded part 341 of the holder 340. The connection substrate 600 may be fixed to the protruded part 341 of the holder 340 by an adhesive. The connection substrate 600 may be in contact with the protruded part 341 of the holder 340.

At least a portion of the connection part 610 and the extension part 620 of the connection substrate 600 may be disposed on the protruded part 341 of the holder 340. At least a portion of the connection part 610 and the extension part 620 of the connection substrate 600 may be connected to the protruded part 341 of the holder 340. At least a portion of the connection part 610 and the extension part 620 of the connection substrate 600 may be fixed to the protruded part 341 of the holder 340. At least a portion of the connection part 610 and the extension part 620 of the connection substrate 600 may be coupled to the protruded part 341 of the holder 340. At least a portion of the connection part 610 and the extension part 620 of the connection substrate 600 may be attached to the protruded part 341 of the holder 340. At least some of the connection part 610 and the extension part 620 of the connection substrate 600 may be fixed to the protruded part 341 of the holder 340 by an adhesive. At least a portion of the connection part 610 and the extension part 620 of the connection substrate 600 may be in contact with the protruded part 341 of the holder 340.

The holder 340 may comprise a hole 342. The wire 800 may pass through the hole 342 of the holder 340. The hole 342 of the holder 340 may be formed to have a larger diameter than the wire 800 so that the holder 340 and the wire 800 do not interfere when the holder 340 is moved. A damper may be disposed in the hole 342 of the holder 340.

The camera device 10 may comprise a sensor base 350. The second moving part 300 may comprise a sensor base 350. The sensor base 350 may be disposed in the sensor substrate 320. The sensor base 350 may comprise a hole formed at a position corresponding to the image sensor 330. The sensor base 350 may comprise a groove in which the filter 360 is disposed.

The camera device 10 may comprise a filter 360. The second moving part 300 may comprise a filter 360. The filter 360 may be disposed between the lens 220 and the image sensor 330. The filter 360 may be disposed in the sensor base 350. The filter 360 may block light having a specific frequency band from being incident on the image sensor 330 from the light passing through the lens 220. The filter 360 may comprise an infrared cut filter. The filter 360 may block infrared rays from being incident on the image sensor 330.

The camera device 10 may comprise a housing 370. The first moving part 200 may comprise a housing 370. Since the housing 370 moves in the opposite direction to the image sensor 330 together with the lens 220 during OIS driving, it may be understood as one configuration of the first moving part 200. The second moving part 300 may comprise a housing 370. The housing 370 may be spaced apart from the base 120. The housing 370 may be disposed on the base 120. The housing 370 may be disposed above the base 120. The housing 370 may be movably disposed against the base 120. The housing 370 may be disposed on the first substrate 110. The housing 370 may be disposed above the first substrate 110. The housing 370 may be spaced apart from the fixed part 100 to be movable against the fixed part 100.

The housing 370 may be spaced apart from the cover member 140 (refer to a in FIG. 4). The housing 370 may be spaced apart from the side plate of the cover member 140. The housing 370 may move inside the cover member 140. The gap between the housing 370 and the cover member 140 may be 0.1 mm. The gap between the housing 370 and the cover member 140 may be 0.08 mm to 0.12 mm. The gap between the housing 370 and the cover member 140 may be 0.05 mm to 0.15 mm.

The housing 370 may be spaced apart from the base 120 (refer to b in FIG. 4). The housing 370 may be spaced apart from the upper surface of the base 120. The housing 370 is movable on the base 120. The gap between the housing 370 and the base 120 may be 0.15 mm. The gap between the housing 370 and the base 120 may be 0.13 mm to 0.17 mm. The gap between the housing 370 and the base 120 may be 0.10 mm to 0.20 mm. The gap between the housing 370 and the base 120 may be greater than the gap between the housing 370 and the cover member 140. The housing 370 may be spaced apart from the first substrate 110.

The housing 370 may comprise a protruded part 371. The protruded part 371 may be formed on an outer side surface of the housing 370. The protruded part 371 may be protruded from an outer side surface of the housing 370. The protruded part 371 may be protruded outward from the side surface of the housing 370.

The protruded part 371 may be disposed on the protruded part 341 of the holder 340. The housing 370 may be spaced apart from the holder 340. The protruded part 371 of the housing 370 may be spaced apart from the protruded part 341 of the holder 340. The outer side surface of the housing 370 may be spaced apart from the protruded part 341 of the holder 340 in a direction perpendicular to the optical axis direction (refer to a in FIG. 23). The protruded part 371 of the housing 370 may be spaced apart from the protruded part 341 of the holder 340 in an optical axis direction. The protruded part 371 of the housing 370 may be spaced apart from the connection substrate 600 in an optical axis direction (refer to b in FIG. 24). The gap between the protruded part 371 of the housing 370 and the protruded part 341 of the holder 340 may be the same as the gap between the protruded part 371 of the housing 370 and the connection substrate 600. The gap between the housing 370 and the holder 340 may be increased or decreased by the movement of the housing 370 and the holder 340.

Figure 50:
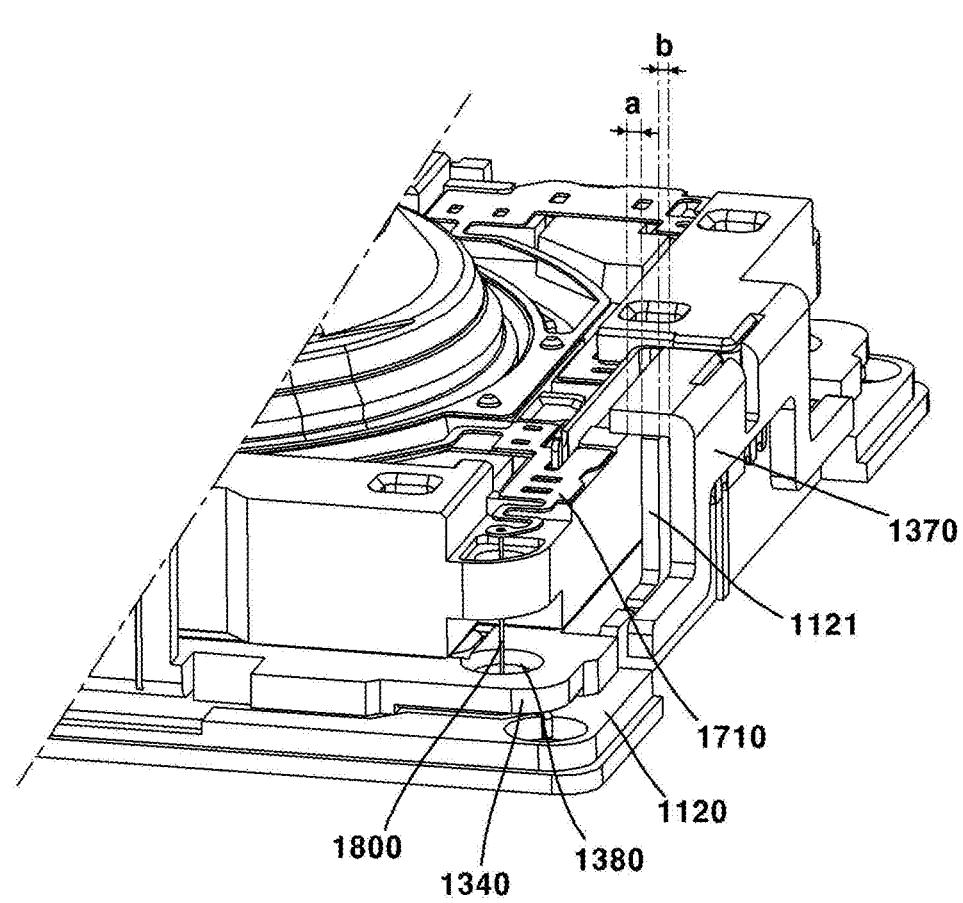
FIG. 50 is a perspective view illustrating a gap between a housing and a base of a camera device according to a second embodiment of the present invention.

The housing 370 according to a first embodiment may comprise a wing portion that is a portion of the wing shape in FIG. 50 of the housing 370 according to a second embodiment. A connection substrate 600 may be disposed between the wing portion of the housing 370 and the protruded part 121 of the base 120.

The housing 370 may comprise a hole 372. The wire 800 may pass through the hole 372 of the housing 370. The hole 372 of the housing 370 may be formed to have a larger diameter than the wire 800 so that the housing 370 and the wire 800 do not interfere when the housing 370 moves. A damper may be disposed in the hole 372 of the housing 370.

The housing 370 may be spaced apart from the base 120. The housing 370 may be spaced apart from the protruded part 121 of the base 120. In a modified embodiment, the housing 370 may comprise a groove in which the protruded part 121 of the base 120 is disposed. The groove of the housing 370 may comprise a first surface facing the inner side surface of the protruded part 121 and a second surface facing the outer side surface of the protruded part 121. The first surface of the groove of the housing 370 and the protruded part 121 of the base 120 may be spaced apart. The second surface of the groove of the housing 370 and the protruded part 121 of the base 120 may be spaced apart. The gap between the housing 370 and the base 120 may be increased or decreased by the movement of the housing 370.

The camera device 10 may comprise a driving unit. The driving unit may drive the first moving part 200 and the second moving part 300. The driving unit may move the moving parts 200 and 300 against the fixed part 100. The driving unit may move the first moving part 200 and the second moving part 300 against the fixed part 100. The driving unit may perform an auto focus (AF) function. The driving unit may perform a handshake correction (OIS) function. The driving unit may move the lens 220. The driving unit may move the image sensor 330. The driving unit may comprise a magnet and a coil. The driving unit may comprise a shape memory alloy (SMA).

In a first embodiment of the present invention, the magnet can move without being arrested. The magnet can move during OIS driving. The magnet is movable. The OIS magnet can move in the opposite direction to the OIS coil.

In a first embodiment of the present invention, the first moving part 200 and the second moving part 300 may move in a direction opposite to each other. At this time, the housing 370 may move opposite the image sensor 330 together with the lens 220. Accordingly, the housing 370 may be understood as the first moving part 200. In a first embodiment of the present invention, the driving unit may move the first moving part 200 and the second moving part 300 in a direction opposite to each other. The driving unit may move the first moving part 200 and the second moving part 300 in a direction opposite to each other with respect to the optical axis. The driving unit may move the first moving part 200 in a first direction. The driving unit may move the second moving part 300 in a second direction opposite to the first direction. At this time, both the first direction and the second direction may be perpendicular to the optical axis direction.

The driving unit may move the lens 220 in the optical axis direction against the image sensor 330 for autofocus driving. The driving unit may move the first moving part 200 and the second moving part 300 in directions perpendicular to the optical axis direction and opposite to each other against the fixed part 100 for handshake correction driving. In a first embodiment of the present invention, the lens spring supporting the movement of the lens 220 may comprise a wire 800 and an upper elastic member 710 which is a leaf spring. A sensor spring supporting the movement of the image sensor 330 may comprise a connection substrate 600 that is an FPCB. In a first embodiment of the present invention, the springs of the sensor shift and the lens shift may be configured independently of each other.

In a first embodiment of the present invention, the first moving part 200 may comprise a housing 370. The first moving part 200 may comprise a bobbin 210 being disposed inside the housing 370 and coupled to the lens 220. The housing 370 may be understood as one configuration of the first moving part 200 by the common point that the housing 370 moves in the same direction as the first moving part 200 during OIS driving. However, during AF driving, the housing 370 may be maintained in a fixed state when the first moving part 200 is moved. In addition, the housing 370 may be understood as one configuration of the second moving part 200 by the common point that it moves during OIS driving. However, the housing 370 may move in a direction opposite to the second moving part 200 during OIS driving. The housing 370 may be understood as one configuration of a moving part.

The driving unit may comprise a first coil 430 being disposed in the bobbin 210. The driving unit may comprise a first magnet 410 being disposed in the housing 370 and disposed at a position corresponding to the first coil 430. As a modified embodiment, the driving unit may comprise a first magnet being disposed in the bobbin 210 and a first coil being disposed in the housing 370 and disposed at a position corresponding to the first magnet.

The second moving part 300 may comprise a holder 340. The second moving part 300 may comprise a second substrate 310 being coupled to the holder 340 and in which the image sensor 330 is disposed.

The driving unit may comprise a second coil 440 being disposed in the holder 340. The driving unit may comprise a second magnet 420 being disposed in the housing 370 and disposed at a position corresponding to the second coil 440. As a modified embodiment, the driving unit may comprise a second magnet being disposed in the holder 340 and a second coil being disposed on the housing 370 and disposed at a position corresponding to the second magnet.

As a modified embodiment, the driving unit may comprise an integral magnet. The driving unit may comprise a magnet. The driving unit may comprise a first coil 430 being disposed in the first moving part 200 and disposed at a position corresponding to the magnet. The driving unit may comprise a second coil 440 being disposed in the second moving part 300 and disposed at a position corresponding to the magnet.

The camera device 10 may comprise a first driving unit. The first driving unit may be an AF driving unit. The first driving unit may move the first moving part 200 in an optical axis direction. The first driving unit may move the bobbin 210 in an optical axis direction. The lens 220 may be moved in an optical axis direction. The first driving unit may perform an auto focus (AF) function. The first driving unit may move the first moving part 200 in an upper direction the optical axis direction. The first driving unit may move the first moving part 200 in a lower direction of the optical axis direction.

The camera device 10 may comprise a second driving unit. The second driving unit may be an OIS driving unit. The second driving unit may move the second moving part 300 in a direction perpendicular to the optical axis direction. The second driving unit may move the second substrate 310 in a direction perpendicular to the optical axis direction. The second driving unit may move the sensor substrate 320 in a direction perpendicular to the optical axis direction. The second driving unit may move the image sensor 330 in a direction perpendicular to the optical axis direction. The second driving unit may move the holder 340 in a direction perpendicular to the optical axis direction. The second driving unit may move the sensor base 350 in a direction perpendicular to the optical axis direction. The second driving unit may move the filter 360 in a direction perpendicular to the optical axis direction. The second driving unit may perform a handshake correction (OIS) function.

The second driving unit may move the second moving part 300 in a first direction perpendicular to the optical axis direction. The second driving unit may move the second moving part 300 in a second direction perpendicular to the optical axis direction and the first direction. The second driving unit may rotate the second moving part 300 about the optical axis.

In a first embodiment of the present invention, the first driving unit may comprise a first coil 430. The second driving unit may comprise a second coil 440. The first driving unit may comprise a first magnet 410. The second driving unit may comprise a second magnet 420. As a modified embodiment, the first driving unit and the second driving unit may comprise a driving magnet being used in common for interaction between the first coil 430 and the second coil 440. That is, the first driving unit and the second driving unit may comprise individually controlled coils and a common magnet.

The camera device 10 may comprise a first magnet 410. The driving unit may comprise a first magnet 410. The first magnet 410 may be a magnet. The first magnet 410 may be a permanent magnet. The first magnet 410 may be a common magnet. The first magnet 410 may be used for auto focusing (AF).

The first magnet 410 may be disposed in the fixed part 100. The first magnet 410 may be fixed to the fixed part 100. The first magnet 410 may be coupled to the fixed part 100. The first magnet 410 may be attached to the fixed part 100 by an adhesive. The first magnet 410 may be disposed in the housing 370. The first magnet 410 may be fixed to the housing 370. The first magnet 410 may be coupled to the housing 370. The first magnet 410 may be attached to the housing 370 by an adhesive. The first magnet 410 may be disposed at a corner of the housing 370. The first magnet 410 may be disposed to be biased toward a corner of the housing 370.

The first magnet 410 may move during OIS driving. The first magnet 410 may move together with the housing 370 during OIS driving. The first magnet 410 may move in a direction perpendicular to the optical axis. The first magnet 410 may rotate about an optical axis.

The first magnet 410 may be a two-pole magnetized magnet comprising one N-pole region and one S-pole region. As a modified embodiment, the first magnet 410 may be a four-pole magnetized magnet comprising two N-pole regions and two S-pole regions.

The first magnet 410 may comprise a plurality of magnets. The first magnet 410 may comprise four magnets. The first magnet 410 may comprise first to fourth magnets. The first to fourth magnets may be disposed symmetrically to the optical axis. The first to fourth magnets may be formed to have the same size and shape.

The camera device 10 may comprise a second magnet 420. The driving unit may comprise a second magnet 420. The second magnet 420 may be a magnet. The second magnet 420 may be a permanent magnet. The second magnet 420 may be a common magnet. The second magnet 420 may be used for handshake correction (OIS).

The second magnet 420 may be disposed in the fixed part 100. The second magnet 420 may be fixed to the fixed part 100. The second magnet 420 may be coupled to the fixed part 100. The second magnet 420 may be attached to the fixed part 100 by an adhesive. The second magnet 420 may be disposed in the housing 370. The second magnet 420 may be fixed to the housing 370. The second magnet 420 may be coupled to the housing 370. The second magnet 420 may be attached to the housing 370 by an adhesive. The second magnet 420 may be disposed at a corner of the housing 370. The second magnet 420 may be disposed to be biased toward a corner of the housing 370.

The second magnet 420 may move during OIS driving. The second magnet 420 may move together with the housing 370 during OIS driving. The second magnet 420 may move in a direction perpendicular to the optical axis. The second magnet 420 may rotate about an optical axis.

The second magnet 420 may be a two-pole magnetized magnet comprising one N-pole region and one S-pole region. As a modified embodiment, the second magnet 420 may be a four-pole magnetized magnet comprising two N-pole regions and two S-pole regions.

In the first embodiment of the present invention, the lens 220 and the image sensor 330 may move in a direction opposite to each other by the second magnet 420. As a modified embodiment, when the first magnet 410 and the second magnet 420 are provided as one magnet, the lens 220 and the image sensor 330 may move in a direction opposite to each other by the magnet.

The second magnet 420 may comprise a plurality of magnets. The second magnet 420 may comprise four magnets. The second magnet 420 may comprise first to fourth magnets. The first to fourth magnets may be disposed symmetrically to the optical axis. The first to fourth magnets may be formed to have the same size and shape.

The second magnet 420 may be disposed below the first magnet 410. The second magnet 420 may be disposed in a lower surface of the first magnet 410. The second magnet 420 may be in contact with a lower surface of the first magnet 410. The second magnet 420 may be fixed to a lower surface of the first magnet 410. The second magnet 420 may be coupled to a lower surface of the first magnet 410 by an adhesive. In the optical axis direction, the length of the second magnet 420 may be shorter than the length of the first magnet 410. The size of the second magnet 420 may be smaller than the length of the first magnet 410.

The camera device 10 may comprise a first coil 430. The driving unit may comprise a first coil 430. The first coil 430 may be disposed in the first moving part 200. The first coil 430 may be fixed to the first moving part 200. The first coil 430 may be coupled to the first moving part 200. The first coil 430 may be attached to the first moving part 200 by an adhesive. The first coil 430 may be disposed in the bobbin 210. The first coil 430 may be fixed to the bobbin 210. The first coil 430 may be coupled to the bobbin 210. The first coil 430 may be attached to the bobbin 210 by an adhesive. The first coil 430 may be electrically connected to the driver IC 480. The first coil 430 may be electrically connected to the lower elastic member 720, the sensing substrate 470, and the driver IC 480. The first coil 430 may receive current from the driver IC 480.

The first coil 430 may be disposed at a position corresponding to the first magnet 410. The first coil 430 may be disposed in the bobbin 210 at a position corresponding to the first magnet 410. The first coil 430 may face the first magnet 410. The first coil 430 may comprise a surface facing the first magnet 410. The first coil 430 may be disposed adjacent to the first magnet 410. The first coil 430 may interact with the first magnet 410. The first coil 430 may electromagnetically interact with the first magnet 410.

The first coil 430 may move the first moving part 200 in an optical axis direction. The first coil 430 may move the bobbin 210 in an optical axis direction. The first coil 430 may move the lens 220 in an optical axis direction. The first coil 430 may move the first moving part 200 in an upper direction of the optical axis direction. The first coil 430 may move the bobbin 210 in an upper direction of the optical axis direction. The first coil 430 may move the lens 220 in an upper direction of the optical axis direction. The first coil 430 may move the first moving part 200 in a lower direction of in the optical axis direction. The first coil 430 may move the bobbin 210 in a lower direction of the optical axis direction. The first coil 430 may move the lens 220 in a lower direction of the optical axis direction. When a current is applied to the first coil 430, the bobbin 210 may move in an optical axis direction against the housing 370.

The camera device 10 may comprise a second coil 440. The driving unit may comprise a second coil 440. The second coil 440 may be disposed in the second moving part 300. The second coil 440 may be fixed to the second moving part 300. The second coil 440 may be coupled to the second moving part 300. The second coil 440 may be attached to the second moving part 300 by an adhesive. The second coil 440 may be disposed in the holder 340. The second coil 440 may be fixed to the holder 340. The second coil 440 may be coupled to the holder 340. The second coil 440 may be attached to the holder 340 by an adhesive. The second coil 440 may be wound around the protrusion of the holder 340. The second coil 440 may be disposed on the holder 340. The second coil 440 may be electrically connected to the second substrate 310. Both ends of the second coil 440 may be soldered to the second substrate 310. The second coil 440 may be electrically connected to the driver IC 495. The second coil 440 may be electrically connected to the second substrate 310 and the driver IC 495. The second coil 440 may receive current from the driver IC 495.

The second coil 440 may be disposed at a position corresponding to the second magnet 420. The second coil 440 may be disposed at a position corresponding to the second magnet 420 in the holder 340. The second coil 440 may face the second magnet 420. The second coil 440 may comprise a surface facing the second magnet 420. The second coil 440 may be disposed adjacent to the second magnet 420. The second coil 440 may interact with the second magnet 420. The second coil 440 may electromagnetically interact with the second magnet 420.

The second coil 440 may move the second moving part 300 in a direction perpendicular to the optical axis direction. The second coil 440 may move the second substrate 310 in a direction perpendicular to the optical axis direction. The second coil 440 may move the sensor substrate 320 in a direction perpendicular to the optical axis direction. The second coil 440 may move the image sensor 330 in a direction perpendicular to the optical axis direction. The second coil 440 may move the holder 340 in a direction perpendicular to the optical axis direction. The second coil 440 may rotate the second moving part 300 about the optical axis. The second coil 440 may rotate the second substrate 310 about the optical axis. The second coil 440 may rotate the sensor substrate 320 about the optical axis. The second coil 440 may rotate the image sensor 330 about an optical axis. The second coil 440 may rotate the holder 340 about the optical axis.

In a first embodiment of the present invention, during OIS driving, the second magnet 420 and the second coil 440 may move in a direction opposite to each other. As a first comparative example, the second magnet 420 may be fixed and the second coil 440 may move. As a second comparative example, the second coil 440 is fixed and the second magnet 420 may move. As a third comparative example, the second magnet 420 and the second coil 440 may move in the same direction. Unlike the first to third comparative examples, in a first embodiment of the present invention, both the second magnet 420 and the second coil 440 move against the fixed part 100, but the moving direction of the second magnet 420 and the moving direction of the second coil 440 may be opposite to each other.

The second coil 440 may comprise a plurality of coils. The second coil 440 may comprise four coils. The second coil 440 may comprise a coil for x-axis shift. The second coil 440 may comprise a coil for y-axis shift.

The second coil 440 may comprise a second-first coil 441. The second-first coil 441 may be a first sub-coil. The second-first coil 441 may be a coil for x-axis shift. The second-first coil 441 may move the second moving part 300 in the x-axis direction. The second-first coil 441 may be disposed long in length along the y-axis. The second-first coil 441 may comprise a plurality of coils. The second-first coil 441 may comprise two coils. The two coils of the second-first coil 441 may be electrically connected to each other. The second-first coil 441 may comprise a connection coil connecting the two coils. In this case, the two coils of the second-first coil 441 may receive current together. Or, the two coils of the second-first coil 441 may be electrically separated from each other to receive current individually.

The second coil 440 may comprise a second-second coil 442. The second-second coil 442 may be a second sub-coil. The second-second coil 442 may be a coil for y-axis shift. The second-second coil 442 may move the second moving part 300 in the y-axis direction. The second-second coil 442 may be disposed to be long in length along the x-axis. The second-first coil 441 may comprise a plurality of coils. The second-second coil 442 may comprise two coils. The two coils of the second-second coil 442 may be electrically connected to each other. The second-second coil 442 may comprise a connection coil connecting the two coils. In this case, the two coils of the second-second coil 442 may receive current together. Or, the two coils of the second-second coil 442 may be electrically separated from each other to receive current individually.

The camera device 10 may comprise a Hall sensor 445. The Hall sensor 445 may be disposed in the second substrate 310. The Hall sensor 445 may be disposed in a hole of the holder 340. The Hall sensor 445 may comprise a Hall element (Hall IC). The Hall sensor 445 may detect the second magnet 420. The Hall sensor 445 may detect the magnetic force of the second magnet 420. The Hall sensor 445 may face the second magnet 420. The Hall sensor 445 may be disposed at a position corresponding to the second magnet 420. The Hall sensor 445 may be disposed adjacent to the second magnet 420. The Hall sensor 445 may detect the position of the second moving part 300. The Hall sensor 445 may detect the movement of the second moving part 300. The Hall sensor 445 may be disposed in the hollow of the second coil 440. The sensed value detected by the Hall sensor 445 may be used to feedback the handshake correction operation. The Hall sensor 445 may be electrically connected to the driver IC 495.

The Hall sensor 445 may comprise a plurality of Hall sensors. The Hall sensor 445 may comprise three Hall sensors. The Hall sensor 445 may comprise first to third Hall sensors. The first Hall sensor may detect the displacement of the second moving part 300 in the x-axis direction. The second Hall sensor may detect the displacement of the second moving part 300 in the y-axis direction. The third Hall sensor may detect the rotation of the second moving part 300 about the z-axis alone or together with any one or more of the first Hall sensor and the second Hall sensor.

The camera device 10 may comprise a sensing magnet 450. The sensing magnet 450 may be disposed in the first moving part 200. The sensing magnet 450 may be fixed to the first moving part 200. The sensing magnet 450 may be coupled to the first moving part 200. The sensing magnet 450 may be attached to the first moving part 200 by an adhesive. The sensing magnet 450 may be disposed in the bobbin 210. The sensing magnet 450 may be fixed to the bobbin 210. The sensing magnet 450 may be coupled to the bobbin 210. The sensing magnet 450 may be attached to the bobbin 210 by an adhesive. The sensing magnet 450 may be formed to have a smaller size than the first magnet 410. The sensing magnet 450 may be formed to have a smaller size than the second magnet 420. Through this, the influence of the sensing magnet 450 on driving may be minimized.

The sensing magnet 450 may be disposed at an opposite side of the correction magnet 460. The sensing magnet 450 and the correction magnet 460 may be disposed opposite to each other in the first moving part 200. The sensing magnet 450 and the correction magnet 460 may be disposed opposite to each other in the bobbin 210.

The camera device 10 may comprise a correction magnet 460. The compensating magnet 460 may be a compensating magnet. The correction magnet 460 may be disposed in the first moving part 200. The correction magnet 460 may be fixed to the first moving part 200. The correction magnet 460 may be coupled to the first moving part 200. The correction magnet 460 may be attached to the first moving part 200 by an adhesive. The correction magnet 460 may be disposed in the bobbin 210. The correction magnet 460 may be fixed to the bobbin 210. The correction magnet 460 may be coupled to the bobbin 210. The correction magnet 460 may be attached to the bobbin 210 by an adhesive. The correction magnet 460 may be formed to have a smaller size than the first magnet 410. The correction magnet 460 may be formed to have a smaller size than the second magnet 420. Through this, the influence of the correction magnet 460 on driving may be minimized. In addition, the correction magnet 460 may be disposed at an opposite side of the sensing magnet 450 to form a magnetic force balance with the sensing magnet 450. Through this, a tilt that may be generated by the sensing magnet 450 may be inhibited.

The camera device 10 may comprise a sensing substrate 470. The sensing substrate 470 may be a substrate. The sensing substrate 470 may be a printed circuit board (PCB). The sensing substrate 470 may be a flexible substrate. The sensing substrate 470 may be an FPCB. The sensing substrate 470 may be coupled to the first substrate 110. The sensing substrate 470 may be connected to the first substrate 110. The sensing substrate 470 may be electrically connected to the first substrate 110. The sensing substrate 470 may be soldered to the first substrate 110. The sensing substrate 470 may be disposed in the housing 370. The sensing substrate 470 may be fixed to the housing 370. The sensing substrate 470 may be coupled to the housing 370. The housing 370 may comprise a groove or hole having a shape corresponding to that of the sensing substrate 470. The sensing substrate 470 may be disposed in a groove or hole of the housing 370.

The camera device 10 may comprise a driver IC 480. The driver IC 480 may be an AF driver IC. The driver IC 480 may be electrically connected to the first coil 430. The driver IC 480 may apply a current to the first coil 430 to perform AF driving. The driver IC 480 may apply power to the first coil 430. The driver IC 480 may apply a current to the first coil 430. The driver IC 480 may apply a voltage to the first coil 430. The driver IC 480 may be disposed in the sensing substrate 470. The driver IC 480 may detect the sensing magnet 450. The driver IC 480 may be disposed at a position corresponding to the sensing magnet 450. The driver IC 480 may be disposed to face the sensing magnet 450. The driver IC 480 may be disposed adjacent to the sensing magnet 450.

The driver IC 480 may comprise a sensor. The sensor may comprise a Hall IC. The sensor may be disposed at a position corresponding to the sensing magnet 450. The sensor may be disposed to face the sensing magnet 450. The sensor may be disposed adjacent to the sensing magnet 450. The sensor may detect the sensing magnet 450. The sensor may detect the magnetic force of the sensing magnet 450. The sensor may detect the position of the first moving part 200. The sensor may detect the movement of the first moving part

200. The detected value detected by the sensor may be used for feedback of autofocus driving.

The camera device 10 may comprise a gyro sensor 490. The gyro sensor 490 may be disposed in the first substrate 110. The gyro sensor 490 may detect the shaking of the camera device 10. The gyro sensor 490 may detect an angular velocity or a linear velocity caused by shaking of the camera device 10. The gyro sensor 490 may be electrically connected to the driver IC 495. The shake of the camera device 10 detected by the gyro sensor 490 may be used to drive the handshake compensation (OIS).

The camera device 10 may comprise a driver IC 495. The driver IC 495 may be an OIS driver IC. The driver IC 495 may be electrically connected to the second coil 440. The driver IC 495 may apply a current to the second coil 440 to perform OIS driving. The driver IC 495 may apply power to the second coil 440. The driver IC 495 may apply a current to the second coil 440. The driver IC 495 may apply a voltage to the second coil 440. The driver IC 495 may be disposed in the second substrate 310.

The camera device 10 may comprise a connection member. The connection member may be an interposer. The connection member may support the movement of the second moving part 300. The connection member may movably support the second moving part 300. The connection member may connect the second moving part 300 and the fixed part 100. The connection member may connect the first substrate 110 and the second substrate 310. The connection member may electrically connect the first substrate 110 and the second substrate 310. The connection member may connect the first substrate 110 and the second moving part 300. The connection member may guide the movement of the second moving part 300. The connection member may guide the second moving part 300 to move in a direction perpendicular to the optical axis direction. The connection member may guide the second moving part 300 to rotate about the optical axis. The connection member may limit the movement of the second moving part 300 in an optical axis direction.

The connection member may comprise a connection substrate 600. The connection member may comprise an elastic member for connecting the fixed part 100 and the second moving part 300. The connection member may comprise a leaf spring. The connection member may comprise a wire 800. The connection member may comprise a ball being disposed between the fixed part 100 and the second moving part 300.

The camera device 10 may comprise a connection substrate 600. The connection substrate 600 may be a connection part. The connection substrate 600 may be a connection member. The connection substrate 600 may be a flexible substrate. The connection substrate 600 may be a flexible substrate. The connection substrate 600 may be a flexible printed circuit board. The connection substrate 600 may be a flexible printed circuit board (FPCB). The connection substrate 600 may have flexibility at least in part thereof. The second substrate 310 and the connection substrate 600 may be integrally formed. The connection substrate 600 has flexibility at least in part thereof and may connect the second substrate 310 and the first substrate 110.

The connection substrate 600 may support the second moving part 300. The connection substrate 600 may support the movement of the second moving part 300. The connection substrate 600 may movably support the second moving part 300. The connection substrate 600 may connect the second moving part 300 and the fixed part 100. The connection substrate 600 may connect the first substrate 110 and the second substrate 310. The connection substrate 600 may electrically connect the first substrate 110 and the second substrate 310. The connection substrate 600 may guide the movement of the second moving part 300. The connection substrate 600 may guide the second moving part 300 to move in a direction perpendicular to the optical axis direction. The connection substrate 600 may guide the second moving part 300 to rotate about the optical axis. The connection substrate 600 may limit the movement of the second moving part 300 in an optical axis direction. A portion of the connection substrate 600 may be coupled to the base 120.

The connection substrate 600 may comprise two connection substrates 600 that are spaced apart from each other and formed symmetrically. The two connection substrates 600 may be disposed at both sides of the second substrate 310. The connection substrate 600 may be bent a total of 6 times so as to connect the first substrate 110 and the second substrate 310.

The connection substrate 600 may comprise a first region connected to the second substrate 310 and being bent in an optical axis direction. The first region is connected to the second substrate 310 and may be bent in an optical axis direction. The first region is connected to the second substrate 310 and may be extended in an optical axis direction. The first region is connected to the second substrate 310 and may be bent and extended in an optical axis direction. The connection substrate 600 may comprise a second region being extended from the first region. The connection substrate 600 may comprise a third region being bent in a direction perpendicular to the optical axis direction from the second region. The third region may be bent in a direction perpendicular to the optical axis direction from the second region. The third region may be extended in a direction perpendicular to the optical axis direction from the second region. The third region may be bent and extended in a direction perpendicular to the optical axis direction from the second region.

The connection substrate 600 may comprise a connection part 610 comprising a first region. The connection substrate 600 may comprise an extension part 620 comprising a second region and a third region. The connection substrate 600 may comprise a connection part 610 connected to the second substrate 310. The connection substrate 600 may comprise an extension part 620 being extended from the connection part 610. The connection substrate 600 may comprise a terminal unit 630 being connected to the extension part 620 and comprising a terminal.

The connection substrate 600 may comprise a connection part 610. The connection part 610 may be connected to the second moving part 300. The connection part 610 may be coupled to the second moving part 300. The connection part 610 may be fixed to the second moving part 300. The connection part 610 may be connected to the second substrate 310. The connection part 610 may be coupled to the second substrate 310. The connection part 610 may be fixed to the second substrate 310. The connection part 610 may comprise a first bending region that is bent in an optical axis direction. The connection part 610 may comprise a first region that is bent in an optical axis direction with respect to the second substrate 310 and a second region that is extended from the first region and is bent in a direction perpendicular to the optical axis direction.

The connection substrate 600 may comprise an extension part 620. The extension part 620 may connect the connection part 610 and the terminal unit 630. The extension part 620 may be extended from the connection part 610. The extension part 620 may comprise a second bending region that is bent in a direction perpendicular to the optical axis direction.

The connection substrate 600 may comprise a terminal unit 630. The terminal unit 630 may be coupled to the fixed part 100. The terminal unit 630 may be fixed to the fixed part 100. The terminal unit 630 may be coupled to the first substrate 110. The terminal unit 630 may be connected to the first substrate 110. The terminal unit 630 may be soldered to the first substrate 110. The terminal unit 630 may be fixed to the first substrate 110. The terminal unit 630 may be coupled to the base 120. The terminal unit 630 may be fixed to the base 120. The terminal unit 630 may comprise a terminal. The terminal may be coupled to the first substrate 110.

In a first embodiment of the present invention, the camera device 10 may comprise a flexible substrate. The flexible substrate may connect the fixed part 100 and the second moving part 300. The flexible substrate may comprise a connection part 610 being connected to the second moving part 300, an extension part 620 being extended from the connection part 610, and a terminal unit 630 being connected to the extension part 620 and comprising a terminal.

In a first embodiment of the present invention, the connection substrate 600 may comprise a first portion being coupled to the first substrate 110, a second portion being coupled to the second substrate 310, and a third portion connecting the first portion and the second portion. The third portion may be disposed parallel to the optical axis at least in part. The third portion may be formed to have a length in an optical axis direction longer than a thickness. The second portion of the connection substrate 600 may be disposed parallel to the second substrate 310 at least in part. The third portion of the connection substrate 600 may be disposed perpendicular to the second portion at least in part. The third portion of the connection substrate 600 may be bent roundly in a portion corresponding to the corner of the second substrate 310. The second substrate 310 may comprise a first side surface and a second side surface being disposed opposite to each other, and a third side surface and a fourth side surface being disposed opposite to each other. The second portion of the connection substrate 600 may be coupled to the first side surface and the second side surface of the second substrate 310. The first portion of the connection substrate 600 may be coupled to a portion of the first substrate 110 corresponding to the third side surface and the fourth side surface of the second substrate 310.

The camera device 10 may comprise a metal plate 650. The connection member may comprise a metal plate 650. The connection substrate 600 may comprise a metal plate 650. However, the metal plate 650 may be understood as a configuration separate from the connection substrate 600. The metal plate 650 may be a metal member. The metal plate 650 may be a metal part. The metal plate 650 may be a metal layer. The metal plate 650 may be a metal thin film. The metal plate 650 may be formed of metal. The metal plate 650 may be formed of an alloy. The metal plate 650 may be formed of a copper alloy. The metal plate 650 may be formed of a conductive material. The metal plate 650 may be distinguished from the conductive layer 602 of the connection substrate 600. The metal plate 650 may be formed of a material different from the conductive layer 602 of the connection substrate 600. The metal plate 650 may be disposed in the connection substrate 600. The metal plate 650 may be coupled to the connection substrate 600. The metal plate 650 may be fixed to the connection substrate 600. The metal plate 650 may be integrally formed with the connection substrate 600. The metal plate 650 may have elasticity.

In an optical axis direction, the length of the metal plate 650 may be the same as the length of the extension part 620 at least in part. The metal plate 650 may be extended to have the same length as the extension part 620 in an optical axis direction. The thickness of the metal plate 650 may be the same as the thickness of the connection substrate 600. The thickness of the metal plate 650 may be thicker than the thickness of the connection substrate 600. The thickness of the conductive layer 602 may be 7 to 50 µm. The thickness of the metal plate 650 may be 20 to 150 µm. The metal plate 650 is connected to the ground GND so that it may be used for impedance matching and noise suppression.

At least a portion of the metal plate 650 may be disposed in the extension part 620 of the connection substrate 600. The extension part 620 may comprise a bending region that is bent in a direction perpendicular to the optical axis direction. At this time, the metal plate 650 may be disposed in the bending region. The metal plate 650 may be disposed on the inner surface of the extension part 620. The metal plate 650 may be disposed on the outer surface of the extension part 620.

The metal plate 650 may be formed of a conductive material. The metal plate 650 may be electrically connected to the second substrate 310. The metal plate 650 may be electrically connected to the image sensor 330. The metal plate 650 may be electrically connected to the driver IC 495. The metal plate 650 may be connected to a terminal of the connection substrate 600. The metal plate 650 may be electrically connected to a terminal of the connection substrate 600. The metal plate 650 may be in direct contact with the terminal of the connection substrate 600. The metal plate 650 may be coupled to a terminal of the connection substrate 600 by a conductive member. The metal plate 650 may be used as the ground GND. The metal plate 650 may be connected to a ground terminal of the connection substrate 600. The metal plate 650 may be electrically connected to the first substrate 110. In this case, the number of power connection patterns of the connection substrate 600 may be reduced. The metal plate 650 may be an EMI tape.

The camera device 10 may comprise an electromagnetic interference (EMI) tape. The connection substrate 600 may comprise a metal member on the outer side surface. The metal member may comprise any one or more of an EMI tape and a metal plate. The connection substrate 600 may comprise an EMI member. The connection substrate 600 may comprise an EMI tape. The EMI member may comprise an EMI tape. The EMI member may also comprise an EMI member that is non-adhesive. EMI tape can replace the metal plate. Or, the EMI tape may be replaced by a metal plate. The EMI tape may be a conductive tape. The EMI tape can be conductive and adhesive. The EMI tape may be disposed in the connection substrate 600. EMI tape may be disposed on the inner surface of the connection substrate 600. The EMI tape may be disposed on the outer surface of the connection substrate 600. The EMI tape may be disposed on the inner surface of the extension part 1620 of the connection substrate 600. The EMI tape may be disposed on the outer surface of the extension part 1620 of the connection substrate 600. The EMI tape may be attached to the connection substrate 600 to reinforce the elasticity or rigidity of the connection substrate 600. The EMI tape may be a reinforcing member.

The EMI tape may be electrically connected to the second substrate 310. The EMI tape may be electrically connected to the image sensor 330. The EMI tape may be electrically connected to the driver IC 495. The EMI tape may be connected to a terminal of the connection substrate 600. The EMI tape may be electrically connected to a terminal of the connection substrate 600. The EMI tape may be in direct contact with the terminals of the connection substrate 600. The EMI tape can be used as a ground GND. The EMI tape may be connected to the ground terminal of the connection substrate 600. The EMI tape may be electrically connected to the first substrate 110. In this case, the number of power connection patterns of the connection substrate 600 may be reduced.

The camera device 10 may comprise an elastic member 700. The elastic member 700 may be a support member. The elastic member 700 may connect the fixed part 100 and the first moving part 200. The elastic member 700 may elastically connect the fixed part 100 and the first moving part 200. The elastic member 700 may connect the bobbin 210 and the housing 370. The elastic member 700 may elastically connect the bobbin 210 and the housing 370. The elastic member 700 may support the first moving part 200 to be movable against the fixed part 100. The elastic member 700 may be deformed when the first moving part 200 moves. When the movement of the first moving part 200 is finished, the elastic member 700 may position the first moving part 200 at an initial position through a restoring force (elastic force). The elastic member 700 may comprise a leaf spring. The elastic member 700 may comprise a spring. The elastic member 700 may have elasticity at least in part. The elastic member 700 may provide a restoring force (elastic force) to the first moving part.

The camera device 10 may comprise an upper elastic member 710. The elastic member 700 may comprise an upper elastic member 710. The upper elastic member 710 may be disposed above the lower elastic member 720. The upper elastic member 710 may comprise an inner side portion 712 being coupled to the bobbin 210. The inner side portion 712 of the upper elastic member 710 may be coupled to an upper portion of the bobbin 210. The inner side portion 712 of the upper elastic member 710 may be disposed on an upper surface of the bobbin 210. The upper elastic member 710 may comprise an outer side portion 711 being coupled to the housing 370. The outer side portion 711 of the upper elastic member 710 may be coupled to a lower portion of the housing 370. The outer side portion 711 of the upper elastic member 710 may be disposed on a lower surface of the housing 370. The upper elastic member 710 may comprise a connection part 713 connecting the inner side portion 712 and the outer side portion 711. The connection part 713 may have elasticity.

The upper elastic member 710 may comprise a terminal unit 714. The terminal unit 714 may be coupled to the sensing substrate 470. The terminal unit 714 may be electrically connected to the sensing substrate 470 through a conductive member. The terminal unit 714 may be extended from the outer side portion 711. The upper elastic member 710 may comprise a coupling portion 715. The coupling portion 715 may be coupled to the wire 800. The coupling portion 715 may comprise a hole through which the wire 800 passes. The upper surface of the coupling portion 715 may be coupled to the wire 800 by a conductive member. The wire 800 may pass through the hole of the coupling portion 715 and be coupled to the upper surface of the coupling portion 715 through solder. A damper may be disposed on the coupling portion 715.

The upper elastic member 710 may comprise a plurality of upper elastic units. The upper elastic member 710 may comprise four upper elastic units. The upper elastic member 710 may comprise first to fourth upper elastic units 710-1, 710-2, 710-3, and 710-4. The first and second upper elastic units 710-1 and 710-2 may be coupled to the first surface of the sensing substrate 470. At this time, the first surface may be an inner side surface of the sensing substrate 470 facing the optical axis. The third and fourth upper elastic units 710-3 and 710-4 may be coupled to a second surface opposite to the first surface of the sensing substrate 470. At this time, the second surface may be an outer surface of the sensing substrate 470. The plurality of upper elastic units may electrically connect the sensing substrate 470 and the wire 800. The plurality of upper elastic units may electrically connect the driver IC 480 and the wire 800. The first to fourth upper elastic units 710-1, 710-2, 710-3, and 710-4 may be electrically connected to I2C (SDA and SCL) and power sources (VDD and VSS) of the driver IC 480. The first upper elastic unit 710-1 may be electrically connected to the SDA terminal of the driver IC 480. The second upper elastic unit 710-2 may be electrically connected to the SCL terminal of the driver IC 480. The third upper elastic unit 710-3 may be electrically connected to the VDD terminal of the driver IC 480. The fourth upper elastic unit 710-4 may be electrically connected to the VSS terminal of the driver IC 480.

The camera device 10 may comprise a lower elastic member 720. The elastic member 700 may comprise a lower elastic member 720. The lower elastic member 720 may be disposed below the upper elastic member 710. The lower elastic member 720 may comprise an inner side portion being coupled to the bobbin 210. The inner side portion of the lower elastic member 720 may be coupled to a lower portion of the bobbin 210. The inner side portion of the lower elastic member 720 may be disposed on a lower surface of the bobbin 210. The lower elastic member 720 may comprise an outer side portion being coupled to the housing 370. The outer side portion of the lower elastic member 720 may be coupled to an upper portion of the housing 370. The outer side portion of the lower elastic member 720 may be disposed on an upper surface of the housing 370. The lower elastic member 720 may comprise a connection part connecting the inner side portion and the outer side portion. The connection part may have elasticity.

The lower elastic member 720 may comprise a plurality of lower elastic units. The lower elastic member 720 may comprise first and second lower elastic units. The lower elastic member 720 may comprise two lower elastic units. The two lower elastic units may be spaced apart from each other to electrically connect the sensing substrate 470 and the first coil 430. The two lower elastic units may be spaced apart from each other so that the driver IC 480 and the first coil 430 can be electrically connected.

The camera device 10 may comprise a wire 800. The wire 800 may be a wire spring. The wire 800 may be an elastic member. The wire 800 may be a leaf spring as a modified embodiment. The wire 800 may connect the first moving part 200 and the second moving part 300. The wire 800 may elastically connect the first moving part 200 and the second moving part 300. The wire 800 may electrically connect the first moving part 200 and the second moving part 300.

The wire 800 may connect the upper elastic member 710 and the terminal 150. The wire 800 may elastically connect the upper elastic member 710 and the terminal 150. The wire 800 may electrically connect the upper elastic member 710 and the terminal 150. The wire 800 may be electrically connected to the first coil 430. The wire 800 may be electrically connected to the driver IC 480. The wire 800 may be electrically connected to the sensing substrate 470. The wire 800 may be electrically connected to the upper elastic member 710. The wire 800 may be electrically connected to the terminal 150. The wire 800 may be electrically connected to the second substrate 310. The wire 800 may be electrically connected to the connection substrate 600. The wire 800 may be electrically connected to the first substrate 110. The wire 800 may support the lens 220 to be movable against the base 120. The upper end portion of the wire 800 may be coupled to the upper elastic member 710. The lower end portion of the wire 800 may be coupled to the terminal 150.

The wire 800 may be disposed parallel to the optical axis. The wire 800 may be disposed in an optical axis direction. The wire 800 may support the second moving part 300 to move or rotate in a direction perpendicular to the optical axis direction. The wire 800 may connect the upper elastic member 710 and the terminal 150. The wire 800 may electrically connect the upper elastic member 710 and the terminal 150. The wire 800 may be electrically connected to the sensing substrate 470. The wire 800 may be electrically connected to the first substrate 110. The wire 800 may be electrically connected to the second substrate 310. The wire 800 may be coupled to the upper elastic member 710 through solder. The wire 800 may be coupled to the terminal 150 through solder. The wire 800 may comprise a plurality of wires. The wire 800 may comprise four wires.

The upper end of the wire 800 may be connected to the first moving part 200. The lower end of the wire 800 may be connected to the second moving part 300. The driving unit may move the upper end of the wire 800 and the lower end of the wire 800 in a direction opposite to each other with respect to the optical axis.

The camera device 10 may comprise a damper. The damper may be viscous. The damper may comprise an epoxy. The damper may have an adhesive force. The damper may be a viscous member. A damper may be disposed in the wire 800. The damper may connect the wire 800 and the upper elastic member 710. The damper may connect the wire 800 and the housing 370. The damper may connect the wire 800 and the holder 340. The damper may connect the wire 800 and the base 120. The damper may connect the wire 800 and the terminal 150.

Adoption of OIS is increasing due to the strengthening of mobile phone functions, and consumer demand for high-resolution products is increasing. For high resolution, the size of the image sensor 330 increases, and for good image quality, the size of the sensor pixel also increases. However, there are problems in that as the sensor size increases, the weight of the driving unit increases and the movement speed also becomes slow, and the first embodiment of the present invention may comprise details on the structure and control method for simultaneously performing the shift of the image sensor 330 and the shift of the lens 220. According to a first embodiment of the present invention, it can be easily handled with super resolution (SR) and the like. In a first embodiment of the present invention, the lens 220 and the image sensor 330 can be moved. The image sensor 330 may be finely adjusted according to the light path. Through this, clear photos and videos can be photographed.

The first embodiment of the present invention may comprise a lens shift structure comprising AF driving and an image sensor shift structure. AF driving may use a driving unit that shifts the lens in an optical axis direction. The upper elastic member 710 and the wire 800 may be used to shift the lens in a direction perpendicular to the optical axis direction. The upper elastic member 710 may be a suspension spring. The wire 800 may be a suspension wire. The terminal 150, which is a lower side fixing part of the wire 800, may be fixed to the fixed part 100. When the image sensor 330 shifts, it may be elastically supported by the K value of the interposer comprising the wire 800 and the connection substrate 600. The shift of the lens 220 may also be affected by the interposer comprising the wire 800 and the connection substrate 600. As for OIS, the second magnet 420 and the second coil 440 may move in a direction opposite to each other by a Lorentz force generated in the second coil 440. That is, when the OIS unit for lens shifting moves in a positive (+) direction, the OIS unit for sensor shifting moves in a negative (−) direction so that OIS correction can be performed with only half of the movement length.

The connection substrate 600, which is an interposer, has a circuit pattern and may serve as a spring. Any one or more of an EMI tape and an alloy may be coupled to the connection substrate 600. At least one of the lens 220 and the image sensor 330 may be tilt driven.

The wire 800 may electrically connect the AF signals to the first substrate 110 that is the main PCB. The magnet may be comprised of a shared magnet that affects both AF and OIS. The magnet may affect the OIS sensor shift unit and the OIS lens shift unit at the same time. The sensor shift spring may be comprised of a connection substrate 600 and a wire 800. The lens shift spring may also be comprised of a connection substrate 600 and a wire 800. Or, the lens shift spring may be formed of a wire 800. The spring constant K of the lens shift may be equal to or smaller than the spring constant K of the sensor shift.

Hereinafter, driving of a camera device according to a first embodiment of the present invention will be described with reference to the drawings.

Figure 25:
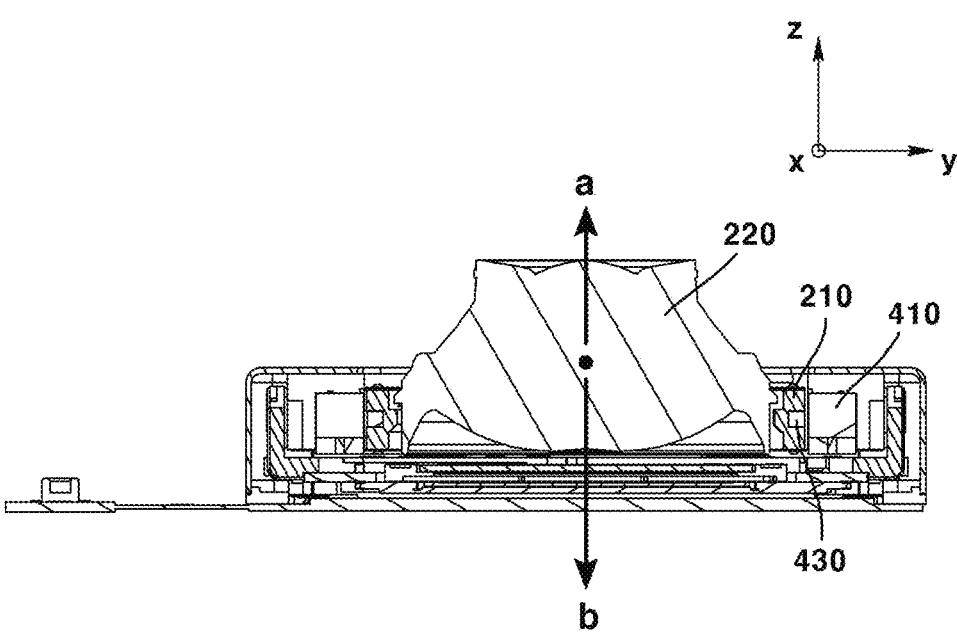
FIG. 25 is a view for explaining the operation of the auto focus function of a camera device according to a first embodiment of the present invention.

FIG. 25 is a view for explaining the operation of the auto focus function of a camera device according to a first embodiment of the present invention.

When power is applied to the first coil 430 of the camera device 10 according to the first embodiment of the present invention, an electromagnetic field is formed in the first coil 430 and the first coil 430 may move in an optical axis direction (z-axis direction) through electromagnetic interaction with the first magnet 410. At this time, the first coil 430 may move in an optical axis direction together with the first moving part 200 comprising the lens 220. In this case, since the lens 220 moves away from or closer to the image sensor 330, the focus of the subject may be adjusted. At least one of a current and a voltage may be applied to apply power to the first coil 430.

When a current in a first direction is applied to the first coil 430 of the camera device 10 according to a first embodiment of the present invention, the first coil 430 may move upward in the optical axis direction (refer to a in FIG. 25) through electromagnetic interaction with the first magnet 410. At this time, the first coil 430 may move the lens 220 upward in the optical axis direction so as to be moved away from the image sensor 330.

When a current in a second direction opposite to the first direction is applied to the first coil 430 of the camera device 10 according to a first embodiment of the present invention, the first coil 430 may move in a lower direction (refer to b in FIG. 25) of the optical axis direction through electromagnetic interaction with the first magnet 410. At this time, the first coil 430 may move the lens 220 in a lower direction of the optical axis to be closer to the image sensor 330.

Figure 26:
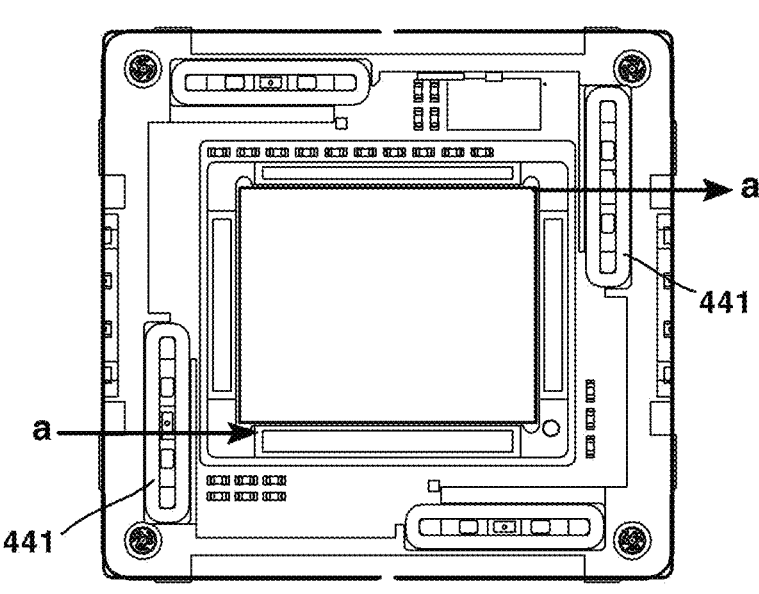
FIGS. 26 to 28 are diagrams for explaining the operation of a handshake correction function of a camera device according to a first embodiment of the present invention. In more detail.
Figure 26:
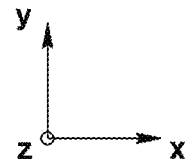
Figure 27:
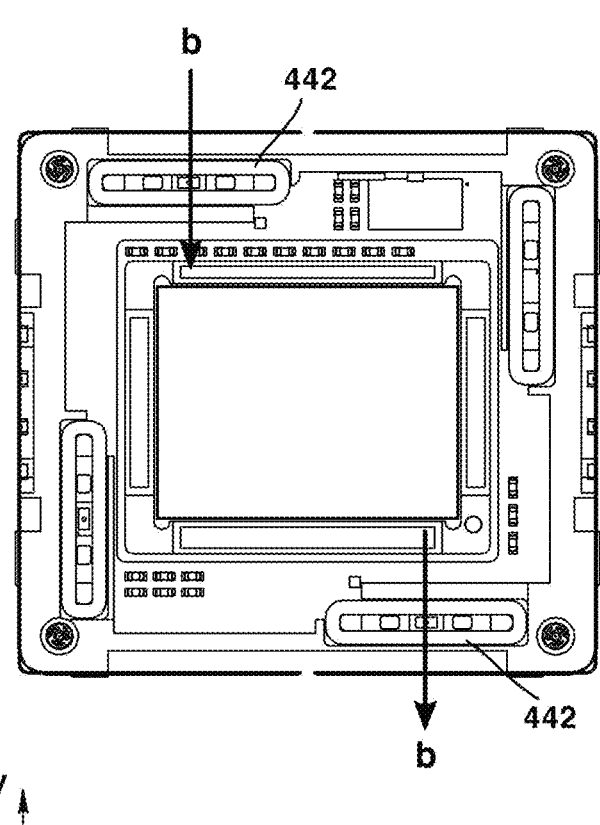
Figure 27:
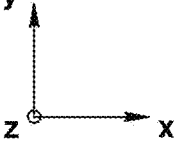
Figure 28:
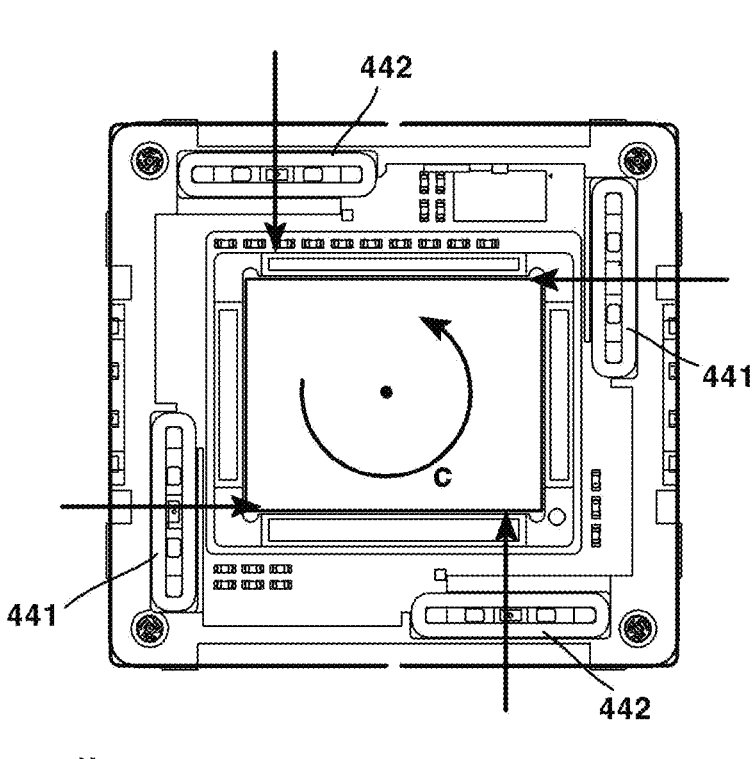
Figure 28:
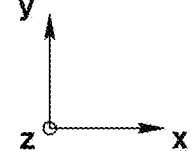

FIGS. 26 to 28 are diagrams for explaining the driving of a handshake correction function of a camera device according to a first embodiment of the present invention.

When power is applied to the second coil 440 of the camera device 10 according to a first embodiment of the present invention, an electromagnetic field is formed in the second coil 440, and thereby, the second coil 440 may move in a direction perpendicular to the optical axis direction through electromagnetic interaction with the second magnet 420. In addition, the second coil 440 may rotate about the optical axis through electromagnetic interaction with the second magnet 420. At this time, the second coil 440 may move or rotate together with the second moving part 300 comprising the image sensor 330. In a first embodiment of the present invention, the second coil 440 may move the image sensor 330 in a way that the shaking of the camera device 10 detected by the gyro sensor 490 is compensated.

Furthermore, in a first embodiment of the present invention, the second magnet 420 may also move in a direction perpendicular to the optical axis direction or rotate against the optical axis. That is, the second coil 440 and the second magnet 420 may move at the same time. In other words, the lens 220 and the image sensor 330 may move at the same time. However, the lens 220 and the image sensor 330 may move in a direction opposite to each other.

FIG. 26 is a diagram for explaining the x-axis shift handshake correction of a camera device according to a first embodiment of the present invention.

When a current in a first direction is applied to the second-first coil 441 of a camera device 10 according to a first embodiment of the present invention, the second-first coil 441 may move in one direction (refer to a in FIG. 26) among the first directions (x-axis direction) perpendicular to the optical axis direction through electromagnetic interaction with the second magnet 420. At this time, the second-first coil 441 may move the image sensor 330 in one direction among the first directions perpendicular to the optical axis direction. Meanwhile, at the same time, the second magnet 420 may move the lens 220 in the other direction opposite to one direction among the first directions perpendicular to the optical axis direction.

Conversely, when a current in a second direction opposite to the first direction is applied to the second-first coil 441, the second-first coil 441 may move in the other direction among the first directions (x-axis direction) perpendicular to the optical axis direction through electromagnetic interaction with the second magnet 420. At this time, the second-first coil 441 may move the image sensor 330 in the other direction among the first directions perpendicular to the optical axis direction. Meanwhile, at the same time, the second magnet 420 may move the lens 220 in one direction opposite to the other direction among the first directions perpendicular to the optical axis direction.

Due to the interaction between the second-first coil 441 and the second magnet 420, the lens 220 and the image sensor 330 may move opposite to each other on a first direction perpendicular to the optical axis direction.

FIG. 27 is a diagram for explaining the y-axis shift handshake correction of a camera device according to a first embodiment of the present invention.

When a current in a first direction is applied to the second-second coil 442 of a camera device 10 according to a first embodiment of the present invention, the second-second coil 442 may move in one direction among the second directions (y-axis direction) perpendicular to the optical axis direction (refer to b in FIG. 27) through electromagnetic interaction with the second magnet 420. At this time, the second-second coil 442 may move the image sensor 330 in one direction among the second directions perpendicular to the optical axis direction. Meanwhile, at the same time, the second magnet 420 may move the lens 220 in the other direction opposite to one direction among the second directions perpendicular to the optical axis direction.

Conversely, when a current in a second direction opposite to the first direction is applied to the second-second coil 442, the second-second coil 442 may move in the other direction among the second directions (y-axis direction) perpendicular to the optical axis direction through electromagnetic interaction with the second magnet 420. At this time, the second-second coil 442 may move the image sensor 330 in the other direction among the second directions perpendicular to the optical axis direction. Meanwhile, at the same time, the second magnet 420 may move the lens 220 in one direction opposite to the other direction among the second directions perpendicular to the optical axis direction.

Due to the interaction between the second-second coil 442 and the second magnet 420, the lens 220 and the image sensor 330 may move in a direction opposite to each other on a second direction perpendicular to the optical axis direction.

FIG. 28 is a diagram for explaining the z-axis rolling handshake correction of a camera device according to a first embodiment of the present invention.

When current in a first direction is applied to the second-first coil 441 and the second-second coil 442 of the camera device 10 according to a first embodiment of the present invention, the second-first coil 441 and the second-second coil 442 may rotate in one direction about the optical axis through electromagnetic interaction with the second magnet 420 (refer to c in FIG. 28). At this time, the second-first coil 441 and the second-second coil 442 may rotate the image sensor 330 in one direction about the optical axis. At this time, one direction may be counterclockwise. Meanwhile, at the same time, the second magnet 420 may rotate the lens 220 in the other direction opposite to the one direction about the optical axis.

Conversely, when a current in a second direction opposite to the first direction is applied to the second-first coil 441 and the second-second coil 442, the second-first coil 441 and the second-second coil 442 may rotate in other direction about the optical axis through electromagnetic interaction with the second magnet 420. At this time, the second-first coil 441 and the second-second coil 442 may rotate the image sensor 330 in other direction about the optical axis. At this time, the other direction may be clockwise. Meanwhile, at the same time, the second magnet 420 may rotate the lens 220 in one direction opposite to the other direction about the optical axis.

Due to the interaction between the second-first coil 441 and the second-second coil 442 and the second magnet 420, the lens 220 and the image sensor 330 may rotate in a direction opposite to each other in rotation about the optical axis.

Hereinafter, an optical apparatus according to a first embodiment of the present invention will be described with reference to the drawings.

Figure 29:
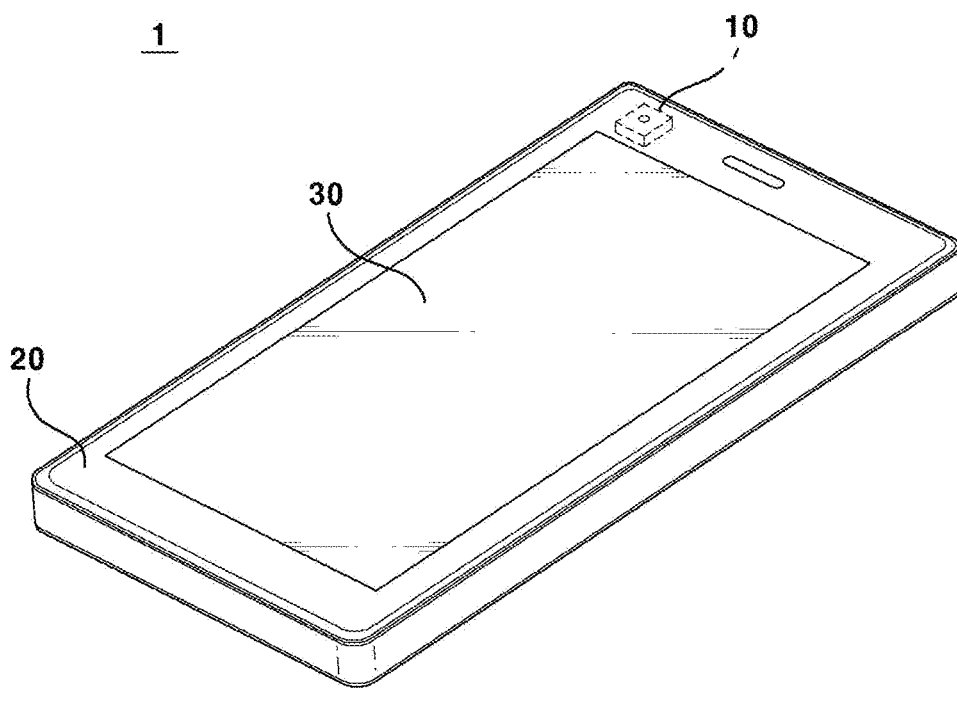
FIG. 29 is a perspective view of an optical apparatus according to a first embodiment of the present invention.
Figure 30:
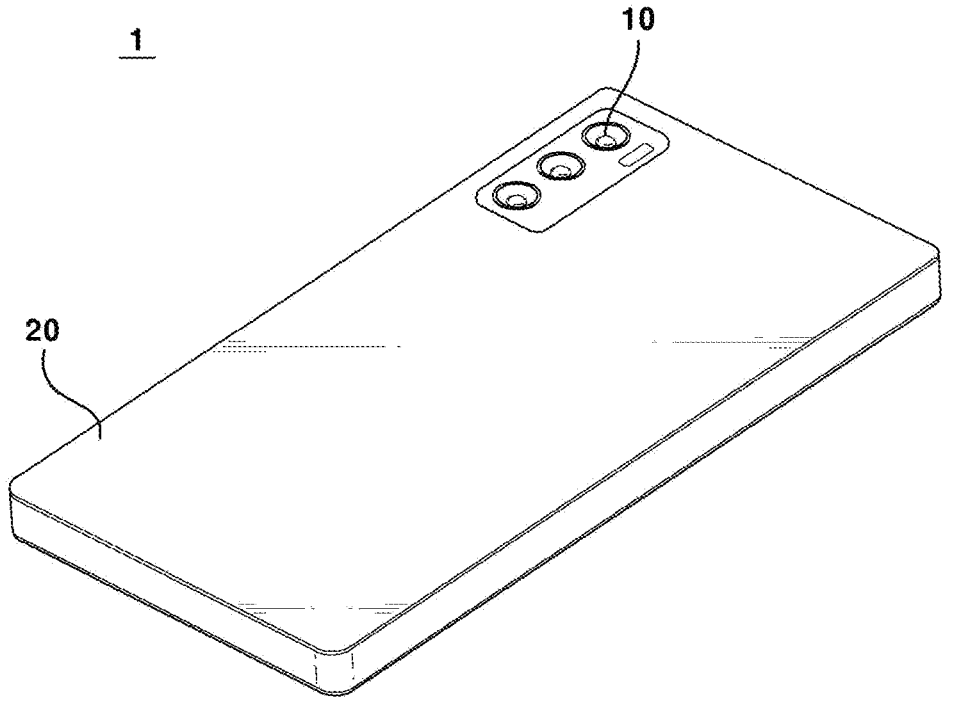
FIG. 30 is a perspective view of an optical apparatus according to a first embodiment of the present invention, as viewed from a different direction from that of FIG. 29.

FIG. 29 is a perspective view of an optical apparatus according to a first embodiment of the present invention; and FIG. 30 is a perspective view of an optical apparatus according to a first embodiment of the present invention, as viewed from a different direction from that of FIG. 29.

The optical apparatus 1 may comprise any one or more among a hand phone, a portable phone, a portable terminal, a mobile terminal, a smart phone, a smart pad, a portable smart device, a digital camera, a laptop computer, a digital broadcasting terminal, a personal digital assistant (PDA), a portable multimedia player (PMP), and a navigation. The optical apparatus 1 may comprise any device for photographing images or photos.

The optical apparatus 1 may comprise a main body 20. The optical apparatus 1 may comprise a camera device 10. The camera device 10 may be disposed in the main body 20. The camera device 10 may photograph a subject. The optical apparatus 1 may comprise a display 30. The display 30 may be disposed in the main body 20. The display 30 may output any one or more of an image and an image photographed by the camera device 10. The display 30 may be disposed on the first surface of the main body 20. The camera device 10 may be disposed on one or more of the first surface of the main body 20 and the second surface opposite to the first surface.

Hereinafter, a camera device according to a second embodiment of the present invention will be described with reference to the drawings.

Figures 31A, 31B, 31C:
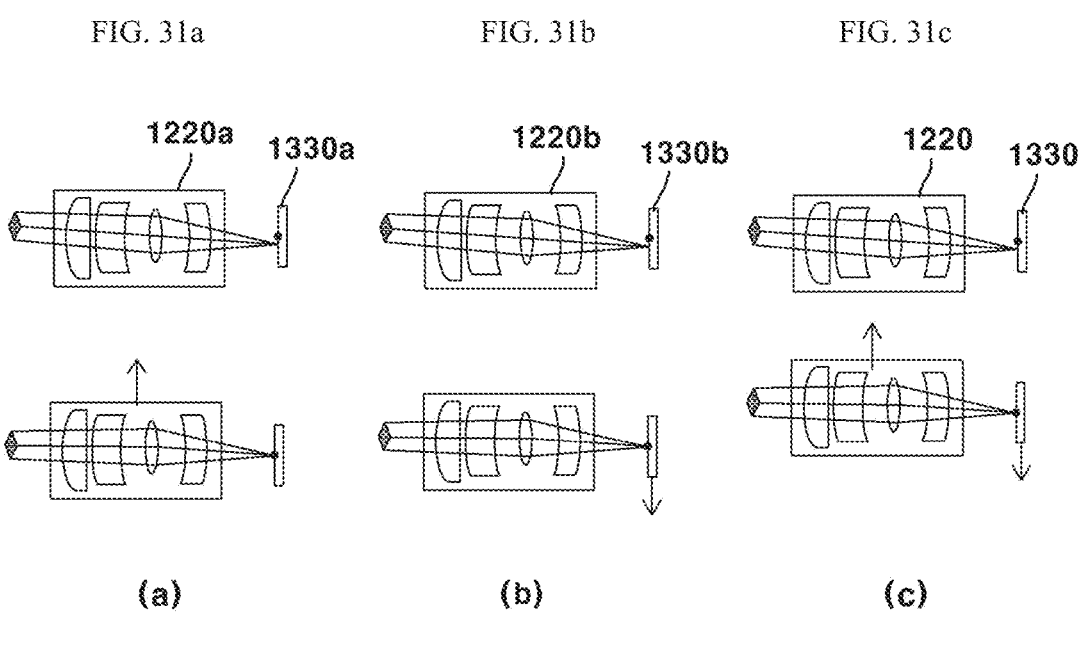
FIGS. 31a and 31b are conceptual diagrams illustrating structures for performing OIS function according to a comparative example.
FIG. 31c is a conceptual diagram illustrating a structure for performing OIS function according to a second embodiment of the present invention.
Figure 32:
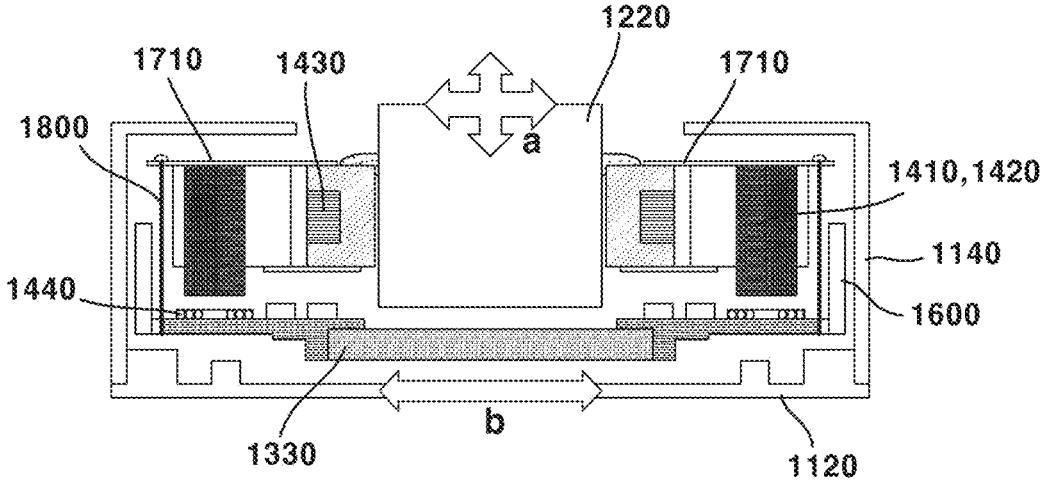
FIG. 32 is a conceptual diagram illustrating the operation of a camera device according to a second embodiment of the present invention.
Figure 33:
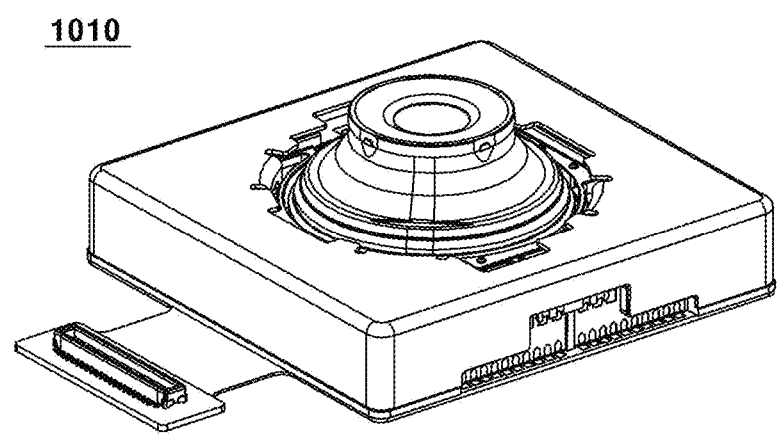
FIG. 33 is a perspective view of a camera device according to a second embodiment of the present invention.
Figure 34:
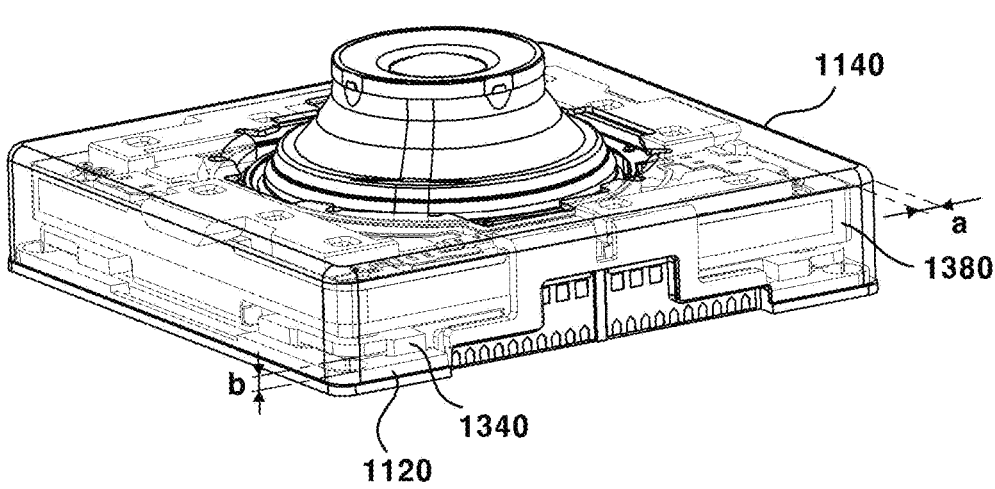
FIG. 34 is a see-through view of a camera device according to a second embodiment of the present invention.
Figure 35:
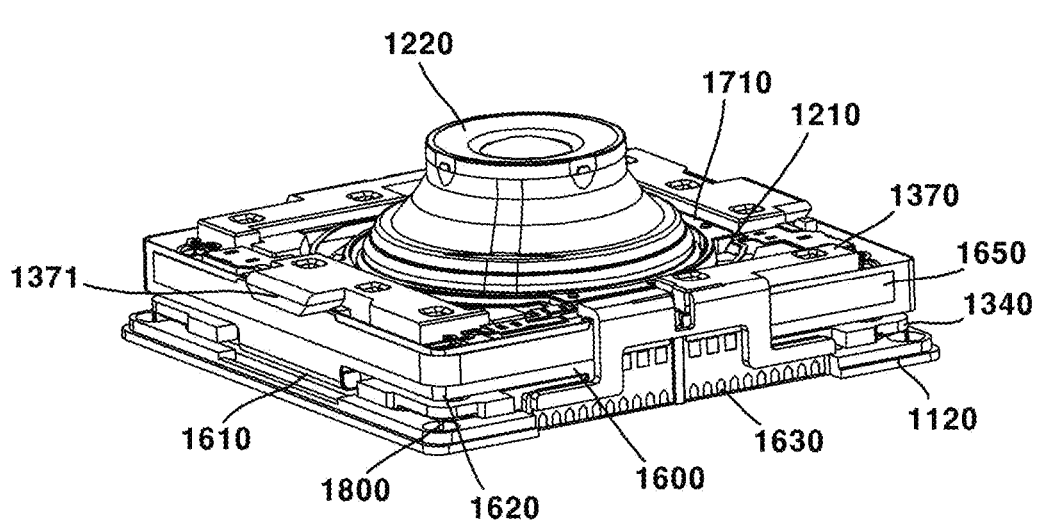
FIG. 35 is a perspective view illustrating a state in which a cover member is omitted in a camera device according to a second embodiment of the present invention.
Figure 36:
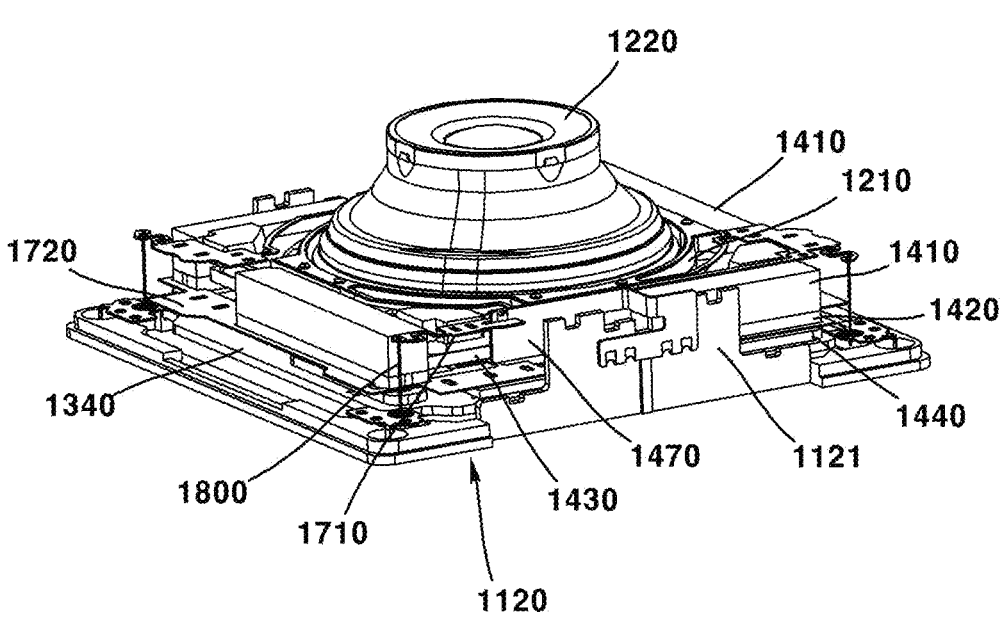
FIG. 36 is a perspective view of a state in which some configurations are further omitted from FIG. 35.
Figure 37:
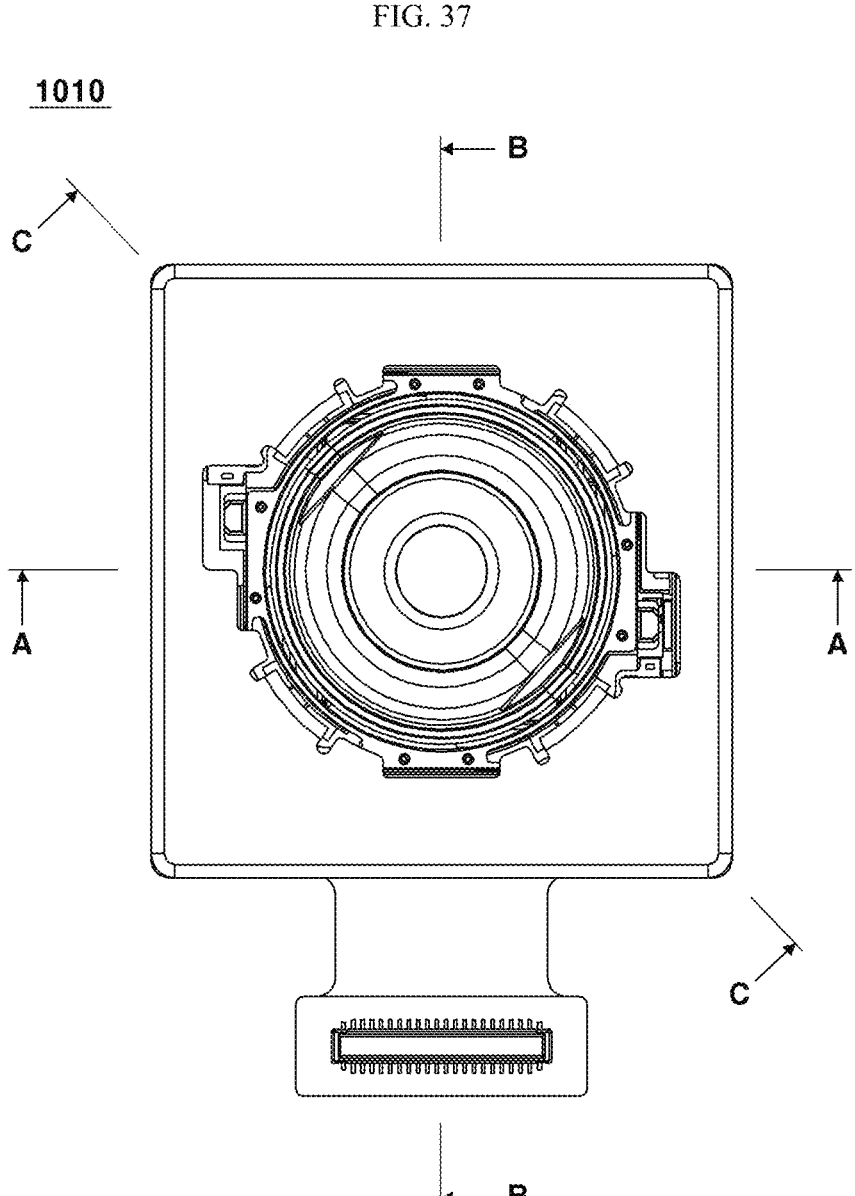
FIG. 37 is a plan view of a camera device according to a second embodiment of the present invention.
Figure 38:
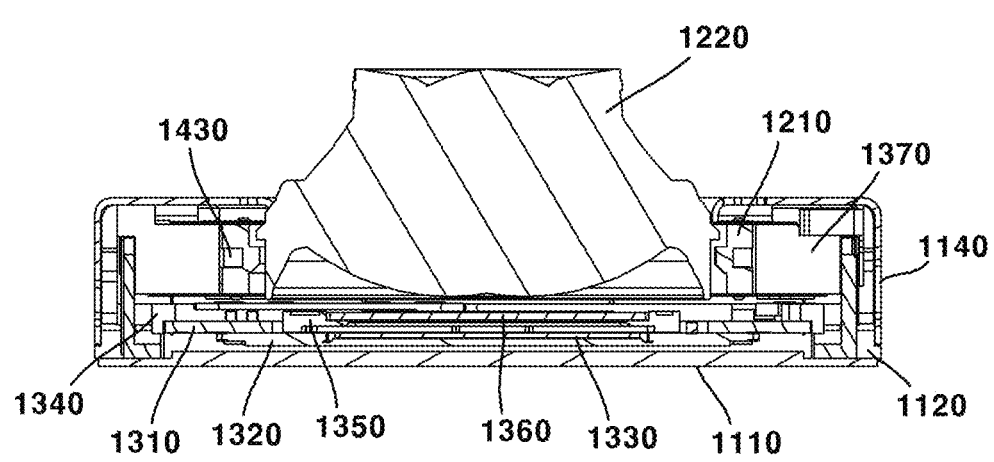
FIG. 38 is a cross-sectional view taken along line A-A in FIG. 37.
Figure 39:
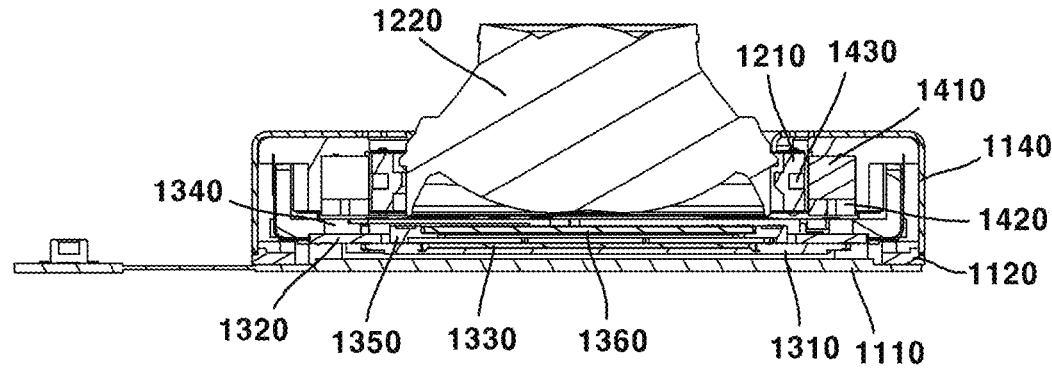
FIG. 39 is a cross-sectional view taken along line B-B in FIG. 37.
Figure 40:
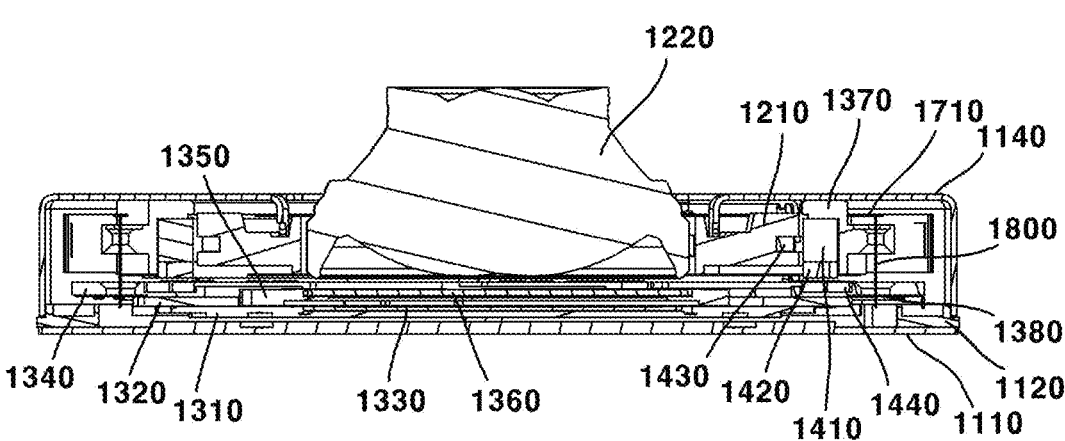
FIG. 40 is a cross-sectional view taken along line C-C in FIG. 37.
Figure 41:
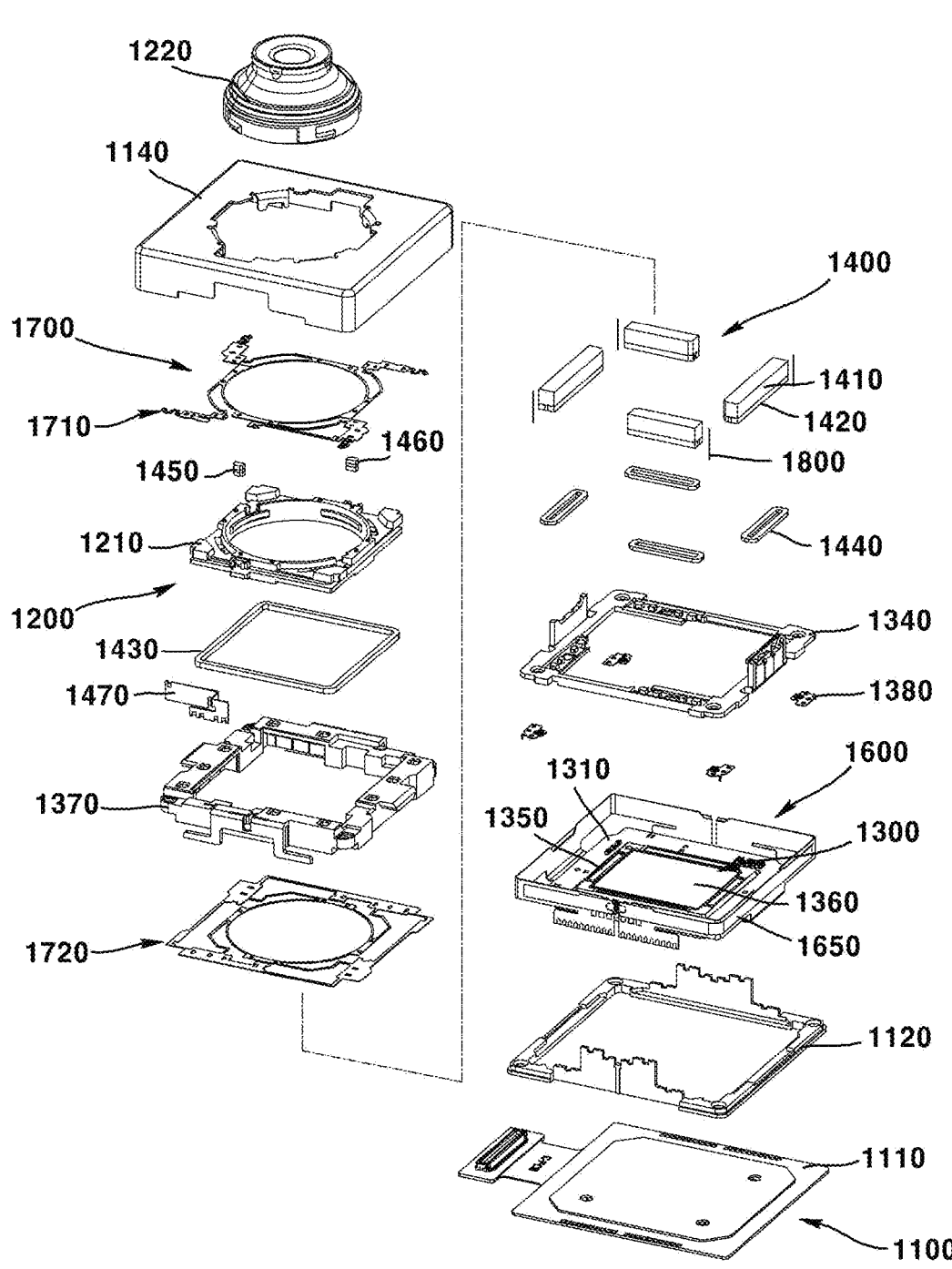
FIG. 41 is an exploded perspective view of a camera device according to a second embodiment of the present invention.
Figure 42:
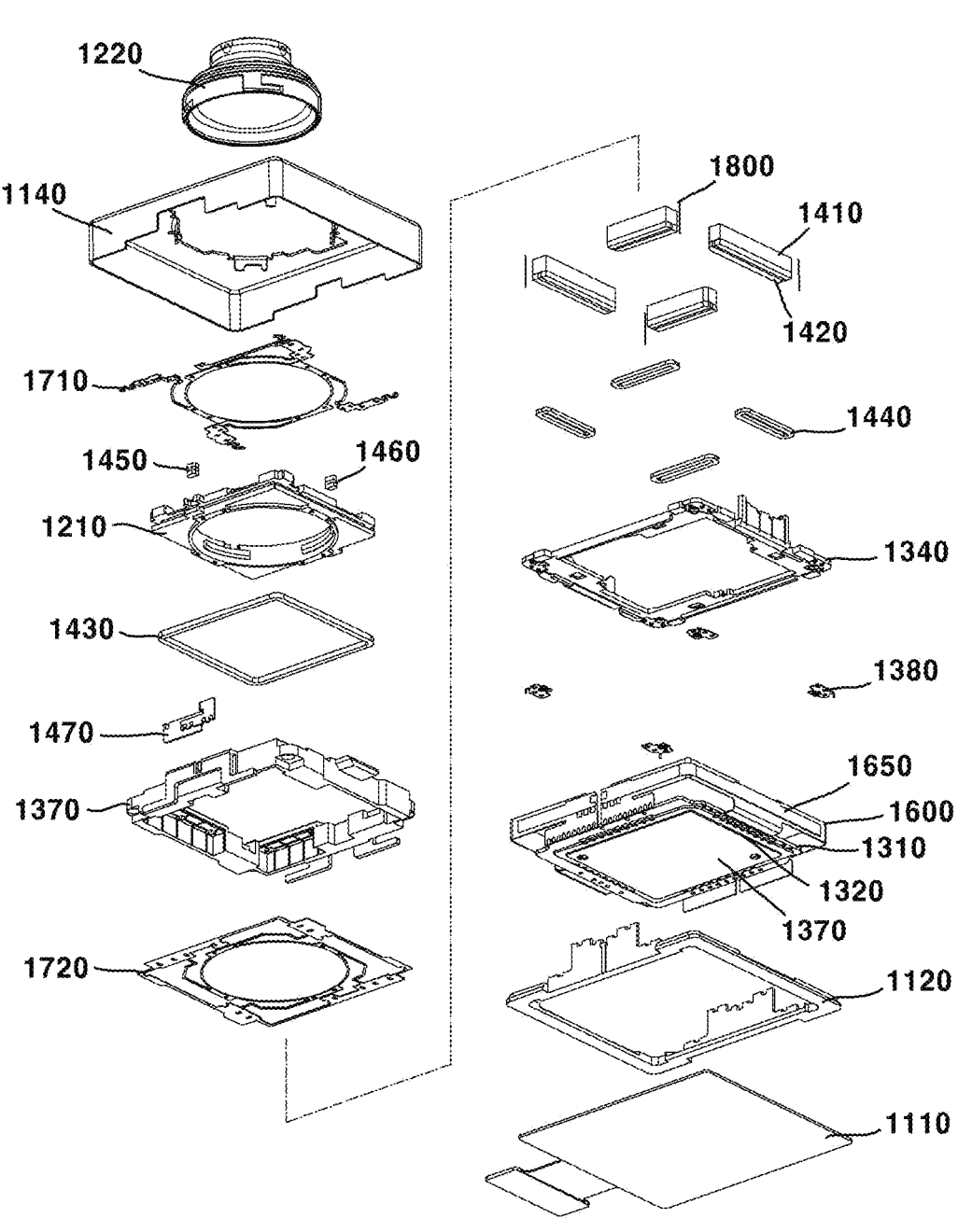
FIG. 42 is an exploded perspective view of a camera device according to a second embodiment of the present invention, viewed from a different direction from that of FIG. 41.
Figure 43:
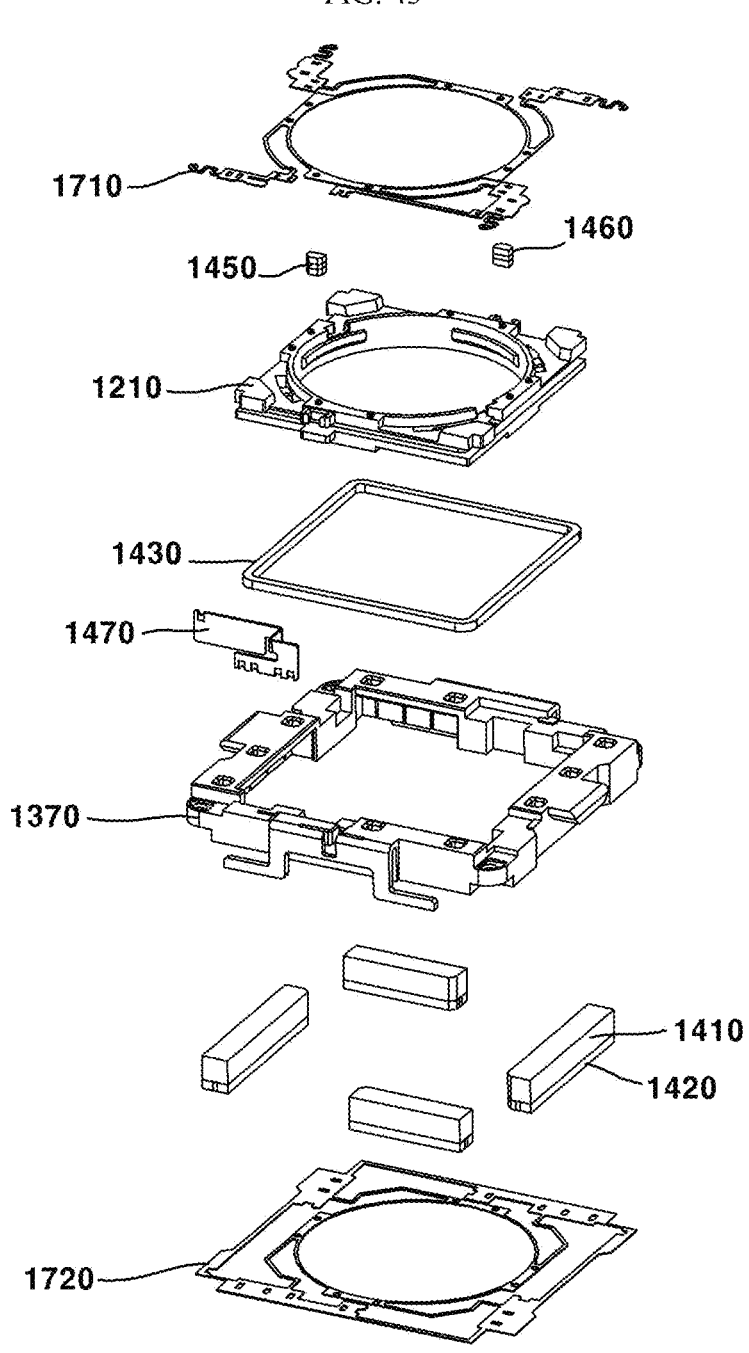
FIG. 43 is an exploded perspective view of a first moving part and related configurations of a camera device according to a second embodiment of the present invention.
Figure 44:
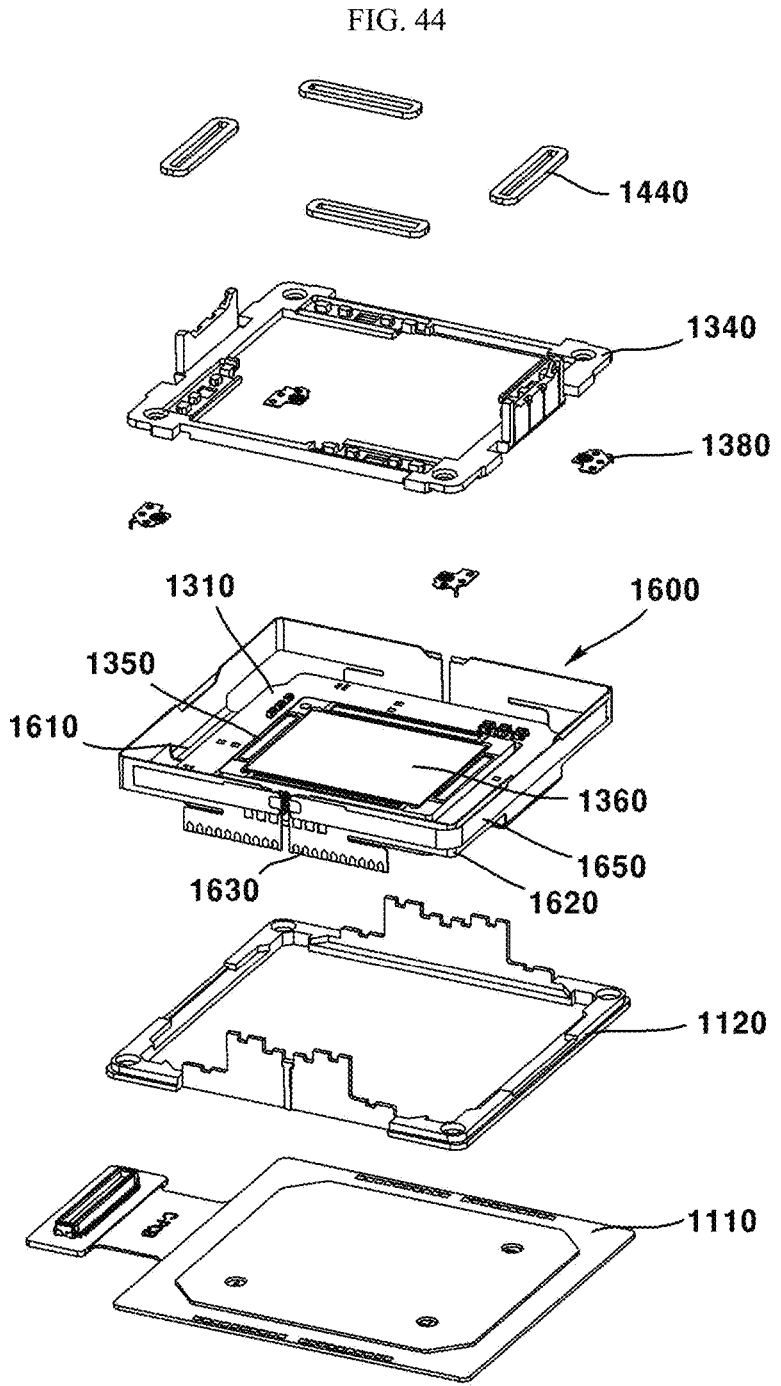
FIG. 44 is an exploded perspective view of a second moving part and related configurations of a camera device according to a second embodiment of the present invention.
Figures 45, 46:
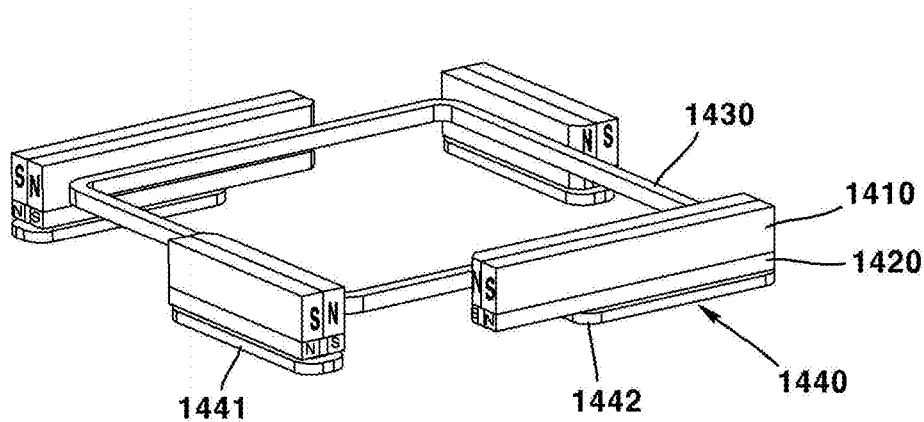
FIG. 45 is a perspective view of a second moving part, a fixed part, and a connection substrate of a camera device according to a second embodiment of the present invention.
FIG. 46 is a perspective view illustrating a magnet and a coil of a camera device according to a second embodiment of the present invention.
Figure 47:
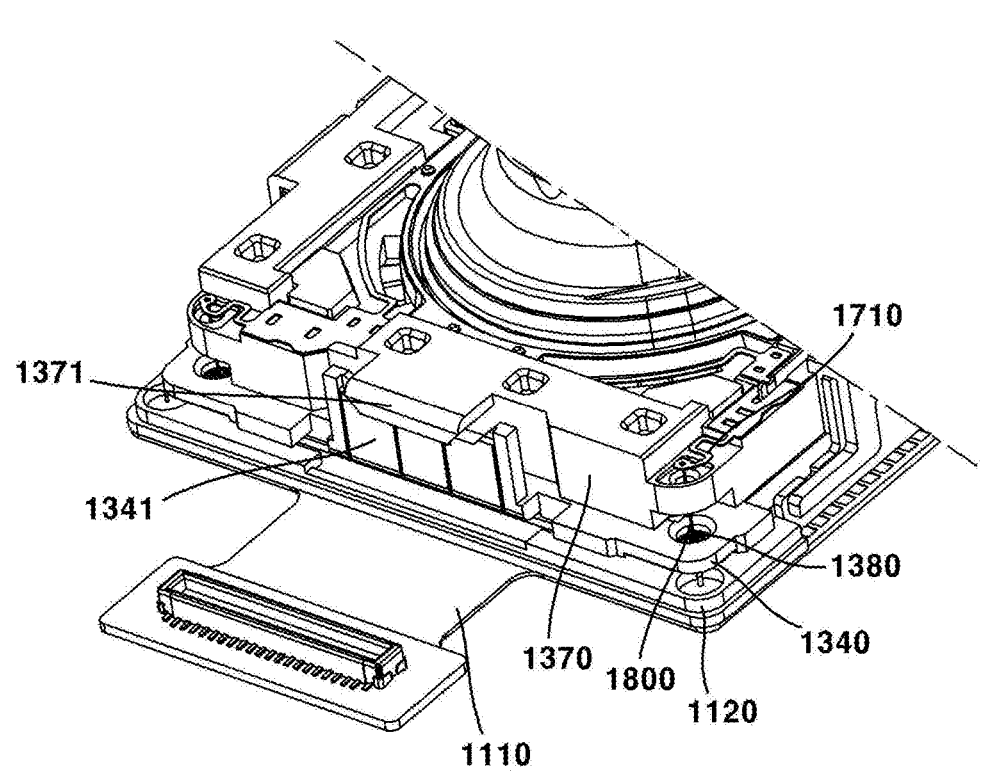
FIG. 47 is a perspective view illustrating a gap between a housing and a holder of a camera device according to a second embodiment of the present invention.
Figure 48:
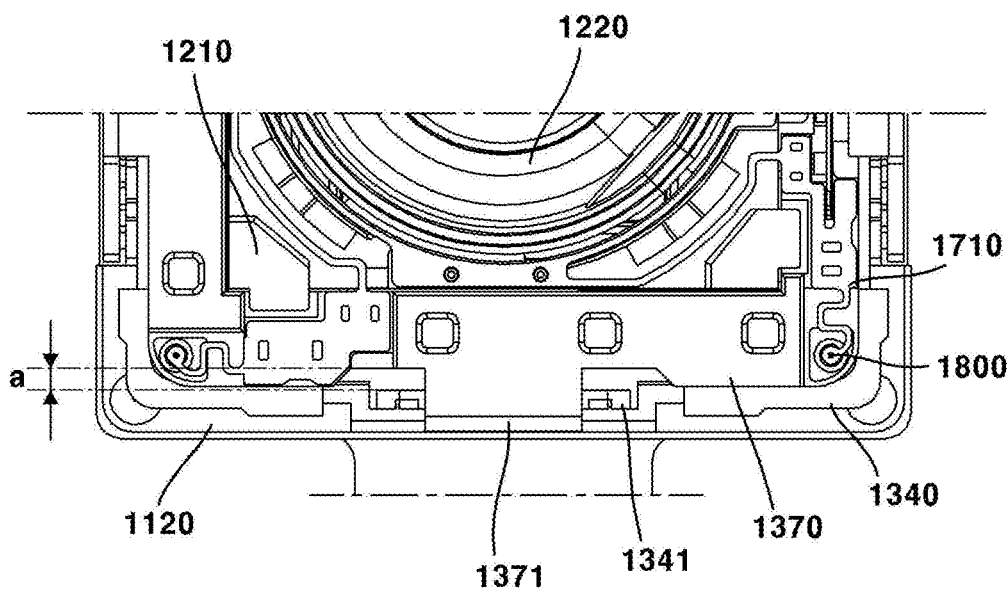
FIG. 48 is a plan view illustrating a gap between a housing and a holder of a camera device according to a second embodiment of the present invention.
Figure 49:
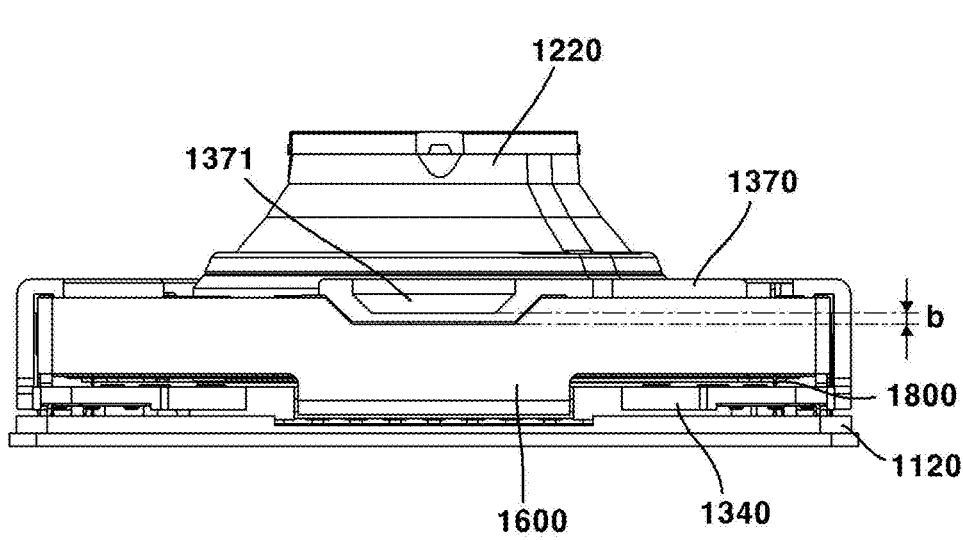
FIG. 49 is a side view illustrating the gap between a housing and a holder of a camera device according to a second embodiment of the present invention.

FIGS. 31*a* and 31*b* are conceptual diagrams illustrating structures for performing OIS function according to a comparative example; FIG. 31*c* is a conceptual diagram illustrating a structure for performing OIS function according to a second embodiment of the present invention; FIG. 32 is a conceptual diagram illustrating the operation of a camera device according to a second embodiment of the present invention; FIG. 33 is a perspective view of a camera device according to a second embodiment of the present invention; FIG. 34 is a see-through view of a camera device according to a second embodiment of the present invention; FIG. 35 is a perspective view illustrating a state in which a cover member is omitted in a camera device according to a second embodiment of the present invention; FIG. 36 is a perspective view of a state in which some configurations are further omitted from FIG. 35; FIG. 37 is a plan view of a camera device according to a second embodiment of the present invention; FIG. 38 is a cross-sectional view taken along line A-A in FIG. 37; FIG. 39 is a cross-sectional view taken along line B-B in FIG. 37; FIG. 40 is a cross-sectional view taken along line C-C in FIG. 37; FIG. 41 is an exploded perspective view of a camera device according to a second embodiment of the present invention; FIG. 42 is an exploded perspective view of a camera device according to a second embodiment of the present invention, viewed from a different direction from that of FIG. 41; FIG. 43 is an exploded perspective view of a first moving part and related configurations of a camera device according to a second embodiment of the present invention; FIG. 44 is an exploded perspective view of a second moving part and related configurations of a camera device according to a second embodiment of the present invention; FIG. 45 is a perspective view of a second moving part, a fixed part, and a connection substrate of a camera device according to a second embodiment of the present invention; FIG. 46 is a perspective view illustrating a magnet and a coil of a camera device according to a second embodiment of the present invention; FIG. 47 is a perspective view illustrating a gap between a housing and a holder of a camera device according to a second embodiment of the present invention; FIG. 48 is a plan view illustrating a gap between a housing and a holder of a camera device according to a second embodiment of the present invention; FIG. 49 is a side view illustrating the gap between a housing and a holder of a camera device according to a second embodiment of the present invention; and FIG. 50 is a perspective view illustrating a gap between a housing and a base of a camera device according to a second embodiment of the present invention.

Referring to FIG. 31*a*, in the first comparative example, it can be confirmed that the image sensor 1330*a* is fixed and the lens 1220*a* is moved in a direction perpendicular to the optical axis direction in order to perform optical image stabilization (OIS), that is, hand-shake correction. Referring to FIG. 31b, in the second comparative example, it can be confirmed that the lens 1220b is fixed and the image sensor 1330b is moved in a direction perpendicular to the optical axis direction in order to perform OIS. Referring to FIG. 31c, in the second embodiment of the present invention, it can be confirmed that in order to perform OIS, the lens 1220 is moved in a first direction perpendicular to the optical axis direction, and the image sensor 1330 can be moved in a second direction perpendicular to the optical axis direction and opposite to the first direction.

In the second embodiment of the present invention, in order to perform OIS, the lens 1220 is moved in a first direction perpendicular to the optical axis direction, and the image sensor 1330 may be moved in a second direction perpendicular to the optical axis direction and opposite to the first direction. However, as a modified embodiment, in order to perform OIS, only one of the lens 1220 and the image sensor 1330 may be moved as shown in the first comparative example and the second comparative example.

As illustrated in FIG. 32, in the camera device 1010 according to a second embodiment of the present invention, the lens 1220 may move in an optical axis direction and in a direction perpendicular to the optical axis direction (refer to a in FIG. 32). In more detail, the lens 1220 may move in an optical axis direction for auto focus (AF), that is, auto focus driving. In addition, the lens 1220 may move in a direction perpendicular to the optical axis direction for OIS driving. In a camera device 1010 according to a second embodiment of the present invention, the image sensor 1330 may move in a direction perpendicular to the optical axis direction (refer to b in FIG. 32). Furthermore, the image sensor 1330 and the lens 1220 may move in a direction opposite to each other with respect to the optical axis.

The camera device 1010 may photograph any one or more of a video and an image. The camera device 1010 may be a camera. The camera device 1010 may be a camera module. The camera device 1010 may be a camera assembly. The camera device 1010 may be a camera unit. The camera device 1010 may comprise a lens driving device. The camera device 1010 may comprise a sensor driving device. The camera device 1010 may comprise a voice coil motor (VCM). The camera device 1010 may comprise an auto focus assembly. The camera device 1010 may comprise a handshake correction assembly. The camera device 1010 may comprise an autofocus device. The camera device 1010 may comprise a handshake correction device. The camera device 1010 may comprise an actuator. The camera device 1010 may comprise a lens driving actuator. The camera device 1010 may comprise a sensor driving actuator. The camera device 1010 may comprise an auto focus actuator. The camera device 1010 may comprise a handshake correction actuator.

The camera device 1010 may comprise a fixed part 1100. The fixed part 1100 may be a part relatively fixed when the moving parts 1200 and 1300 are being moved. The fixed part 1100 may be a part relatively fixed when at least one of the first moving part 1200 and the second moving part 1300 is being moved. The fixed part 1100 may accommodate the first moving part 1200 and the second moving part 1300. The fixed part 1100 may be disposed at an outer side of the first moving part 1200 and the second moving part 1300.

Although the first substrate 1110 has been described as one configuration of the fixed part 1100 throughout the specification, the first substrate 1110 may be understood as a separate configuration from the fixed part 1100. The fixed part 1100 may be disposed in the first substrate 1110. The fixed part 1100 may be disposed on the first substrate 1110. The fixed part 1100 may be disposed above the first substrate 1110.

The camera device 1010 may comprise a first substrate 1110. The fixed part 1100 may comprise a first substrate 1110. The first substrate 1110 may be a main substrate. The first substrate 1110 may be a substrate. The first substrate 1110 may be a printed circuit board (PCB). The first substrate 1110 may be connected to a power source of the optical apparatus 1001. The first substrate 1110 may comprise a connector connected to the power source of the optical apparatus 1001.

The camera device 1010 may comprise a base 1120. The fixed part 1100 may comprise a base 1120. The base 1120 may be disposed in the first substrate 1110. The base 1120 may be disposed on the first substrate 1110. The base 1120 may be disposed above the first substrate 1110. The base 1120 may be fixed to the first substrate 1110. The base 1120 may be coupled to the first substrate 1110. The base 1120 may be attached to the first substrate 1110 by an adhesive. The base 1120 may be disposed between the first substrate 1110 and the housing 1370.

The connection substrate 1600 may be disposed in the base 1120. The connection substrate 1600 may be connected to the base 1120. The connection substrate 1600 may be fixed to the base 1120. The connection substrate 1600 may be coupled to the base 1120. The connection substrate 1600 may be attached to the base 1120. The connection substrate 1600 may be fixed to the base 1120 by an adhesive. The connection substrate 1600 may be in contact with the base 1120.

The base 1120 may comprise a protruded part 1121. The protruded part 1121 may be protruded from the upper surface of the base 1120. The protruded part 1121 may be protruded upward from the outer side surface of the base 1120. The connection substrate 1600 may be disposed in the protruded part 1121 of the base 1120. The connection substrate 1600 may be connected to the protruded part 1121 of the base 1120. The connection substrate 1600 may be fixed to the protruded part 1121 of the base 1120. The connection substrate 1600 may be coupled to the protruded part 1121 of the base 1120. The connection substrate 1600 may be attached to the protruded part 1121 of the base 1120. The connection substrate 1600 may be fixed to the protruded part 1121 of the base 1120 by an adhesive. The connection substrate 1600 may be in contact with the protruded part 1121 of the base 1120.

The terminal unit 1630 of the connection substrate 1600 may be disposed in the protruded part 1121 of the base 1120. The terminal unit 1630 of the connection substrate 1600 may be connected to the protruded part 1121 of the base 1120. The terminal unit 1630 of the connection substrate 1600 may be fixed to the protruded part 1121 of the base 1120. The terminal unit 1630 of the connection substrate 1600 may be coupled to the protruded part 1121 of the base 1120. The terminal unit 1630 of the connection substrate 1600 may be attached to the protruded part 1121 of the base 1120. The terminal unit 1630 of the connection substrate 1600 may be fixed to the protruded part 1121 of the base 1120 by an adhesive. The terminal unit 1630 of the connection substrate 1600 may be in contact with the protruded part 1121 of the base 1120.

The camera device 1010 may comprise a cover member 1140. The fixed part 1100 may comprise a cover member 1140. The cover member 1140 may be coupled to the base 1120. The cover member 1140 may be space apart from the housing 1130. The cover member 1140 may be coupled to the first substrate 1110. The cover member 1140 may be fixed to the base 1120. The cover member 140 may be fixed to the base 1120. The cover member 1140 may be fixed to the first substrate 1110. The cover member 1140 may cover at least a portion of the base 1120. The cover member 1140 may cover at least a portion of the housing 1370.

The cover member 1140 may be a 'cover can' or a 'shield can'. The cover member 1140 may be formed of a metal material. The cover member 1140 may block electromagnetic interference (EMI). The cover member 1140 may be electrically connected to the first substrate 1110. The cover member 1140 may be grounded to the first substrate 1110.

The cover member 1140 may comprise an upper plate. The cover member 1140 may comprise a hole formed in the upper plate. The hole may be formed at a position corresponding to the lens 1220. The cover member 1140 may comprise a side plate. The side plate may comprise a plurality of side plates. The side plate may comprise 4 side plates. The side plate may comprise first to fourth side plates. The side plate may comprise first and second side plates being disposed opposite to each other, and third and fourth side plates being disposed opposite to each other. The cover member 1140 may comprise a plurality of corners between the plurality of side plates.

Although the cover member 1140 has been described as one configuration of the fixed part 1100 throughout the specification, the cover member 1140 may be understood as a configuration separate from the fixed part 1100. The cover member 1140 may be coupled to the fixed part 1100. The cover member 1140 may cover the first moving part 1200.

The camera device 1010 may comprise a first moving part 1200. The first moving part 1200 may move against the fixed part 1100. The first moving part 1200 may move in an optical axis direction against the fixed part 1100. The first moving part 1200 may be disposed inside the fixed part 1100. The first moving part 1200 may be movably disposed inside the fixed part 1100. The first moving part 1200 may be movably disposed inside the fixed part 1100 in an optical axis direction. An auto focus (AF) function may be performed by moving the first moving part 1200 in an optical axis direction against the fixed part 1100. The first moving part 1200 may be disposed on the second moving part 1300.

The camera device 1010 may comprise a bobbin 1210. The first moving part 1200 may comprise a bobbin 1210. The bobbin 1210 may be disposed on the first substrate 1110. The bobbin 1210 may be disposed above the first substrate 1110. The bobbin 1210 may be disposed to be spaced apart from the first substrate 1110. The bobbin 1210 may be disposed inside the housing 1370. The bobbin 1210 may be disposed at an inner side of the housing 1370. At least a portion of the bobbin 1210 may be accommodated in the housing 1370. The bobbin 1210 may be movably disposed in the housing 1370. The bobbin 1210 may be movably disposed in the housing 1370 in an optical axis direction. The bobbin 1210 may be coupled to the lens 1220. The bobbin 1210 may comprise a hollow or a hole. The lens 1220 may be disposed in a hollow or hole of the bobbin 1210. An outer circumferential surface of the lens 1220 may be coupled to an inner circumferential surface of the bobbin 1210.

The camera device 1010 may comprise a lens 1220. The first moving part 1200 may comprise a lens 1220. The lens 1220 may be coupled to the bobbin 1210. The lens 1220 may be fixed to the bobbin 1210. The lens 1220 may move integrally with the bobbin 1210. The lens 1220 may be screw-coupled to the bobbin 1210. The lens 1220 may be attached to the bobbin 1210 by an adhesive. The lens 1220 may be disposed at a position corresponding to the image sensor 1330. The optical axis of the lens 1220 may coincide with the optical axis of the image sensor 1330. The optical axis may be the z-axis. The lens 1220 may comprise a plurality of lenses. The lens 1220 may comprise a 5-element or 6-element lens.

The camera device 1010 may comprise a lens module. The lens module may be coupled to the bobbin 1210. The lens module may comprise a barrel and one or more lenses 1220 disposed inside the barrel.

The camera device 1010 may comprise a second moving part 1300. The second moving part 1300 may move against the fixed part 1100. The second moving part 1300 may move in a direction perpendicular to the optical axis direction against the fixed part 1100. The second moving part 1300 may be disposed inside the fixed part 1100. The second moving part 1300 may be movably disposed inside the fixed part 1100. The second moving part 1300 may be movably disposed in the fixed part 1100 in a direction perpendicular to the optical axis direction. A handshake correction (OIS) function may be performed by moving the second moving part 1300 in a direction perpendicular to the optical axis direction against the fixed part 1100. The second moving part 1300 may be disposed between the first moving part 1200 and the first substrate 1110.

The camera device 1010 may comprise a second substrate 1310. The second moving part 1300 may comprise a second substrate 1310. The second substrate 1310 may be a substrate. The second substrate 1310 may be a printed circuit board (PCB). The second substrate 1310 may be disposed between the first moving part 1200 and the first substrate 1110. The second substrate 1310 may be disposed between the bobbin 1210 and the first substrate 1110. The second substrate 1310 may be disposed between the lens 1220 and the first substrate 1110. The second substrate 1310 may be spaced apart from the fixed part 1100. The second substrate 1310 may be spaced apart from the fixed part 1100 in an optical axis direction and a direction perpendicular to the optical axis direction. The second substrate 1310 may move in a direction perpendicular to the optical axis direction. The second substrate 1310 may be electrically connected to the image sensor 1330. The second substrate 1310 may move integrally with the image sensor 1330. The second substrate 1310 may comprise a hole. An image sensor 1330 may be disposed in a hole of the second substrate 1310. The second substrate 1310 may be coupled to an upper surface of the sensor substrate 1320. The second substrate 1310 may be disposed on an upper surface of the sensor substrate 1320. The second substrate 1310 may be fixed to an upper surface of the sensor substrate 1320.

The second substrate 1310 may comprise a terminal 1311. The terminal 1311 may be disposed on a lower surface of the second substrate 1310. The terminal 1311 may be coupled to the terminal 1321 of the sensor substrate 1320. The second substrate 1310 may be formed separately from the sensor substrate 1320. The second substrate 1310 may be formed separately from the sensor substrate 1320 to be coupled thereto. The terminal 1321 of the sensor substrate 1320 may be soldered to the terminal 1311 of the second substrate 1310.

The camera device 1010 may comprise a sensor substrate 1320. The second moving part 1300 may comprise a sensor substrate 1320. The sensor substrate 1320 may be a substrate. The sensor substrate 1320 may be a printed circuit board (PCB). The sensor substrate 1320 may be coupled to the image sensor 1330. The sensor substrate 1320 may be coupled to the second substrate 1310. The sensor substrate 1320 may be replaced with a SUS. Or, a hole for accommodating the image sensor 1330 may be formed in the sensor substrate 1320, and a SUS may be additionally disposed on a lower surface of the sensor substrate 1320.

The sensor substrate 1320 may comprise a terminal 1321. The terminal 1321 of the sensor substrate 1320 may be coupled to the terminal 1311 of the second substrate 1310. The sensor substrate 1320 may be coupled to a lower surface of the second substrate 1310. The sensor substrate 1320 may be disposed below the second substrate 1310. The sensor substrate 1320 may be coupled below the second substrate 1310 in a state being coupled with the image sensor 1330.

The camera device 1010 may comprise an image sensor 1330. The second moving part 1300 may comprise an image sensor 1330. The image sensor 1330 may be disposed in the sensor substrate 1320. The image sensor 1330 may be disposed between the sensor substrate 1320 and the sensor holder 350. The image sensor 1330 may be electrically connected to the second substrate 1310. The image sensor 1330 may move integrally with the second substrate 1310. The image sensor 1330 may be disposed below the lens 1220.

An image may be formed when light passing through the lens 1220 and the filter 1360 is incident on the image sensor 1330. The image sensor 1330 may be electrically connected to the sensor substrate 1320, the second substrate 1310, and the first substrate 1110. The image sensor 1330 may comprise an effective image area. The image sensor 1330 may convert light irradiated to the effective image area into an electrical signal. The image sensor 1330 may comprise any one or more among a charge coupled device (CCD), a metal oxide semiconductor (MOS), a CPD, and a CID.

The camera device 1010 may comprise a holder 1340. The second moving part 1300 may comprise a holder 1340. The holder 1340 may be formed of an insulating material. The holder 1340 may be disposed in the second substrate 1310. The holder 1340 may be disposed on the second substrate 1310. The holder 1340 may be disposed above the second substrate 1310. The holder 1340 may be fixed to the second substrate 1310. The holder 1340 may be coupled to the second substrate 1310. The holder 1340 may comprise a hollow or a hole in which the image sensor 1330 is disposed. A second coil 1440 may be disposed in the holder 1340. The holder 1340 may comprise a protrusion on which the second coil 1440 is wound. The holder 1340 may comprise a hole in which the Hall sensor 1445 is disposed.

A connection substrate 1600 may be disposed in the holder 1340. The connection substrate 1600 may be connected to the holder 1340. The connection substrate 1600 may be fixed to the holder 1340. The connection substrate 1600 may be coupled to the holder 1340. The connection substrate 1600 may be attached to the holder 1340. The connection substrate 1600 may be fixed to the holder 1340 by an adhesive. The connection substrate 1600 may be in contact with the holder 1340.

The holder 1340 may comprise a protruded part 1341. The protruded part 1341 may be protruded from an upper surface of the holder 1340. The protruded part 1341 may be protruded upward from the outer side surface of the holder 1340. The connection substrate 1600 may be disposed in the protruded part 1341 of the holder 1340. The connection substrate 1600 may be connected to the protruded part 1341 of the holder 1340. The connection substrate 1600 may be fixed to the protruded part 1341 of the holder 1340. The connection substrate 1600 may be coupled to the protruded part 1341 of the holder 1340. The connection substrate 1600 may be attached to the protruded part 1341 of the holder 1340. The connection substrate 1600 may be fixed to the protruded part 1341 of the holder 1340 by an adhesive. The connection substrate 1600 may be in contact with the protruded part 1341 of the holder 1340.

At least a portion of the connection part 1610 and the extension part 1620 of the connection substrate 1600 may be disposed on the protruded part 1341 of the holder 1340. At least a portion of the connection part 1610 and the extension part 1620 of the connection substrate 1600 may be connected to the protruded part 1341 of the holder 1340. At least a portion of the connection part 1610 and the extension part 1620 of the connection substrate 1600 may be fixed to the protruded part 1341 of the holder 1340. At least a portion of the connection part 1610 and the extension part 1620 of the connection substrate 1600 may be coupled to the protruded part 1341 of the holder 1340. At least a portion of the connection part 1610 and the extension part 1620 of the connection substrate 1600 may be attached to the protruded part 1341 of the holder 1340. At least some of the connection part 1610 and the extension part 1620 of the connection substrate 1600 may be fixed to the protruded part 1341 of the holder 1340 by an adhesive. At least a portion of the connection part 1610 and the extension part 1620 of the connection substrate 1600 may be in contact with the protruded part 1341 of the holder 1340.

The camera device 1010 may comprise a sensor base 1350. The second moving part 1300 may comprise a sensor base 1350. The sensor base 1350 may be disposed in the sensor substrate 1320. The sensor base 1350 may comprise a hole formed at a position corresponding to the image sensor 1330. The sensor base 1350 may comprise a groove in which the filter 1360 is disposed.

The camera device 1010 may comprise a filter 1360. The second moving part 1300 may comprise a filter 1360. The filter 1360 may be disposed between the lens 1220 and the image sensor 1330. The filter 1360 may be disposed in the sensor base 1350. The filter 1360 may block light having a specific frequency band from being incident on the image sensor 1330 from the light passing through the lens 1220. The filter 1360 may comprise an infrared cut filter. The filter 1360 may block infrared rays from being incident on the image sensor 1330.

The camera device 1010 may comprise a housing 1370. The first moving part 1200 may comprise a housing 1370. Since the housing 1370 moves in the opposite direction to the image sensor 1330 together with the lens 1220 during OIS driving, it may be understood as one configuration of the first moving part 1200. The second moving part 1300 may comprise a housing 1370. The housing 1370 may be spaced apart from the base 1120. The housing 1370 may be disposed on the base 1120. The housing 1370 may be disposed above the base 1120. The housing 1370 may be movably disposed against the base 1120. The housing 1370 may be disposed on the first substrate 1110. The housing 1370 may be disposed above the first substrate 1110. The housing 1370 may be spaced apart from the fixed part 1100 to be movable against the fixed part 1100.

The housing 1370 may be spaced apart from the cover member 1140 (refer to a in FIG. 34). The housing 1370 may be spaced apart from the side plate of the cover member 1140. The housing 1370 may move inside the cover member 1140. The gap between the housing 1370 and the cover member 1140 may be 0.1 mm. The gap between the housing 1370 and the cover member 1140 may be 0.08 mm to 0.12 mm. The gap between the housing 1370 and the cover member 1140 may be 0.05 mm to 0.15 mm.

The housing 1370 may be spaced apart from the base 1120 (refer to b in FIG. 34). The housing 1370 may be spaced apart from the upper surface of the base 1120. The housing 1370 is movable on the base 1120. The gap between the housing 1370 and the base 1120 may be 0.15 mm. The gap between the housing 1370 and the base 1120 may be 0.13 mm to 0.17 mm. The gap between the housing 1370 and the base 1120 may be 0.10 mm to 0.20 mm. The gap between the housing 1370 and the base 1120 may be greater than the gap between the housing 1370 and the cover member 1140. The housing 1370 may be spaced apart from the first substrate 1110.

The housing 1370 may comprise a protruded part 1371. The protruded part 1371 may be formed on an outer side surface of the housing 1370. The protruded part 1371 may be protruded from an outer side surface of the housing 1370. The protruded part 1371 may be protruded outward from the side surface of the housing 1370.

The protruded part 1371 may be disposed on the protruded part 1341 of the holder 1340. The housing 1370 may be spaced apart from the holder 1340. The protruded part 1371 of the housing 1370 may be spaced apart from the protruded part 1341 of the holder 1340. The outer side surface of the housing 1370 may be spaced apart from the protruded part 1341 of the holder 1340 in a direction perpendicular to the optical axis direction (refer to a in FIG. 49). The protruded part 1371 of the housing 1370 may be spaced apart from the protruded part 1341 of the holder 1340 in an optical axis direction. The protruded part 1371 of the housing 1370 may be spaced apart from the connection substrate 1600 in an optical axis direction (refer to b in FIG. 49). The gap between the protruded part 1371 of the housing 1370 and the protruded part 1341 of the holder 1340 may be the same as the gap between the protruded part 1371 of the housing 1370 and the connection substrate 1600. The gap between the housing 1370 and the holder 1340 may be increased or decreased by the movement of the housing 1370 and the holder 1340.

The housing 1370 may be spaced apart from the base 1120. The housing 1370 may be spaced apart from the protruded part 1121 of the base 1120. The housing 1370 may comprise a groove in which the protruded part 1121 of the base 1120 is disposed. The groove of the housing 1370 may comprise a first surface facing the inner side surface of the protruded part 1121 and a second surface facing the outer side surface of the protruded part 1121. The first surface of the groove of the housing 1370 and the protruded part 1121 of the base 1120 may be spaced apart (refer to a in FIG. 50). The second surface of the groove of the housing 1370 and the protruded part 1121 of the base 1120 may be spaced apart (refer to b in FIG. 50). The gap between the housing 1370 and the base 1120 may be increased or decreased by the movement of the housing 1370. The housing 1370 may comprise a wing portion being disposed at an outer side spaced apart.

The camera device 1010 may comprise a terminal 1380. The second moving part 1300 may comprise a terminal 1380. The terminal 1380 may be disposed in the holder 1340. The terminal 1380 may be coupled to the holder 1340. The terminal 1380 may be fixed to the holder 1340. The terminal 1380 may be coupled to the wire 1800. The terminal 1380 may be connected to the wire 1800 through solder. The terminal 1380 may electrically connect the wire 1800 and the second substrate 1310. The terminal 1800 may be electrically connected to the wire 1800. The terminal 1800 may be electrically connected to the second substrate 1310. The terminal 1380 may be formed of metal. The terminal 1380 may comprise a hole through which the wire 1800 passes. The terminal 1380 may comprise a buffer for shock mitigation. The terminal 1380 may have a shape bent a plurality of times. The terminal 1380 may comprise a plurality of terminals. The terminal 1380 may comprise four terminals being disposed in four corner regions of the holder 1340.

The camera device 1010 may comprise a driving unit. The driving unit may move the moving parts 1200 and 300 against the fixed part 1100. The driving unit may move the first moving part 1200 and the second moving part 1300 against the fixed part 1100. The driving unit may perform an auto focus (AF) function. The driving unit may perform a handshake correction (OIS) function. The driving unit may move the lens 1220. The driving unit may move the image sensor 1330. The driving unit may comprise a magnet and a coil. The driving unit may comprise a shape memory alloy (SMA).

In a second embodiment of the present invention, the driving unit may move the first moving part 1200 and the second moving part 1300 in different directions. The driving unit may move the first moving part 1200 and the second moving part 1300 in different directions with respect to the optical axis. The driving unit may move the first moving part 1200 in a first direction. The driving unit may move the second moving part 1300 in a second direction opposite to the first direction. At this time, both the first direction and the second direction may be perpendicular to the optical axis direction.

In a second embodiment of the present invention, the first moving part 1200 may comprise a housing 1370. The first moving part 1200 may comprise a bobbin 1210 being disposed inside the housing 1370 and coupled to the lens 1220. The housing 1370 may be understood as one configuration of the first moving part 1200 by the common point that the housing 1370 moves in the same direction as the first moving part 1200 during OIS driving. However, during AF driving, the housing 1370 may be maintained in a fixed state when the first moving part 1200 is moved. In addition, the housing 1370 may be understood as one configuration of the second moving part 1200 by the common point that it moves during OIS driving. However, the housing 1370 may move in a direction opposite to the second moving part 1200 during OIS driving. The housing 1370 may be understood as one configuration of a moving part.

The driving unit may comprise a first coil 1430 being disposed in the bobbin 1210. The driving unit may comprise a first magnet 1410 being disposed in the housing 1370 and disposed at a position corresponding to the first coil 1430. As a modified embodiment, the driving unit may comprise a first magnet being disposed in the bobbin 1210 and a first coil being disposed in the housing 1370 and disposed at a position corresponding to the first magnet.

The second moving part 1300 may comprise a holder 1340. The second moving part 1300 may comprise a second substrate 1310 being coupled to the holder 1340 and in which the image sensor 1330 is disposed.

The driving unit may comprise a second coil 1440 being disposed in the holder 1340. The driving unit may comprise a second magnet 1420 being disposed in the housing 1370 and disposed at a position corresponding to the second coil 1440. As a modified embodiment, the driving unit may comprise a second magnet being disposed in the holder 1340 and a second coil being disposed on the housing 1370 and disposed at a position corresponding to the second magnet.

As a modified embodiment, the driving unit may comprise an integral magnet. The driving unit may comprise a magnet. The driving unit may comprise a first coil 1430 being disposed in the first moving part 1200 and disposed at a position corresponding to the magnet. The driving unit may comprise a second coil 1440 being disposed in the second moving part 1300 and disposed at a position corresponding to the magnet.

The camera device 1010 may comprise a first driving unit. The first driving unit may be an AF driving unit. The first driving unit may move the first moving part 1200 in an optical axis direction. The first driving unit may move the bobbin 1210 in an optical axis direction. The lens 1220 may be moved in an optical axis direction. The first driving unit may perform an auto focus (AF) function. The first driving unit may move the first moving part 1200 in an upper direction the optical axis direction. The first driving unit may move the first moving part 1200 in a lower direction the optical axis direction.

The camera device 1010 may comprise a second driving unit. The second driving unit may be an OIS driving unit. The second driving unit may move the second moving part 1300 in a direction perpendicular to the optical axis direction. The second driving unit may move the second substrate 1310 in a direction perpendicular to the optical axis direction. The second driving unit may move the sensor substrate 1320 in a direction perpendicular to the optical axis direction. The second driving unit may move the image sensor 1330 in a direction perpendicular to the optical axis direction. The second driving unit may move the holder 1340 in a direction perpendicular to the optical axis direction. The second driving unit may move the sensor base 1350 in a direction perpendicular to the optical axis direction. The second driving unit may move the filter 1360 in a direction perpendicular to the optical axis direction. The second driving unit may perform a handshake correction (OIS) function.

The second driving unit may move the second moving part 1300 in a first direction perpendicular to the optical axis direction. The second driving unit may move the second moving part 1300 in a second direction perpendicular to the optical axis direction and the first direction. The second driving unit may rotate the second moving part 1300 about the optical axis.

In a second embodiment of the present invention, the first driving unit may comprise a first coil 1430. The second driving unit may comprise a second coil 1440. The first driving unit may comprise a first magnet 1410. The second driving unit may comprise a second magnet 1420. As a modified embodiment, the first driving unit and the second driving unit may comprise a driving magnet being used in common for interaction between the first coil 1430 and the second coil 1440. That is, the first driving unit and the second driving unit may comprise individually controlled coils and a common magnet.

The camera device 1010 may comprise a first magnet 1410. The driving unit may comprise a first magnet 1410. The first magnet 1410 may be a magnet. The first magnet 1410 may be a permanent magnet. The first magnet 1410 may be a common magnet. The first magnet 1410 may be used for auto focusing (AF).

The first magnet 1410 may be disposed in the fixed part 1100. The first magnet 1410 may be fixed to the fixed part 1100. The first magnet 1410 may be coupled to the fixed part 1100. The first magnet 1410 may be attached to the fixed part 1100 by an adhesive. The first magnet 1410 may be disposed in the housing 1370. The first magnet 1410 may be fixed to the housing 1370. The first magnet 1410 may be coupled to the housing 1370. The first magnet 1410 may be attached to the housing 1370 by an adhesive. The first magnet 1410 may be disposed at a corner of the housing 1370. The first magnet 1410 may be disposed to be biased toward a corner of the housing 1370.

The first magnet 1410 may be a two-pole magnetized magnet comprising one N-pole region and one S-pole region. As a modified embodiment, the first magnet 1410 may be a four-pole magnetized magnet comprising two N-pole regions and two S-pole regions.

The first magnet 1410 may comprise a plurality of magnets. The first magnet 1410 may comprise four magnets. The first magnet 1410 may comprise first to fourth magnets. The first to fourth magnets may be disposed symmetrically to the optical axis. The first to fourth magnets may be formed to have the same size and shape.

The camera device 1010 may comprise a second magnet 1420. The driving unit may comprise a second magnet 1420. The second magnet 1420 may be a magnet. The second magnet 1420 may be a permanent magnet. The second magnet 1420 may be a common magnet. The second magnet 1420 may be used for handshake correction (OIS).

The second magnet 1420 may be disposed in the fixed part 1100. The second magnet 1420 may be fixed to the fixed part 1100. The second magnet 1420 may be coupled to the fixed part 1100. The second magnet 1420 may be attached to the fixed part 1100 by an adhesive. The second magnet 1420 may be disposed in the housing 1370. The second magnet 1420 may be fixed to the housing 1370. The second magnet 1420 may be coupled to the housing 1370. The second magnet 1420 may be attached to the housing 1370 by an adhesive. The second magnet 1420 may be disposed at a corner of the housing 1370. The second magnet 1420 may be disposed to be biased toward a corner of the housing 1370.

The second magnet 1420 may be a two-pole magnetized magnet comprising one N-pole region and one S-pole region. As a modified embodiment, the second magnet 1420 may be a four-pole magnetized magnet comprising two N-pole regions and two S-pole regions.

The second magnet 1420 may comprise a plurality of magnets. The second magnet 1420 may comprise four magnets. The second magnet 1420 may comprise first to fourth magnets. The first to fourth magnets may be disposed symmetrically to the optical axis. The first to fourth magnets may be formed to have the same size and shape.

The second magnet 1420 may be disposed below the first magnet 1410. The second magnet 1420 may be disposed in a lower surface of the first magnet 1410. The second magnet 1420 may be in contact with a lower surface of the first magnet 1410. The second magnet 1420 may be fixed to a lower surface of the first magnet 1410. The second magnet 1420 may be coupled to a lower surface of the first magnet 1410 by an adhesive. In the optical axis direction, the length of the second magnet 1420 may be shorter than the length of the first magnet 1410. The size of the second magnet 1420 may be smaller than the length of the first magnet 1410.

The camera device 1010 may comprise a first coil 1430. The driving unit may comprise a first coil 1430. The first coil 1430 may be disposed in the first moving part 1200. The first coil 1430 may be fixed to the first moving part 1200. The first coil 1430 may be coupled to the first moving part 1200. The first coil 1430 may be attached to the first moving part 1200 by an adhesive. The first coil 1430 may be disposed in the bobbin 1210. The first coil 1430 may be fixed to the bobbin 1210. The first coil 1430 may be coupled to the bobbin 1210. The first coil 1430 may be attached to the bobbin 1210 by an adhesive. The first coil 1430 may be electrically connected to the driver IC 1480. The first coil 1430 may be electrically connected to the lower elastic member 1720, the sensing substrate 1470, and the driver IC 1480. The first coil 1430 may receive current from the driver IC 1480.

The first coil 1430 may be disposed at a position corresponding to the first magnet 1410. The first coil 1430 may be disposed in the bobbin 1210 at a position corresponding to the first magnet 1410. The first coil 1430 may face the first magnet 1410. The first coil 1430 may comprise a surface facing the first magnet 1410. The first coil 1430 may be disposed adjacent to the first magnet 1410. The first coil 1430 may interact with the first magnet 1410. The first coil 1430 may electromagnetically interact with the first magnet 1410.

The first coil 1430 may move the first moving part 1200 in an optical axis direction. The first coil 1430 may move the bobbin 1210 in an optical axis direction. The first coil 1430 may move the lens 1220 in an optical axis direction. The first coil 1430 may move the first moving part 1200 in an upper direction the optical axis direction. The first coil 1430 may move the bobbin 1210 in an upper direction the optical axis direction. The first coil 1430 may move the lens 1220 in an upper direction the optical axis direction. The first coil 1430 may move the first moving part 1200 in a lower direction the optical axis direction. The first coil 1430 may move the bobbin 1210 in a lower direction the optical axis direction. The first coil 1430 may move the lens 1220 in a lower direction the optical axis direction. When a current is applied to the first coil 1430, the bobbin 1210 may move in an optical axis direction against the housing 1370.

The camera device 1010 may comprise a second coil 1440. The driving unit may comprise a second coil 1440. The second coil 1440 may be disposed in the second moving part 1300. The second coil 1440 may be fixed to the second moving part 1300. The second coil 1440 may be coupled to the second moving part 1300. The second coil 1440 may be attached to the second moving part 1300 by an adhesive. The second coil 1440 may be disposed in the holder 1340. The second coil 1440 may be fixed to the holder 1340. The second coil 1440 may be coupled to the holder 1340. The second coil 1440 may be attached to the holder 1340 by an adhesive. The second coil 1440 may be wound around the protrusion of the holder 1340. The second coil 1440 may be disposed on the holder 1340. The second coil 1440 may be electrically connected to the second substrate 1310. Both ends of the second coil 1440 may be soldered to the second substrate 1310. The second coil 1440 may be electrically connected to the driver IC 1495. The second coil 1440 may be electrically connected to the second substrate 1310 and the driver IC 1495. The second coil 1440 may receive current from the driver IC 1495.

The second coil 1440 may be disposed at a position corresponding to the second magnet 1420. The second coil 1440 may be disposed at a position corresponding to the second magnet 1420 in the holder 1340. The second coil 1440 may face the second magnet 1420. The second coil 1440 may comprise a surface facing the second magnet 1420. The second coil 1440 may be disposed adjacent to the second magnet 1420. The second coil 1440 may interact with the second magnet 1420. The second coil 1440 may electromagnetically interact with the second magnet 1420.

The second coil 1440 may move the second moving part 1300 in a direction perpendicular to the optical axis direction. The second coil 1440 may move the second substrate 1310 in a direction perpendicular to the optical axis direction. The second coil 1440 may move the sensor substrate 1320 in a direction perpendicular to the optical axis direction. The second coil 1440 may move the image sensor 1330 in a direction perpendicular to the optical axis direction. The second coil 1440 may move the holder 1340 in a direction perpendicular to the optical axis direction. The second coil 1440 may rotate the second moving part 1300 about the optical axis. The second coil 1440 may rotate the second substrate 1310 about the optical axis. The second coil 1440 may rotate the sensor substrate 1320 about the optical axis. The second coil 1440 may rotate the image sensor 1330 about an optical axis. The second coil 1440 may rotate the holder 1340 about the optical axis.

The second coil 1440 may comprise a plurality of coils. The second coil 1440 may comprise four coils. The second coil 1440 may comprise a coil for x-axis shift. The second coil 1440 may comprise a coil for y-axis shift.

The second coil 1440 may comprise a second-first coil 1441. The second-first coil 1441 may be a first sub-coil. The second-first coil 1441 may be a coil for x-axis shift. The second-first coil 1441 may move the second moving part 1300 in the x-axis direction. The second-first coil 1441 may be disposed long in length along the y-axis. The second-first coil 1441 may comprise a plurality of coils. The second-first coil 1441 may comprise two coils. The two coils of the second-first coil 1441 may be electrically connected to each other. The second-first coil 1441 may comprise a connection coil connecting the two coils. In this case, the two coils of the second-first coil 1441 may receive current together. Or, the two coils of the second-first coil 1441 may be electrically separated from each other to receive current individually.

The second coil 1440 may comprise a second-second coil 1442. The second-second coil 1442 may be a second sub-coil. The second-second coil 1442 may be a coil for y-axis shift. The second-second coil 1442 may move the second moving part 1300 in the y-axis direction. The second-second coil 1442 may be disposed to be long in length along the x-axis. The second-first coil 1441 may comprise a plurality of coils. The second-second coil 1442 may comprise two coils. The two coils of the second-second coil 1442 may be electrically connected to each other. The second-second coil 1442 may comprise a connection coil connecting the two coils. In this case, the two coils of the second-second coil 1442 may receive current together. Or, the two coils of the second-second coil 1442 may be electrically separated from each other to receive current individually.

The camera device 1010 may comprise a Hall sensor 1445. The Hall sensor 1445 may be disposed in the second substrate 1310. The Hall sensor 1445 may be disposed in a hole of the holder 1340. The Hall sensor 1445 may comprise a Hall element (Hall IC). The Hall sensor 1445 may detect the second magnet 1420. The Hall sensor 1445 may detect the magnetic force of the second magnet 1420. The Hall sensor 1445 may face the second magnet 1420. The Hall sensor 1445 may be disposed at a position corresponding to the second magnet 1420. The Hall sensor 1445 may be disposed adjacent to the second magnet 1420. The Hall sensor 1445 may detect the position of the second moving part 1300. The Hall sensor 1445 may detect the movement of the second moving part 1300. The Hall sensor 1445 may be disposed in the hollow of the second coil 1440. The sensed value detected by the Hall sensor 1445 may be used to feedback the handshake correction operation. The Hall sensor 1445 may be electrically connected to the driver IC 1495.

The Hall sensor 1445 may comprise a plurality of Hall sensors. The Hall sensor 1445 may comprise three Hall sensors. The Hall sensor 1445 may comprise first to third Hall sensors. The first Hall sensor may detect the displacement of the second moving part 1300 in the x-axis direction. The second Hall sensor may detect the displacement of the second moving part 1300 in the y-axis direction. The third Hall sensor may detect the rotation of the second moving part 1300 about the z-axis alone or together with any one or more of the first Hall sensor and the second Hall sensor.

The camera device 1010 may comprise a sensing magnet 1450. The sensing magnet 1450 may be disposed in the first moving part 1200. The sensing magnet 1450 may be fixed to the first moving part 1200. The sensing magnet 1450 may be coupled to the first moving part 1200. The sensing magnet 1450 may be attached to the first moving part 1200 by an adhesive. The sensing magnet 1450 may be disposed in the bobbin 1210. The sensing magnet 1450 may be fixed to the bobbin 1210. The sensing magnet 1450 may be coupled to the bobbin 1210. The sensing magnet 1450 may be attached to the bobbin 1210 by an adhesive. The sensing magnet 1450 may be formed to have a smaller size than the first magnet 1410. The sensing magnet 1450 may be formed to have a smaller size than the second magnet 1420. Through this, the influence of the sensing magnet 1450 on driving may be minimized.

The sensing magnet 1450 may be disposed at an opposite side of the correction magnet 1460. The sensing magnet 1450 and the correction magnet 1460 may be disposed opposite to each other in the first moving part 1200. The sensing magnet 1450 and the correction magnet 1460 may be disposed opposite to each other in the bobbin 1210.

The camera device 1010 may comprise a correction magnet 1460. The compensating magnet 1460 may be a compensating magnet. The correction magnet 1460 may be disposed in the first moving part 1200. The correction magnet 1460 may be fixed to the first moving part 1200. The correction magnet 1460 may be coupled to the first moving part 1200. The correction magnet 1460 may be attached to the first moving part 1200 by an adhesive. The correction magnet 1460 may be disposed in the bobbin 1210. The correction magnet 1460 may be fixed to the bobbin 1210. The correction magnet 1460 may be coupled to the bobbin 1210. The correction magnet 1460 may be attached to the bobbin 1210 by an adhesive. The correction magnet 1460 may be formed to have a smaller size than the first magnet 1410. The correction magnet 1460 may be formed to have a smaller size than the second magnet 1420. Through this, the influence of the correction magnet 1460 on driving may be minimized. In addition, the correction magnet 1460 may be disposed at an opposite side of the sensing magnet 1450 to form a magnetic force balance with the sensing magnet 1450. Through this, a tilt that may be generated by the sensing magnet 1450 may be inhibited.

The camera device 1010 may comprise a sensing substrate 1470. The sensing substrate 1470 may be a substrate. The sensing substrate 1470 may be a printed circuit board (PCB). The sensing substrate 1470 may be a flexible substrate. The sensing substrate 1470 may be an FPCB. The sensing substrate 1470 may be coupled to the first substrate 1110. The sensing substrate 1470 may be connected to the first substrate 1110. The sensing substrate 1470 may be electrically connected to the first substrate 1110. The sensing substrate 1470 may be soldered to the first substrate 1110. The sensing substrate 1470 may be disposed in the housing 1370. The sensing substrate 1470 may be fixed to the housing 1370. The sensing substrate 1470 may be coupled to the housing 1370. The housing 1370 may comprise a groove or hole having a shape corresponding to that of the sensing substrate 1470. The sensing substrate 1470 may be disposed in a groove or hole of the housing 1370.

The camera device 1010 may comprise a driver IC 1480. The driver IC 1480 may be an AF driver IC. The driver IC 1480 may be electrically connected to the first coil 1430. The driver IC 1480 may apply a current to the first coil 1430 to perform AF driving. The driver IC 1480 may apply power to the first coil 1430. The driver IC 1480 may apply a current to the first coil 1430. The driver IC 1480 may apply a voltage to the first coil 1430. The driver IC 1480 may be disposed in the sensing substrate 1470. The driver IC 1480 may detect the sensing magnet 1450. The driver IC 1480 may be disposed at a position corresponding to the sensing magnet 1450. The driver IC 1480 may be disposed to face the sensing magnet 1450. The driver IC 1480 may be disposed adjacent to the sensing magnet 1450.

The driver IC 1480 may comprise a sensor. The sensor may comprise a Hall IC. The sensor may be disposed at a position corresponding to the sensing magnet 1450. The sensor may be disposed to face the sensing magnet 1450. The sensor may be disposed adjacent to the sensing magnet 1450. The sensor may detect the sensing magnet 1450. The sensor may detect the magnetic force of the sensing magnet 1450. The sensor may detect the position of the first moving part 1200. The sensor may detect the movement of the first moving part 1200. The detected value detected by the sensor may be used for feedback of autofocus driving.

The camera device 1010 may comprise a gyro sensor 1490. The gyro sensor 1490 may be disposed in the first substrate 1110. The gyro sensor 1490 may detect the shaking of the camera device 1010. The gyro sensor 1490 may detect an angular velocity or a linear velocity caused by shaking of the camera device 1010. The gyro sensor 1490 may be electrically connected to the driver IC 1495. The shake of the camera device 1010 detected by the gyro sensor 1490 may be used to drive the handshake compensation (OIS).

The camera device 1010 may comprise a driver IC 1495. The driver IC 1495 may be an OIS driver IC. The driver IC 1495 may be electrically connected to the second coil 1440. The driver IC 1495 may apply a current to the second coil 1440 to perform OIS driving. The driver IC 1495 may apply power to the second coil 1440. The driver IC 1495 may apply a current to the second coil 1440. The driver IC 1495 may apply a voltage to the second coil 1440. The driver IC 1495 may be disposed in the second substrate 1310.

The camera device 1010 may comprise a connection member. The connection member may be an interposer. The connection member may support the movement of the second moving part 1300. The connection member may movably support the second moving part 1300. The connection member may connect the second moving part 1300 and the fixed part 1100. The connection member may connect the first substrate 1110 and the second substrate 1310. The connection member may electrically connect the first substrate 1110 and the second substrate 1310. The connection member may connect the first substrate 1110 and the second moving part 1300. The connection member may guide the movement of the second moving part 1300. The connection member may guide the second moving part 1300 to move in a direction perpendicular to the optical axis direction. The connection member may guide the second moving part 1300 to rotate about the optical axis. The connection member may limit the movement of the second moving part 1300 in an optical axis direction.

The connection member may comprise a connection substrate 1600. The connection member may comprise an elastic member for connecting the fixed part 1100 and the second moving part 1300. The connection member may comprise a leaf spring. The connection member may comprise a wire 1800. The connection member may comprise a ball being disposed between the fixed part 1100 and the second moving part 1300.

The camera device 1010 may comprise a connection substrate 1600. The connection substrate 1600 may be a connection part. The connection substrate 1600 may be a connection member. The connection substrate 1600 may be a flexible substrate. The connection substrate 1600 may be a flexible substrate. The connection substrate 1600 may be a flexible printed circuit board. The connection substrate 1600 may be a flexible printed circuit board (FPCB). The connection substrate 1600 may have flexibility at least in part thereof. The second substrate 1310 and the connection substrate 1600 may be integrally formed. The connection substrate 1600 has flexibility at least in part thereof and may connect the second substrate 1310 and the first substrate 1110.

The connection substrate 1600 may support the second moving part 1300. The connection substrate 1600 may support the movement of the second moving part 1300. The connection substrate 1600 may movably support the second moving part 1300. The connection substrate 1600 may connect the second moving part 1300 and the fixed part 1100. The connection substrate 1600 may connect the first substrate 1110 and the second substrate 1310. The connection substrate 1600 may electrically connect the first substrate 1110 and the second substrate 1310. The connection substrate 1600 may guide the movement of the second moving part 1300. The connection substrate 1600 may guide the second moving part 1300 to move in a direction perpendicular to the optical axis direction. The connection substrate 1600 may guide the second moving part 1300 to rotate about the optical axis. The connection substrate 1600 may limit the movement of the second moving part 1300 in an optical axis direction. A portion of the connection substrate 1600 may be coupled to the base 1120.

The connection substrate 1600 may comprise two connection substrates 1600 that are spaced apart from each other and formed symmetrically. The two connection substrates 1600 may be disposed at both sides of the second substrate 1310. The connection substrate 1600 may be bent a total of 6 times so as to connect the first substrate 1110 and the second substrate 1310.

The connection substrate 1600 may comprise a first region connected to the second substrate 1310 and being bent in an optical axis direction. The first region is connected to the second substrate 1310 and may be bent in an optical axis direction. The first region is connected to the second substrate 1310 and may be extended in an optical axis direction. The first region is connected to the second substrate 1310 and may be bent and extended in an optical axis direction. The connection substrate 1600 may comprise a second region being extended from the first region. The connection substrate 1600 may comprise a third region being bent in a direction perpendicular to the optical axis direction from the second region. The third region may be bent in a direction perpendicular to the optical axis direction from the second region. The third region may be extended in a direction perpendicular to the optical axis direction from the second region. The third region may be bent and extended in a direction perpendicular to the optical axis direction from the second region.

The connection substrate 1600 may comprise a connection part 1610 comprising a first region. The connection substrate 1600 may comprise an extension part 1620 comprising a second region and a third region. The connection substrate 1600 may comprise a connection part 1610 connected to the second substrate 1310. The connection substrate 1600 may comprise an extension part 1620 being extended from the connection part 1610. The connection substrate 1600 may comprise a terminal unit 1630 being connected to the extension part 1620 and comprising a terminal.

The connection substrate 1600 may comprise a connection part 1610. The connection part 1610 may be connected to the second moving part 1300. The connection part 1610 may be coupled to the second moving part 1300. The connection part 1610 may be fixed to the second moving part 1300. The connection part 1610 may be connected to the second substrate 1310. The connection part 1610 may be coupled to the second substrate 1310. The connection part 1610 may be fixed to the second substrate 1310. The connection part 1610 may comprise a first bending region that is bent in an optical axis direction. The connection part 1610 may comprise a first region that is bent in an optical axis direction with respect to the second substrate 1310 and a second region that is extended from the first region and is bent in a direction perpendicular to the optical axis direction.

The connection substrate 1600 may comprise an extension part 1620. The extension part 1620 may connect the connection part 1610 and the terminal unit 1630. The extension part 1620 may be extended from the connection part 1610. The extension part 1620 may comprise a second bending region that is bent in a direction perpendicular to the optical axis direction.

The connection substrate 1600 may comprise a terminal unit 1630. The terminal unit 1630 may be coupled to the fixed part 1100. The terminal unit 1630 may be fixed to the fixed part 1100. The terminal unit 1630 may be coupled to the first substrate 1110. The terminal unit 1630 may be connected to the first substrate 1110. The terminal unit 1630 may be soldered to the first substrate 1110. The terminal unit 1630 may be fixed to the first substrate 1110. The terminal unit 1630 may be coupled to the base 1120. The terminal unit 1630 may be fixed to the base 1120. The terminal unit 1630 may comprise a terminal. The terminal may be coupled to the first substrate 1110.

In a second embodiment of the present invention, the camera device 1010 may comprise a flexible substrate. The flexible substrate may connect the fixed part 1100 and the second moving part 1300. The flexible substrate may comprise a connection part 1610 being connected to the second moving part 1300, an extension part 1620 being extended from the connection part 1610, and a terminal unit 1630 being connected to the extension part 1620 and comprising a terminal.

In a first embodiment of the present invention, the connection substrate 1600 may comprise a first portion being coupled to the first substrate 1110, a second portion being coupled to the second substrate 1310, and a third portion connecting the first portion and the second portion. The third portion may be disposed parallel to the optical axis at least in part. The third portion may be formed to have a length in an optical axis direction longer than a thickness. The second portion of the connection substrate 1600 may be disposed parallel to the second substrate 1310 at least in part. The third portion of the connection substrate 1600 may be disposed perpendicular to the second portion at least in part. The third portion of the connection substrate 1600 may be bent roundly in a portion corresponding to the corner of the second substrate 1310. The second substrate 1310 may comprise a first side surface and a second side surface being disposed opposite to each other, and a third side surface and a fourth side surface being disposed opposite to each other.

The second portion of the connection substrate 1600 may be coupled to the first side surface and the second side surface of the second substrate 1310. The first portion of the connection substrate 1600 may be coupled to a portion of the first substrate 1110 corresponding to the third side surface and the fourth side surface of the second substrate 1310.

The camera device 1010 may comprise a metal plate 1650. The connection member may comprise a metal plate 1650. The connection substrate 1600 may comprise a metal plate 1650. However, the metal plate 1650 may be understood as a configuration separate from the connection substrate 1600. The metal plate 1650 may be a metal member. The metal plate 1650 may be a metal part. The metal plate 1650 may be a metal layer. The metal plate 1650 may be a metal thin film. The metal plate 1650 may be formed of metal. The metal plate 1650 may be formed of an alloy. The metal plate 1650 may be formed of a copper alloy. The metal plate 1650 may be formed of a conductive material. The metal plate 1650 may be distinguished from the conductive layer 1602 of the connection substrate 1600. The metal plate 1650 may be formed of a material different from the conductive layer 1602 of the connection substrate 1600. The metal plate 1650 may be disposed in the connection substrate 1600. The metal plate 1650 may be coupled to the connection substrate 1600. The metal plate 1650 may be fixed to the connection substrate 1600. The metal plate 1650 may be integrally formed with the connection substrate 1600. The metal plate 1650 may have elasticity.

In an optical axis direction, the length of the metal plate 1650 may be the same as the length of the extension part 1620 at least in part. The metal plate 1650 may be extended to have the same length as the extension part 1620 in an optical axis direction. The thickness of the metal plate 1650 may be the same as the thickness of the connection substrate 1600. The thickness of the metal plate 1650 may be thicker than the thickness of the connection substrate 1600. The thickness of the conductive layer 1602 may be 7 to 50 $\mu$m. The thickness of the metal plate 1650 may be 20 to 150 $\mu$m. The metal plate 1650 is connected to the ground GND so that it may be used for impedance matching and noise suppression.

At least a portion of the metal plate 1650 may be disposed in the extension part 1620 of the connection substrate 1600. The extension part 1620 may comprise a bending region that is bent in a direction perpendicular to the optical axis direction. At this time, the metal plate 1650 may be disposed in the bending region. The metal plate 1650 may be disposed on the inner surface of the extension part 1620. The metal plate 1650 may be disposed on the outer surface of the extension part 1620.

The metal plate 1650 may be formed of a conductive material. The metal plate 1650 may be electrically connected to the second substrate 1310. The metal plate 1650 may be electrically connected to the image sensor 1330. The metal plate 1650 may be electrically connected to the driver IC 1495. The metal plate 1650 may be connected to a terminal of the connection substrate 1600. The metal plate 1650 may be electrically connected to a terminal of the connection substrate 1600. The metal plate 1650 may be in direct contact with the terminal of the connection substrate 1600. The metal plate 1650 may be coupled to a terminal of the connection substrate 1600 by a conductive member. The metal plate 1650 may be used as the ground GND. The metal plate 1650 may be connected to a ground terminal of the connection substrate 1600. The metal plate 1650 may be electrically connected to the first substrate 1110. In this case, the number of power connection patterns of the connection substrate 1600 may be reduced.

The camera device 1010 may comprise an electromagnetic interference (EMI) tape. The connection substrate 1600 may comprise a metal member on the outer side surface. The metal member may comprise any one or more of an EMI tape and a metal plate. The connection substrate 1600 may comprise an EMI member. The connection substrate 1600 may comprise an EMI tape. The EMI member may comprise an EMI tape. The EMI member may also comprise an EMI member that is non-adhesive. EMI tape can replace the metal plate. Or, the EMI tape may be replaced by a metal plate. The EMI tape may be a conductive tape. The EMI tape can be conductive and adhesive. The EMI tape may be disposed in the connection substrate 1600. EMI tape may be disposed on the inner surface of the connection substrate 1600. The EMI tape may be disposed on the outer surface of the connection substrate 1600. The EMI tape may be disposed on the inner surface of the extension part 1620 of the connection substrate 1600. The EMI tape may be disposed on the outer surface of the extension part 1620 of the connection substrate 1600. The EMI tape may be attached to the connection substrate 1600 to reinforce the elasticity or rigidity of the connection substrate 1600. The EMI tape may be a reinforcing member.

The EMI tape may be electrically connected to the second substrate 1310. The EMI tape may be electrically connected to the image sensor 1330. The EMI tape may be electrically connected to the driver IC 1495. The EMI tape may be connected to a terminal of the connection substrate 1600. The EMI tape may be electrically connected to a terminal of the connection substrate 1600. The EMI tape may be in direct contact with the terminals of the connection substrate 1600. The EMI tape can be used as a ground GND. The EMI tape may be connected to the ground terminal of the connection substrate 1600. The EMI tape may be electrically connected to the first substrate 1110. In this case, the number of power connection patterns of the connection substrate 1600 may be reduced.

The camera device 1010 may comprise an elastic member 1700. The elastic member 1700 may be a support member. The elastic member 1700 may connect the fixed part 1100 and the first moving part 1200. The elastic member 1700 may elastically connect the fixed part 1100 and the first moving part 1200. The elastic member 1700 may connect the bobbin 1210 and the housing 1370. The elastic member 1700 may elastically connect the bobbin 1210 and the housing 1370. The elastic member 1700 may support the first moving part 1200 to be movable against the fixed part 1100. The elastic member 1700 may be deformed when the first moving part 1200 moves. When the movement of the first moving part 1200 is finished, the elastic member 1700 may position the first moving part 1200 at an initial position through a restoring force (elastic force). The elastic member 1700 may comprise a leaf spring. The elastic member 1700 may comprise a spring. The elastic member 1700 may have elasticity at least in part. The elastic member 1700 may provide a restoring force (elastic force) to the first moving part.

The camera device 1010 may comprise an upper elastic member 1710. The elastic member 1700 may comprise an upper elastic member 1710. The upper elastic member 1710 may be disposed above the lower elastic member 1720. The upper elastic member 1710 may comprise an inner side portion 1712 being coupled to the bobbin 1210. The inner side portion 1712 of the upper elastic member 1710 may be coupled to an upper portion of the bobbin 1210. The inner side portion 1712 of the upper elastic member 1710 may be disposed on an upper surface of the bobbin 1210. The upper elastic member 1710 may comprise an outer side portion 1711 being coupled to the housing 1370. The outer side portion 1711 of the upper elastic member 1710 may be coupled to a lower portion of the housing 1370. The outer side portion 1711 of the upper elastic member 1710 may be disposed on a lower surface of the housing 1370. The upper elastic member 1710 may comprise a connection part 1713 connecting the inner side portion 1712 and the outer side portion 1711. The connection part 1713 may have elasticity.

The upper elastic member 1710 may comprise a plurality of upper elastic units. The upper elastic member 1710 may comprise four upper elastic units. The plurality of upper elastic units may electrically connect the sensing substrate 1470 and the wire 1800. The plurality of upper elastic units may electrically connect the driver IC 1480 and the wire 1800.

The camera device 1010 may comprise a lower elastic member 1720. The elastic member 1700 may comprise a lower elastic member 1720. The lower elastic member 1720 may be disposed below the upper elastic member 1710. The lower elastic member 1720 may comprise an inner side portion being coupled to the bobbin 1210. The inner side portion of the lower elastic member 1720 may be coupled to a lower portion of the bobbin 1210. The inner side portion of the lower elastic member 1720 may be disposed on a lower surface of the bobbin 1210. The lower elastic member 1720 may comprise an outer side portion being coupled to the housing 1370. The outer side portion of the lower elastic member 1720 may be coupled to an upper portion of the housing 1370. The outer side portion of the lower elastic member 1720 may be disposed on an upper surface of the housing 1370. The lower elastic member 1720 may comprise a connection part connecting the inner side portion and the outer side portion. The connection part may have elasticity.

The lower elastic member 1720 may comprise a plurality of lower elastic units. The lower elastic member 1720 may comprise first and second lower elastic units. The lower elastic member 1720 may comprise two lower elastic units. The two lower elastic units may be spaced apart from each other to electrically connect the sensing substrate 1470 and the first coil 1430. The two lower elastic units may be spaced apart from each other so that the driver IC 1480 and the first coil 1430 can be electrically connected.

The camera device 1010 may comprise a wire 1800. The wire 1800 may be a wire spring. The wire 1800 may be an elastic member. The wire 1800 may be a leaf spring as a modified embodiment. The wire 1800 may connect the first moving part 1200 and the second moving part 1300. The wire 1800 may elastically connect the first moving part 1200 and the second moving part 1300. The wire 1800 may electrically connect the first moving part 1200 and the second moving part 1300. The wire 1800 may connect the upper elastic member 1710 and the terminal 1380. The wire 1800 may elastically connect the upper elastic member 1710 and the terminal 1380. The wire 1800 may electrically connect the upper elastic member 1710 and the terminal 1380. The wire 1800 may be electrically connected to the first coil 1430. The wire 1800 may be electrically connected to the driver IC 1480. The wire 1800 may be electrically connected to the sensing substrate 1470. The wire 1800 may be electrically connected to the upper elastic member 1710. The wire 1800 may be electrically connected to the terminal 1380. The wire 1800 may be electrically connected to the second substrate 1310. The wire 1800 may be electrically connected to the connection substrate 1600. The wire 1800 may be electrically connected to the first substrate 1110.

The wire 1800 may be disposed parallel to the optical axis. The wire 1800 may be disposed in an optical axis direction. The wire 1800 may support the second moving part 1300 to move or rotate in a direction perpendicular to the optical axis direction. The wire 1800 may connect the upper elastic member 1710 and the terminal 1150. The wire 1800 may electrically connect the upper elastic member 1710 and the terminal 1150. The wire 1800 may be electrically connected to the sensing substrate 1470. The wire 1800 may be electrically connected to the first substrate 1110. The wire 1800 may be electrically connected to the second substrate 1310. The wire 1800 may be coupled to the upper elastic member 1710 through solder. The wire 1800 may be coupled to the terminal 1150 through solder. The wire 1800 may comprise a plurality of wires. The wire 1800 may comprise four wires.

The upper end of the wire 1800 may be connected to the first moving part 1200. The lower end of the wire 1800 may be connected to the second moving part 1300. The driving unit may move the upper end of the wire 1800 and the lower end of the wire 1800 in a direction opposite to each other with respect to the optical axis.

Adoption of OIS is increasing due to the strengthening of mobile phone functions, and consumer demand for high-resolution products is increasing. For high resolution, the size of the image sensor 1330 increases, and for good image quality, the size of the sensor pixel also increases. However, there are problems in that as the sensor size increases, the weight of the driving unit increases and the movement speed also becomes slow, and the first embodiment of the present invention may comprise details on the structure and control method for simultaneously performing the shift of the image sensor 1330 and the shift of the lens 1220. According to a second embodiment of the present invention, it can be easily handled with super resolution (SR) and the like. In a second embodiment of the present invention, the lens 1220 and the image sensor 1330 can be moved. The image sensor 1330 may be finely adjusted according to the light path. Through this, clear photos and videos can be photographed.

The second embodiment of the present invention may comprise a lens shift structure comprising AF driving and an image sensor shift structure. AF driving may use a driving unit that shifts the lens in an optical axis direction. An upper elastic member 1710 and a wire 1800 may be used to shift the lens in a direction perpendicular to the optical axis direction. The upper elastic member 1710 may be a suspension spring. The wire 1800 may be a suspension wire. The terminal 1380 which is a lower fixed part of the wire 1800 may be fixed to the second moving part 1300 which is a sensor shift moving part. When the image sensor 1330 shifts, it may be elastically supported by the K value of the interposer comprising the wire 1800 and the connection substrate 1600. The shift of the lens 1220 may also be affected by the interposer comprising the wire 1800 and the connection substrate 1600. In OIS driving, the second magnet 1420 and the second coil 1440 may move in a direction opposite to each other by a Lorentz force generated in the second coil 1440. That is, when the OIS unit of the lens shift is moved in the positive (+) direction, the OIS unit of the sensor shift is moved in the negative (−) direction so that OIS correction can be performed with only half of the movement length.

The interposer connection substrate 1600 has a circuit pattern and can serve as a spring. Any one or more of an EMI tape and an alloy may be coupled to the connection substrate 1600. At least one of the lens 1220 and the image sensor 1330 may be tilt driven.

The wire 1800 may electrically connect the AF signals to the first substrate 1110 that is the main PCB. The magnet may be comprised of a shared magnet that affects both AF and OIS. The magnet may affect the OIS sensor shift unit and the OIS lens shift unit at the same time. The sensor shift spring may be comprised of a connection substrate 1600 and a wire 1800. The lens shift spring may also be comprised of a connection substrate 1600 and a wire 1800. Or, the lens shift spring may be formed of a wire 1800. The spring constant K of the lens shift may be equal to or smaller than the spring constant K of the sensor shift.

Hereinafter, driving of a camera device according to a second embodiment of the present invention will be described with reference to the drawings.

Figure 51:
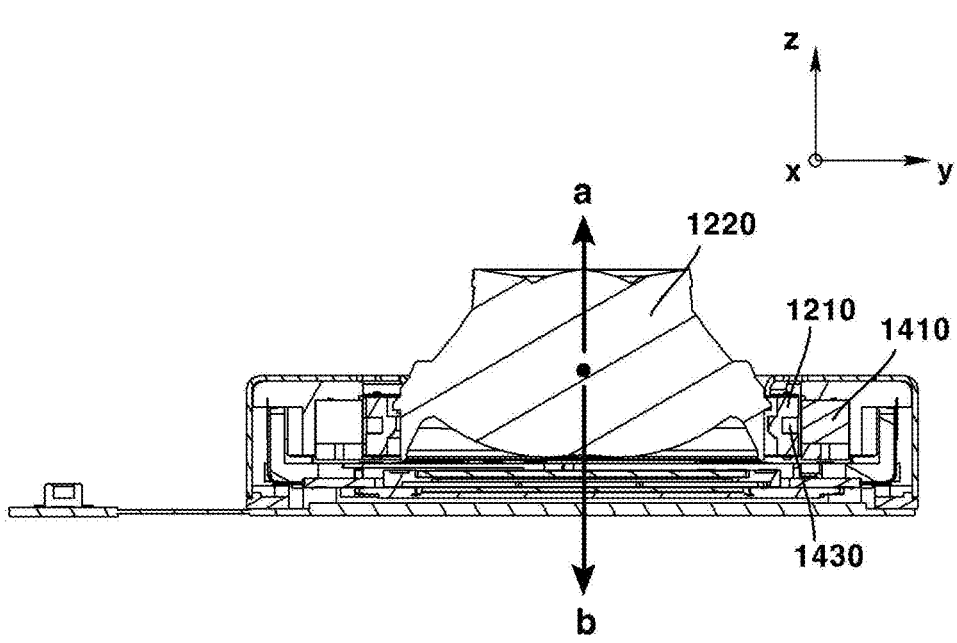
FIG. 51 is a view for explaining an operation of the auto focus function of a camera device according to a second embodiment of the present invention.

FIG. 51 is a view for explaining an operation of the auto focus function of a camera device according to a second embodiment of the present invention.

When power is applied to the first coil 1430 of the camera device 1010 according to the second embodiment of the present invention, an electromagnetic field is formed in the first coil 1430 and the first coil 1430 may move in an optical axis direction (z-axis direction) through electromagnetic interaction with the first magnet 1410. At this time, the first coil 1430 may move in an optical axis direction together with the first moving part 1200 comprising the lens 1220. In this case, since the lens 1220 moves away from or closer to the image sensor 1330, the focus of the subject may be adjusted. At least one of a current and a voltage may be applied to apply power to the first coil 1430.

When a current in a first direction is applied to the first coil 1430 of the camera device 1010 according to a second embodiment of the present invention, the first coil 1430 may move upward among the optical axis directions (refer to a in FIG. 51) through electromagnetic interaction with the first magnet 1410. At this time, the first coil 1430 may move the lens 1220 upward in the optical axis direction so as to be moved away from the image sensor 1330.

When a current in a second direction opposite to the first direction is applied to the first coil 1430 of the camera device 1010 according to a second embodiment of the present invention, the first coil 1430 may move in a lower direction (refer to b in FIG. 51) among the optical axis direction through electromagnetic interaction with the first magnet 1410. At this time, the first coil 1430 may move the lens 1220 in a lower direction of the optical axis to be closer to the image sensor 1330.

Figure 52:
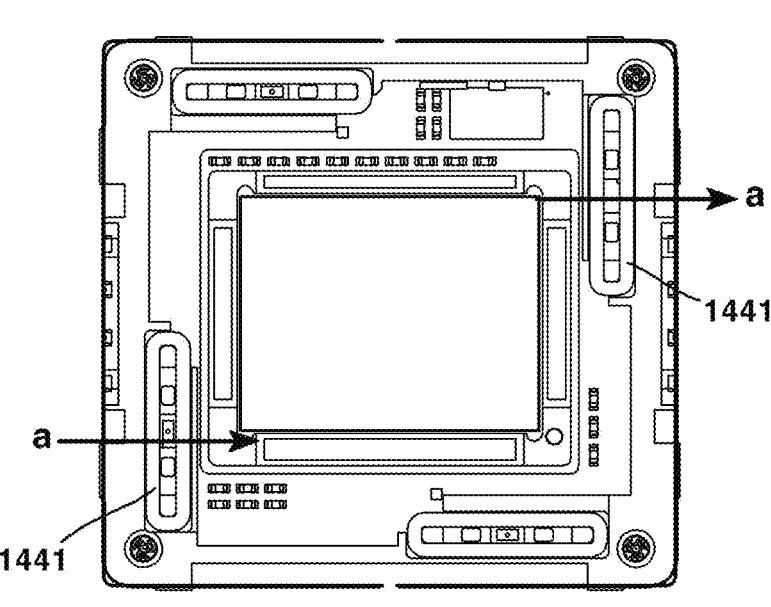
Figure 52:
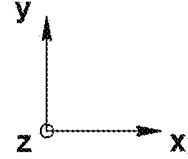
Figure 53:
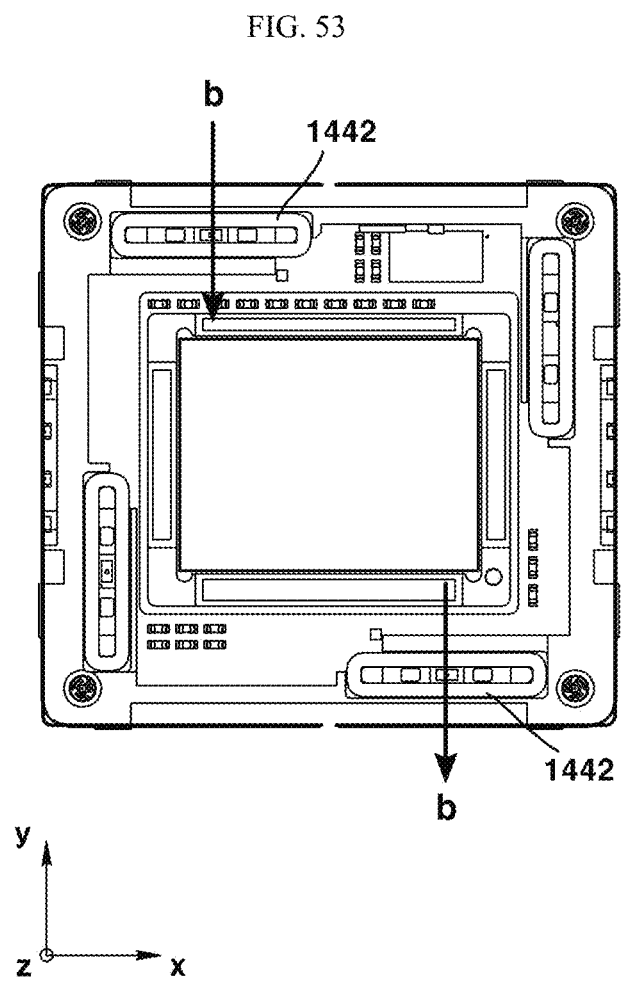
Figure 54:
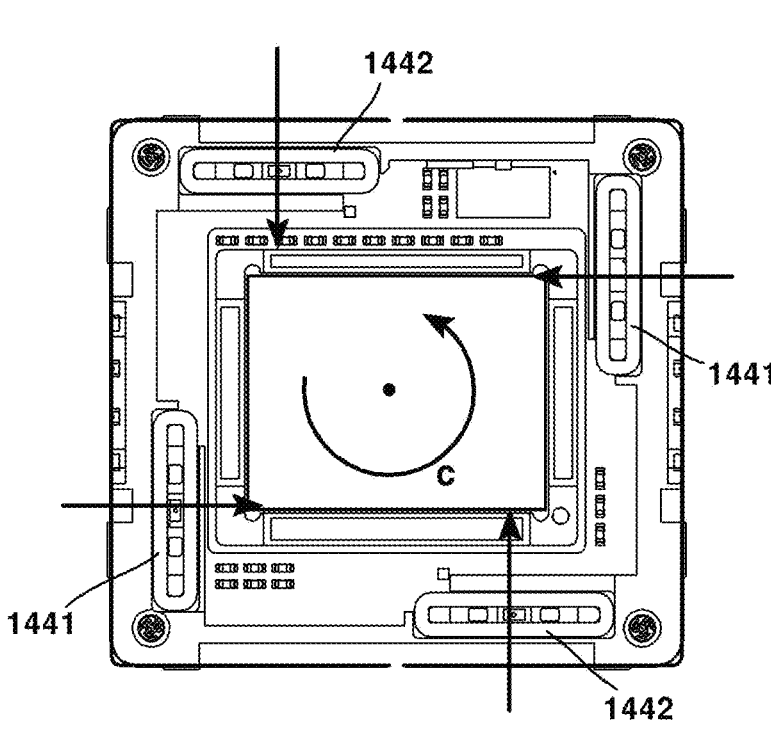
Figure 54:
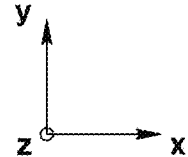

FIGS. 52 to 54 are diagrams for explaining an operation of the handshake correction function of a camera device according to a second embodiment of the present invention.

When power is applied to the second coil 1440 of the camera device 1010 according to a second embodiment of the present invention, an electromagnetic field is formed in the second coil 1440, and thereby, the second coil 1440 may move in a direction perpendicular to the optical axis direction through electromagnetic interaction with the second magnet 1420. In addition, the second coil 1440 may rotate about the optical axis through electromagnetic interaction with the second magnet 1420. At this time, the second coil 1440 may move or rotate together with the second moving part 1300 comprising the image sensor 1330. In a first embodiment of the present invention, the second coil 1440 may move the image sensor 1330 in a way that the shaking of the camera device 1010 detected by the gyro sensor 1490 is compensated.

Furthermore, in a second embodiment of the present invention, the second magnet 1420 may also move in a direction perpendicular to the optical axis direction or rotate against the optical axis. That is, the second coil 1440 and the second magnet 1420 may move at the same time. In other words, the lens 1220 and the image sensor 1330 may move at the same time. However, the lens 1220 and the image sensor 1330 may move in a direction opposite to each other.

FIG. 52 is a diagram for explaining the x-axis shift handshake correction of a camera device according to a second embodiment of the present invention.

When a current in a first direction is applied to the second-first coil 1441 of a camera device 1010 according to a first embodiment of the present invention, the second-first coil 1441 may move in one direction (refer to a in FIG. 52) among the first directions (x-axis direction) perpendicular to the optical axis direction through electromagnetic interaction with the second magnet 1420. At this time, the second-first coil 1441 may move the image sensor 1330 in one direction among the first directions perpendicular to the optical axis direction. Meanwhile, at the same time, the second magnet 1420 may move the lens 1220 in the other direction opposite to one direction among the first directions perpendicular to the optical axis direction.

Conversely, when a current in a second direction opposite to the first direction is applied to the second-first coil 1441, the second-first coil 1441 may rotate in other direction about the optical axis through electromagnetic interaction with the second magnet 1420. At this time, the second-first coil 1441 may rotate the image sensor 1330 in other direction about the optical axis. At this time, the other direction may be clockwise. Meanwhile, at the same time, the second magnet 1420 may move the lens 1220 to one direction among first directions opposite to the other direction about the optical axis.

Due to the interaction between the second-first coil 1441 and the second magnet 1420, the lens 1220 and the image sensor 1330 may move opposite to each other on a first direction perpendicular to the optical axis direction.

FIG. 53 is a view for explaining y-axis shift handshake correction of a camera device according to a second embodiment of the present invention.

When a current in a first direction is applied to the second-second coil 1442 of a camera device 1010 according to a second embodiment of the present invention, the second-second coil 1442 may move in one direction among the second directions (y-axis direction) perpendicular to the optical axis direction (refer to b in FIG. 53) through electromagnetic interaction with the second magnet 1420. At this time, the second-second coil 1442 may move the image sensor 1330 in one direction among the second directions perpendicular to the optical axis direction. Meanwhile, at the same time, the second magnet 1420 may move the lens 1220 in the other direction opposite to one direction among the second directions perpendicular to the optical axis direction.

Conversely, when a current in a second direction opposite to the first direction is applied to the second-second coil 1442, the second-second coil 1442 may move in the other direction among the second directions (y-axis direction) perpendicular to the optical axis direction through electromagnetic interaction with the second magnet 1420. At this time, the second-second coil 1442 may move the image sensor 1330 in the other direction among the second directions perpendicular to the optical axis direction. Meanwhile, at the same time, the second magnet 1420 may move the lens 1220 in one direction opposite to the other direction among the second directions perpendicular to the optical axis direction.

Due to the interaction between the second-second coil 1442 and the second magnet 1420, the lens 1220 and the image sensor 1330 may move in a direction opposite to each other on a second direction perpendicular to the optical axis direction.

FIG. 54 is a view for explaining the z-axis rolling handshake correction of a camera device according to a second embodiment of the present invention.

When current in a first direction is applied to the second-first coil 1441 and the second-second coil 1442 of the camera device 1010 according to a second embodiment of the present invention, the second-first coil 1441 and the second-second coil 1442 may rotate in one direction about the optical axis through electromagnetic interaction with the second magnet 1420 (refer to c in FIG. 54). At this time, the second-first coil 1441 and the second-second coil 1442 may rotate the image sensor 1330 in one direction about the optical axis. At this time, one direction may be counterclockwise. Meanwhile, at the same time, the second magnet 1420 may rotate the lens 1220 in the other direction opposite to the one direction about the optical axis.

Conversely, when a current in a second direction opposite to the first direction is applied to the second-first coil 1441 and the second-second coil 1442, the second-first coil 1441 and the second-second coil 1442 may rotate in other direction about the optical axis through electromagnetic interaction with the second magnet 1420. At this time, the second-first coil 1441 and the second-second coil 1442 may rotate the image sensor 1330 in other direction about the optical axis. At this time, the other direction may be clockwise. Meanwhile, at the same time, the second magnet 1420 may rotate the lens 1220 in one direction opposite to the other direction about the optical axis.

Due to the interaction between the second-first coil 1441 and the second-second coil 1442 and the second magnet 1420, the lens 1220 and the image sensor 1330 may rotate in a direction opposite to each other in rotation about the optical axis.

Hereinafter, an optical apparatus according to a second embodiment of the present invention will be described with reference to the drawings.

Figure 55:
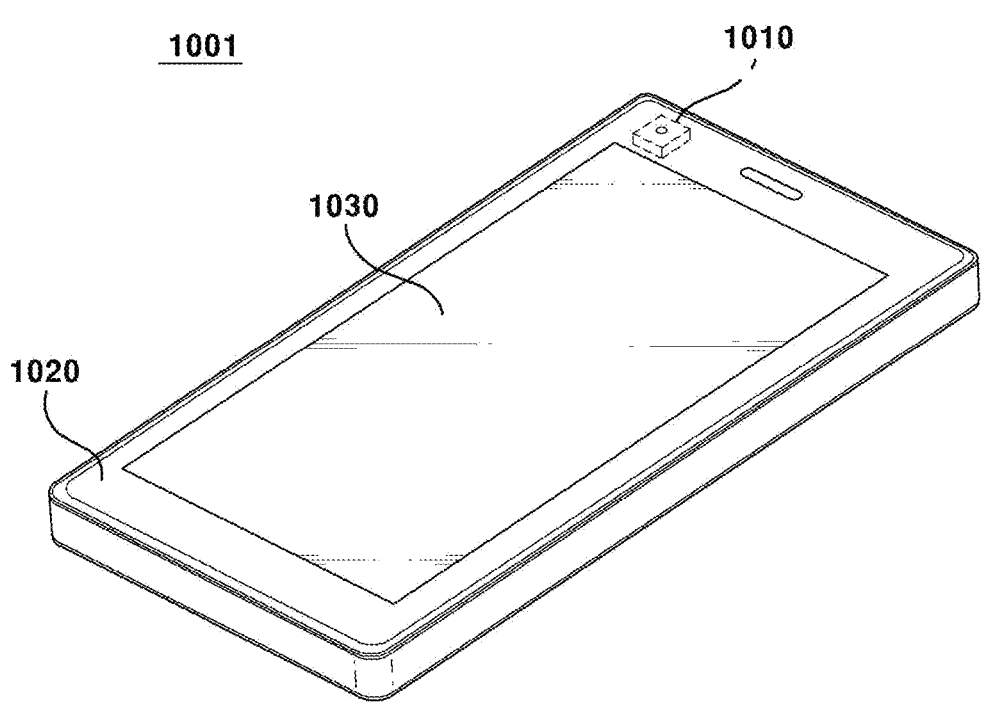
FIG. 55 is a perspective view of an optical apparatus according to a second embodiment of the present invention.
Figure 56:
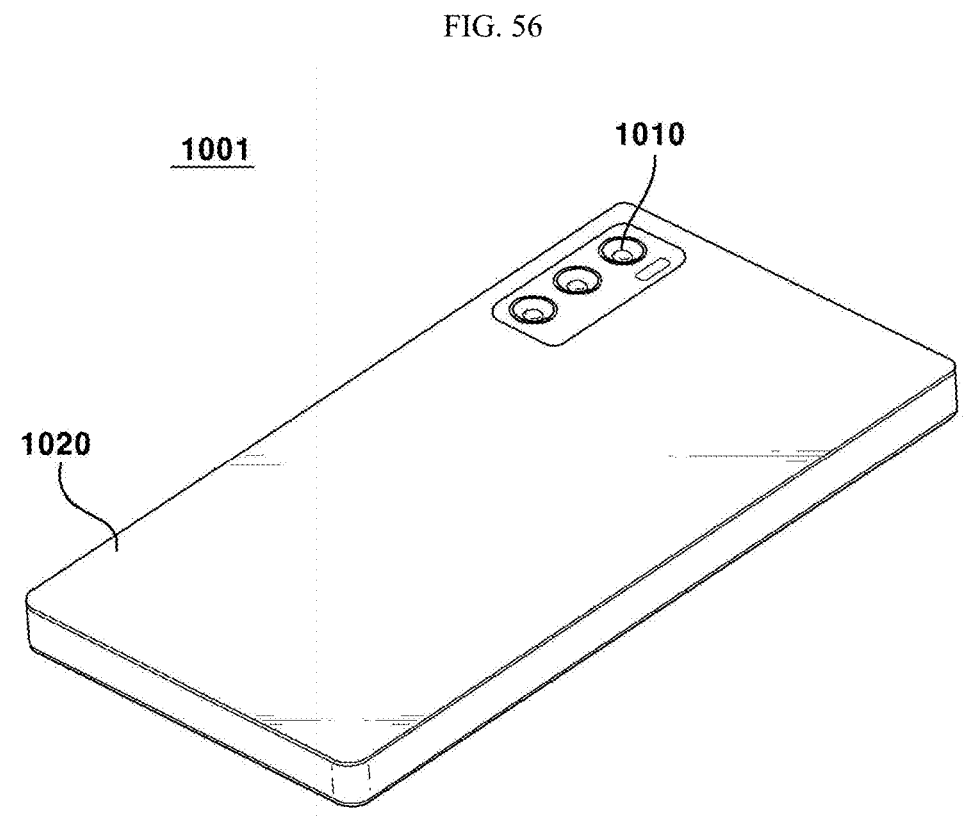
FIG. 56 is a perspective view of an optical apparatus according to a second embodiment of the present invention, viewed from a different direction from FIG. 55.

FIG. 55 is a perspective view of an optical apparatus according to a second embodiment of the present invention; and FIG. 56 is a perspective view of an optical apparatus according to a second embodiment of the present invention, viewed from a different direction from FIG. 55.

The optical apparatus 1001 may comprise any one or more among a hand phone, a portable phone, a portable terminal, a mobile terminal, a smart phone, a smart pad, a portable smart device, a digital camera, a laptop computer, a digital broadcasting terminal, a personal digital assistant (PDA), a portable multimedia player (PMP), and a navigation. The optical apparatus 1001 may comprise any device for photographing images or photos.

The optical apparatus 1001 may comprise a main body 1020. The optical apparatus 1001 may comprise a camera device 1010. The camera device 1010 may be disposed in the main body 1020. The camera device 1010 may photograph a subject. The optical apparatus 1001 may comprise a display 1030. The display 1030 may be disposed in the main body 1020. The display 1030 may output any one or more of an image and an image photographed by the camera device 1001. The display 1030 may be disposed on the first surface of the main body 1020. The camera device 1001 may be disposed on one or more of the first surface of the main body 1020 and the second surface opposite to the first surface.

Although the first and second embodiments of the present invention have been separately described above, some configurations of the first embodiment may be replaced with corresponding configurations of the second embodiment. In addition, some configurations of the second embodiment may be replaced with corresponding configurations of the first embodiment. In addition, the third embodiment of the present invention may comprise some configurations of the first embodiment and some configurations of the second embodiment.

Although the embodiment of the present invention has been described above with reference to the accompanying drawings, those of ordinary skill in the art to which the present invention belongs will understand that the present invention may be embodied in other specific forms without changing the technical spirit or essential features thereof. Therefore, it should be understood that the embodiments described above are illustrative in all respects and not restrictive.

The invention claimed is:

1. A camera device comprising:
a fixed part comprising a first substrate;
a first moving part comprising a lens;
a second moving part comprising a holder, a second substrate coupled with the holder, and an image sensor disposed on the second substrate;
a driving unit configured to drive the first moving part and the second moving part;
a wire connecting the first moving part and the second moving part; and
a connection substrate connecting the first substrate and the second substrate,
wherein the first moving part and the second moving part move in directions opposite each other, and
wherein at least a part of the connection substrate is flexible.

2. The camera device of claim 1, wherein the driving unit is configured to move the first moving part and the second moving part in directions opposite each other with respect to an optical axis.

3. The camera device of claim 1, wherein the driving unit moves the first moving part in a first direction and moves the second moving part in a second direction opposite the first direction, and
wherein both the first direction and the second direction are perpendicular to an optical axis direction.

4. The camera device of claim 1, wherein the first moving part comprises a housing and a bobbin disposed in the housing and coupled to the lens, and
wherein the driving unit comprises a first coil disposed on the bobbin, and a first magnet disposed on the housing and disposed at a position corresponding to the first coil.

5. The camera device of claim 4,
wherein the driving unit comprises a second coil disposed on the holder, and a second magnet disposed on the housing and disposed at a position corresponding to the second coil.

6. The camera device of claim 4, wherein the housing is spaced apart from the fixed part so as to be movable against the fixed part.

7. The camera device of claim 4,
wherein the first moving part comprises an elastic member connecting the housing and the bobbin,

wherein the second moving part comprises a terminal coupled to the holder, and wherein the wire connects the elastic member and the terminal.

8. The camera device of claim 7, comprising:

a sensing magnet disposed on the bobbin;

a correction magnet disposed on the bobbin and disposed opposite the sensing magnet; a sensing substrate disposed on the housing; and a sensor disposed on the sensing substrate and configured to detect the sensing magnet, wherein the elastic member electrically connects the sensing substrate and the wire.

9. The camera device of claim 8, wherein the terminal electrically connects the wire and the second substrate.

10. The camera device of claim 4, wherein the bobbin is configured to move in an optical axis direction against the housing, when a current is applied to the first coil.

11. The camera device of claim 1, wherein the connection substrate is configured to movably support the second moving part.

12. The camera device of claim 1, wherein the connection substrate electrically connects the first substrate and the second substrate.

13. The camera device of claim 1, wherein the wire is disposed in an optical axis direction, wherein an upper end of the wire is connected with the first moving part and a lower end of the wire is connected with the second moving part, and wherein the driving unit is configured to move the upper end of the wire and the lower end of the wire in directions opposite each other with respect to an optical axis.

14. The camera device of claim 1, wherein the driving unit comprises a magnet, a first coil disposed on the first moving part and disposed at a position corresponding with the magnet, and a second coil disposed on the second moving part and disposed at a position corresponding with the magnet.

15. An optical device comprising:

a main body;

the camera device of claim 1 disposed on the main body; and a display disposed on the main body and configured to output a video or an image photographed by the camera device.

16. A camera device comprising:

a first substrate;

a base disposed on the first substrate;

a lens disposed on the base;

a second substrate spaced apart from the first substrate;

an image sensor disposed on the second substrate;

a driving unit configured to drive the lens and the image sensor;

a wire disposed in parallel to an optical axis of the image sensor; and a connection substrate connecting the first substrate and the second substrate, wherein the lens and the image sensor move in directions opposite each other by a magnet, and wherein at least a part of the connection substrate is flexible.

17. A camera device comprising:

a fixed part comprising a first substrate;

a first moving part configured to move against the fixed part and comprising a lens;

a second moving part disposed between the fixed part and the first moving part and comprising a holder, a second substrate coupled with the holder, and an image sensor disposed on the second substrate;

a driving unit configured to drive the first moving part and the second moving part;

a wire connecting the first moving part and the second moving part; and a connection substrate connecting the first substrate and the second substrate, wherein, when the second moving part moves in a first direction perpendicular to an optical axis direction, the first moving part is configured to move in a second direction opposite the first direction, wherein at least a part of the connection substrate is flexible.

18. The camera device of claim 17, wherein the first moving part comprises a housing and a bobbin disposed in the housing and coupled with the lens, and wherein the driving unit comprises a first coil disposed on the bobbin and a first magnet disposed on the housing and disposed at a position corresponding with the first coil.

19. The camera device of claim 18, wherein the driving unit comprises a second coil disposed on the holder and a second magnet disposed on the housing and disposed at a position corresponding with the second coil.

20. The camera device of claim 17, wherein the connection substrate is configured to movably support the second moving part.

* * * * *